(12) United States Patent
Kobayashi

(10) Patent No.: US 7,390,597 B2
(45) Date of Patent: *Jun. 24, 2008

(54) METHOD FOR MANUFACTURING COLOR FILTER

(75) Inventor: Hironori Kobayashi, Shinjuku-ku (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 284 days.

This patent is subject to a terminal disclaimer.

(21) Appl. No.: 10/458,953

(22) Filed: Jun. 11, 2003

(65) Prior Publication Data

US 2004/0070705 A1  Apr. 15, 2004

(30) Foreign Application Priority Data

Jun. 13, 2002 (JP) ............................. 2002-173183
Jun. 13, 2002 (JP) ............................. 2002-173205

(51) Int. Cl.
*G02B 5/20* (2006.01)
*G02F 1/1335* (2006.01)

(52) U.S. Cl. .......................................... 430/7; 347/106

(58) Field of Classification Search ........................ None
See application file for complete search history.

(56) References Cited

U.S. PATENT DOCUMENTS 6,613,486 B1 * 9/2003 Ohtsu et al. ..................... 430/7
6,803,175 B2 * 10/2004 Kobayashi .................. 430/322
6,811,945 B2 * 11/2004 Kobayashi .................. 430/199

6,846,616 B2 1/2005 Kobayashi et al.

FOREIGN PATENT DOCUMENTS

| JP | 11-337726 | 12/1999 |
| JP | 1 008 873 A1 * | 6/2000 |
| JP | 2000-249821 | 9/2000 |
| JP | 2002-040231 | 2/2002 |

* cited by examiner

*Primary Examiner*—John A. McPherson
(74) *Attorney, Agent, or Firm*—Ladas & Parry LLP

(57) ABSTRACT

In the present invention, a provision of a method for manufacturing a color filter capable of forming a highly sophisticated pattern, to be formed easily at a low cost is desired. The present invention achieves the above mentioned object by providing a method for manufacturing a color filter comprising:

(1) forming a light shielding part on a transparent base material;
(2) forming a wettability changeable layer which the wettability changes by the function of a photocatalyst, on the surface of the transparent base material on the side with the light shielding part formed;
(3) placing the photocatalyst containing layer of the photocatalyst containing layer side substrate which is the photocatalyst containing layer containing a photocatalyst formed on the base member, and the wettability changeable layer with a gap of 200 μm or less, and irradiating an energy from a predetermined direction to form a pixel part forming part comprising a lyophilic area where the contact angle to a liquid is lowered compared with the state before the energy irradiation to the wettability changeable layer, in a pattern; and
(4) coloring the pixel part forming part by the ink jet method so as to form a pixel part.

31 Claims, 16 Drawing Sheets

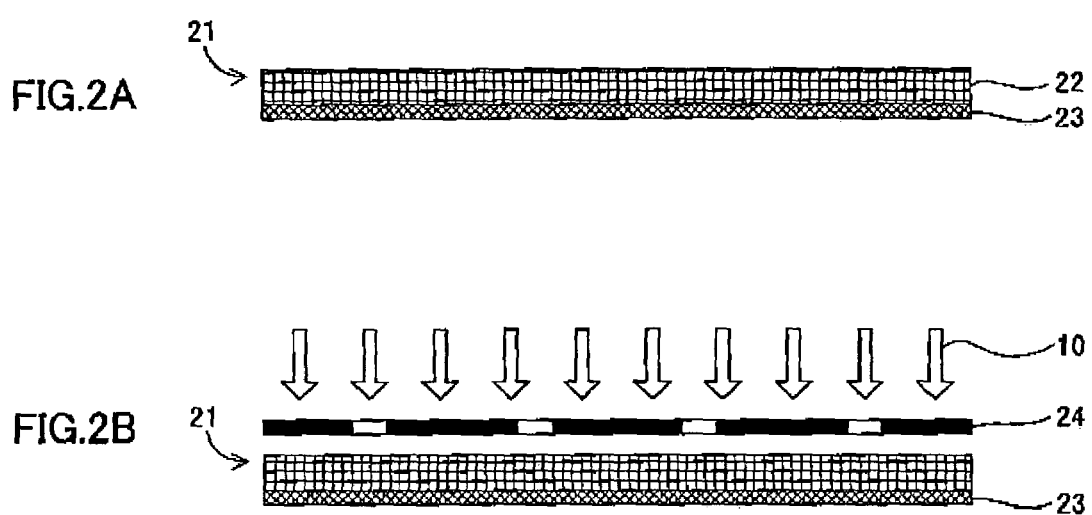

FIG.12A
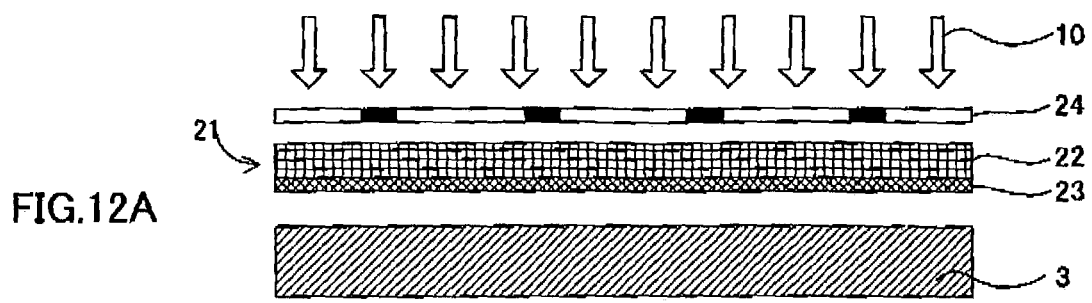
FIG.12B
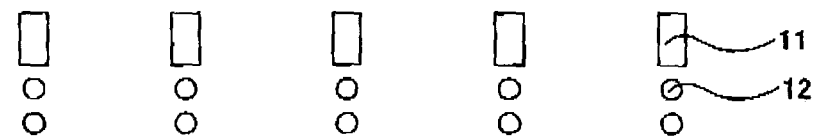
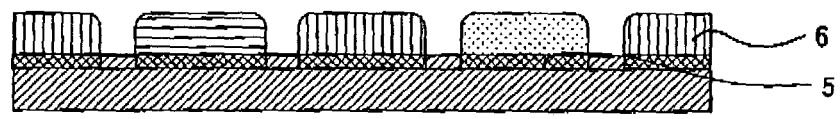
FIG.12C
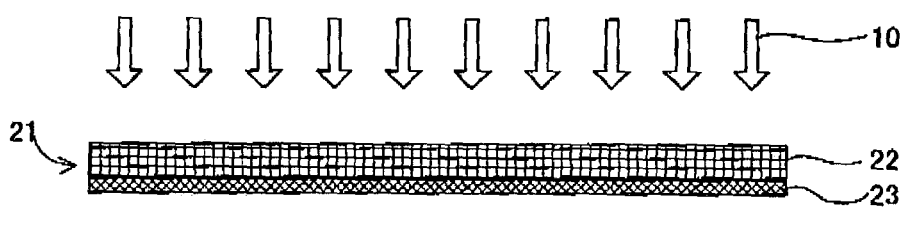
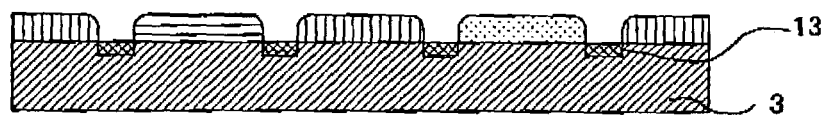
FIG.12D

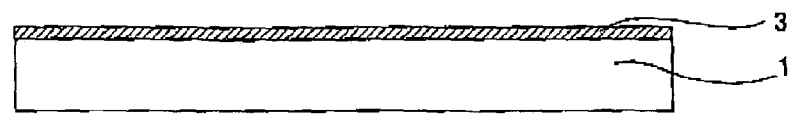
FIG.17A
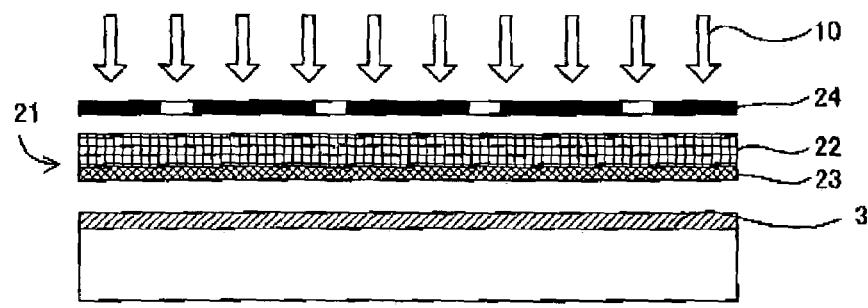
FIG.17B
FIG.17C
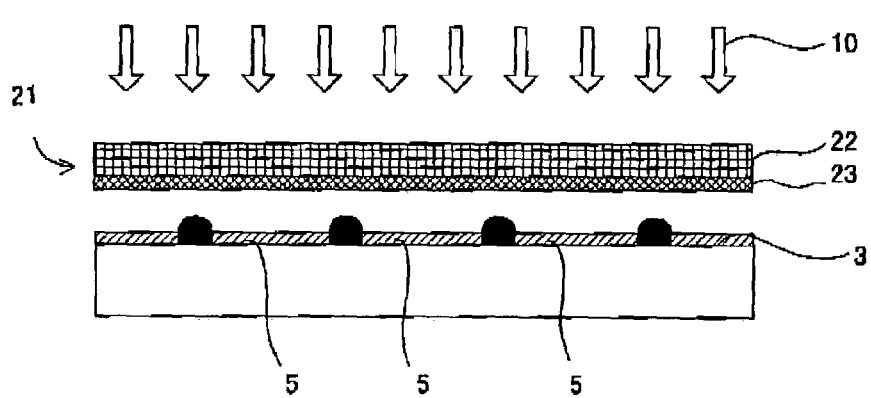
FIG.17D
FIG.17E
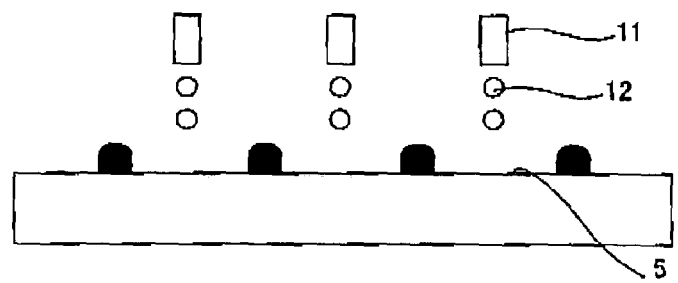
FIG.17F
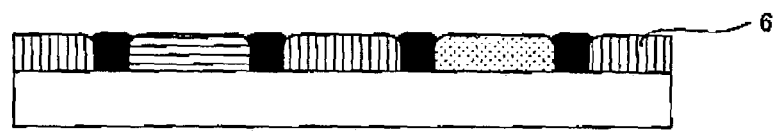

METHOD FOR MANUFACTURING COLOR FILTER

BACKGROUND OF THE INVENTION

1. Field of the Invention

The present invention relates to a method for manufacturing a color filter suitable for a color liquid crystal display.

2. Description of the Related Art

Recently, accompanied by development of the personal computers, in particular, development of the portable personal computers, demand to the liquid crystal displays, particularly color liquid crystal displays tends to be increasing. However, since the color liquid crystal displays are expensive, cost down is highly requested. In particular, cost down to the color filters, which accounts for a large proportion in terms of the cost, is highly requested.

In general, such a color filter comprises coloring patterns of the three primary colors including red (R), green (G) and blue (B). The liquid crystal functions as a shutter by switching electrodes corresponding each pixel of R, G, and B on or off, thereby light pass through each pixel of R, G, and B so that the color display is carried out.

As the methods for manufacturing a color filter conventionally executed, for example, a dying method can be presented. In the dying method, a colored pattern is obtained by first forming a water soluble polymer material, as the dying material, on a glass substrate, patterning the same into a desired shape by a photolithography process, and then soaking the obtained pattern in a dye bath. By repeating the same for three times, R, G, and B color filter layers are formed.

Moreover, as another method, a pigment dispersion method can be presented. In the method, a single color pattern is obtained by first forming a pigment dispersed photo sensitive resin layer on a substrate, and patterning the same. By repeating this process for three times, R, G, and B color filter layers are formed.

As still another method, an electro deposition method, a method of dispersing a pigment in a thermosetting resin, printing three times for R, G, and B, and thermally curing the resin, or the like can be presented. However, in any method, the same process should be repeated for three times for coloring the three colors of R, G, and B, a problem of a high cost, and a problem of the yield deterioration due to the process repetition are involved.

Moreover, a method for manufacturing a pattern formed body, or the like, of forming a pattern using a wettability changeable substance by the function of a photocatalyst has been discussed by the present inventors. However, in the methods for manufacturing a pattern formed body by the function of a photocatalyst so far, since the photocatalyst is included in the pattern formed body to be manufactured, a problem of possibility of being influenced by the photocatalyst, depending on the kind of the pattern formed body, has been involved.

SUMMARY OF THE INVENTION

In view of the above mentioned, provision of a method for manufacturing a color filter, capable of forming a highly sophisticated pattern easily at a low cost is desired.

The present invention provides a method for manufacturing a color filter comprising:

(1) forming a light shielding part on a transparent base material;

(2) forming a wettability changeable layer, which a wettability changes by a function of a photocatalyst, on a surface of the transparent base material on a side which the light shielding part is formed;

(3) placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to form a pixel part forming part, in a pattern, comprising a lyophilic area where the contact angle to a liquid is lowered compared with a state before the energy irradiation to the wettability changeable layer; and (4) coloring the pixel part forming part by an ink jet method so as to form a pixel part (hereinafter, it is referred to as the first embodiment).

In this embodiment, since the wettability changeable layer is provided on the transparent base material with the light shielding part formed preliminarily, and the energy is irradiated after placing the photocatalyst containing layer side substrate so as to face the wettability changeable layer, only the part where the pixel part is formed can easily be made lyophilic. Therefore, by adhering an ink by the ink jet method to the pixel part forming part for forming the pixel part, a pixel part with the ink adhered evenly can be obtained so that a color filter without color omission or color irregularity can be formed.

Moreover, since the wettability changeable layer does not include a photocatalyst, the manufactured color filter does not include a photocatalyst so that an advantage can be provided that no problem derives from the influence of the photocatalyst in any pattern of a color filter.

In the above mentioned first embodiment, the method may comprise: after adjusting the wettability changeable layer, placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to form a liquid repellent convex part forming part, in a pattern, comprising a lyophilic area where the contact angle to a liquid is lowered compared with a state before the energy irradiation to the wettability changeable layer of the light shielding part; and forming a liquid repellent convex part on the liquid repellent convex part forming part.

By accordingly forming an exposing part for the liquid repellent convex part by irradiating the energy also on the wettability changeable layer on the light shielding part, a lyophilic area for the liquid repellent convex part forming part can be formed by a predetermined width. Therefore, by coating, or the like, paint for the liquid repellent convex part on the lyophilic area, the liquid repellent convex part having a predetermined width can be obtained by even height. Since the convex part is liquid repellent, the ink can hardly be moved over the boundary of the pixel part at the time of forming the pixel part, so that color mixture of the inks or the like can be prevented. Moreover, by contacting the liquid repellent convex part and the photocatalyst containing layer at the time of the energy irradiation using the photocatalyst containing layer at the time of forming the pixel part, the liquid repellent convex part can act as a spacer for maintaining a certain gap.

Moreover, the present invention provides a method for manufacturing a color filter comprising:

(1) forming a wettability changeable layer, which a wettability changes by a function of a photocatalyst, on a transparent base material, on a pixel part forming part which is a part on the transparent base material where pixel part is formed;

(2) forming a light shielding part on the boundary part of the pixel part forming part provided with the wettability changeable layer;

(3) placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to obtain the pixel part forming part as a lyophilic area where the contact angle to a liquid is lowered compared with a state before the energy irradiation; and (4) coloring the pixel part forming part, provided as a lyophilic area, by an ink jet method so as to form a pixel part (hereinafter, it is referred to as the second embodiment).

In this case, first the wettability changeable layer is formed in the pixel part forming part, where the pixel part is formed, on the transparent base material. In the case for example, a material having a higher contact angle to a liquid, in the state before the energy irradiation, than that of the base material surface is used for the wettability changeable layer, the base material as the light shielding part forming part between the pixel part forming part will be a lyophilic area having a lower contact angle to a liquid than the pixel part forming part with the wettability changeable layer formed thereon. In this lyophilic area, for example, the light shielding part can be formed easily with paint for a light shielding part. Then, by irradiating an energy to for example the entire surface with the light shielding part formed, the pixel part forming part can be provided as the lyophilic area. Thereby, by coloring the area by the ink jet method, a pixel part with the ink adhered evenly can be obtained so that a color filter without color omission or color irregularity can be formed.

Moreover, the present invention provides a method for manufacturing a color filter comprising:

(1) forming a wettability changeable layer, which a wettability changes by a function of a photocatalyst, on a transparent base material, on a light shielding part forming part which is a part on the transparent base material where light shielding part is formed;

(2) coloring a part on the transparent base material, where the wettability changeable layer is not firmed, by an ink jet method so as to form a pixel part;

(3) placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to obtain the light shielding part forming part as a lyophilic area where the contact angle to a liquid is lowered compared with a state before the energy irradiation; and (4) forming a light shielding part in the light shielding part forming part provided as the lyophilic area (hereinafter, it is referred to as the third embodiment).

In this case, the wettability changeable layer is formed in the light shielding part forming part, where the light shielding part is formed, on the color filter substrate. In the case for example, a material having a higher contact angle to a liquid, in the state before the energy irradiation, than that of the transparent base material surface is used for the wettability variable layer, the pixel part forming part therebetween will be a lyophilic area having a lower contact angle to a liquid than the light shielding part forming part with the wettability changeable layer formed thereon, and the light shielding part forming part which is the boundary part of the pixel part forming part will be a liquid repellent area. Therefore, in the case an ink is adhered on the pixel part forming part provided as the lyophilic area by the ink jet method, the adhered ink can hardly move over the light shielding part forming part which is the liquid repellent area. Therefore, there is little risk of generating the problem of ink color mixture or the like. By irradiating the energy to the wettability changeable layer of the light shielding part forming part between the pixel parts after accordingly forming the pixel part, the part can be provided as the lyophilic area. Therefore, by coating for example an ink for a light shielding part on this part, the light shielding part can be formed easily.

Furthermore, a method for manufacturing a color filter comprising:

(1) placing a wettability changeable layer, which a wettability changes by a function of a photocatalyst, and a photocatalyst containing layer of a photocatalyst containing layer side substrate, which is the photocatalyst containing layer containing a photocatalyst formed on a base member, with a gap of 200 μm or less, and irradiating an energy from a predetermined direction to form the light shielding part forming part, in a pattern,comprising a lyophilic area where the contact angle to a liquid is lowered compared with a state before the energy irradiation;

(2) forming a light shielding part in the light shielding part forming part provided as the lyophilic area;

(3) placing a wettability changeable layer with the light shielding part formed thereon and a photocatalyst containing layer with a gap of 200 μm or less, and irradiating an energy from a predetermined direction to form a pixel part forming part, in a pattern, comprising a lyophilic area where the contact angle to a liquid is lowered compared with a state before the energy irradiation; and (4) coloring the pixel part forming part provided as the lyophilic area by the ink jet method, so as to form a pixel part, is provided (hereinafter, it is referred to as the fourth embodiment).

In this embodiment, by using the photocatalyst containing layer side substrate on the wettability changeable layer to provide only the area where the light shielding part is formed as the lyophilic area, and then coating a paint for the light shielding part on this part, the light shielding part can be formed. Therefore, since the developing process or the etching process after the pattern exposure, which has been executed conventionally at the time of forming the light shielding part, are not necessary, the light shielding part can be formed efficiently. Moreover, by irradiating an energy, for example, on the entire surface, the area for forming the pixel part can easily be provided as the lyophilic area. Therefore, by coloring the part by the ink jet method, a pixel part with the ink adhered evenly can be provided so that a color filter without color omission or color irregularity can be formed.

Furthermore, the present invention provides a method for manufacturing a color filter comprising:

(1) placing a wettability changeable layer, which a wettability changes by a function of a photocatalyst, and a photocatalyst containing layer of a photocatalyst containing layer side substrate, which is the photocatalyst containing layer containing a photocatalyst formed on a base member, with a gap of 200 μm or less, and irradiating an energy from a predetermined direction to form a pixel part forming part, in a pattern, comprising a lyophilic area where the contact angle to a liquid is lowered compared with a state before the energy irradiation;

(2) forming a pixel part by coloring the pixel part forming part provided as the lyophilic area by an ink jet method;

(3) placing a wettability changeable layer with the pixel part formed thereon and a photocatalyst containing layer with a gap of 200 μm or less, and irradiating an energy from a predetermined direction to form a light shielding part forming part, in a patter, comprising a lyophilic area where the contact angle to a liquid is lowered compared with a state before the energy irradiation; and (4) forming a light shielding part in the light shielding part forming part provided as the lyophilic area (hereinafter, it is referred to as the fifth embodiment).

In this case, first, by irradiating an energy to the above mentioned pixel part forming part of the wettability changeable layer, the pixel part forming part can be provided as the lyophilic area. Therefore, by adhering an ink to the pixel part forming part by the ink jet method, the ink is spread evenly so as not to generate color irregularity or the like. Moreover, since the energy is not irradiated to the light shielding part forming part which is the boundary part to the pixel part, it remains as the liquid repellent area. Therefore, the ink adhered on the pixel part forming part which is the lyophilic area can hardly be moved beyond the light shielding part forming part which is the liquid repellent area. Thus, the problem of the ink mixture, or the like will not be generated. By irradiating the energy to the light shielding part forming part between the pixel parts after accordingly forming the pixel part, the part can be provided as the lyophilic area. Therefore, by coating, for example, an ink for the light shielding part on this part, the light shielding part can easily be formed.

In the above mentioned fourth embodiment and fifth embodiment, it is preferable that the method for manufacturing a color filter according to claim 5, wherein the wettability changeable layer is formed on the transparent base material. Since the wettability changeable layer formed of a material which the wettability changeable drastically is generally of a material hardly having the self supporting property, the strength or the like is increased by forming on the transparent base material so that it can be applied to various kinds of color filters.

Furthermore, the present invention provides a method for manufacturing a color filter comprising:

(1) forming a light shielding part on a wettability changeable layer, which a wettability changes by a function of a photocatalyst;

(2) placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to form a pixel part forming part, in a patter, comprising a lyophilic area where the contact angle to a liquid is lowered compared with a state before the energy irradiation; and (3) coloring the pixel part forming part provided as the lyophilic area by the ink jet method so as to form a pixel part (hereinafter, it is referred to as the sixth embodiment).

In this embodiment, by preliminarily forming the light shielding part on the wettability changeable layer which the wettability changes by the function of a photocatalyst, and irradiating an energy to the pixel part forming part of the wettability changeable layer after placing the photocatalyst containing layer side substrate, the above mentioned pixel part forming part can be provided as the lyophilic area. By adhering an ink on the pixel part forming part provided as the lyophilic area by the ink jet method, a pixel part with the ink adhered evenly can be obtained so that the ink can be spread evenly without generating color irregularity or the like.

Moreover, at the time, the above mentioned wettability changeable layer may be formed on the transparent base material. Since the wettability changeable layer formed of a material which the wettability changes drastically is generally of a material hardly having the self supporting property, the strength or the like is increased by forming on the transparent base material so that it can be applied to various kinds of color filters.

In any of the above mentioned inventions, it is preferable that the process of forming the pixel part forming part provided as the lyophilic area, and coloring the same by the ink jet method to form the pixel part comprises:

(a) placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to form a first pixel part forming part, in a pattern, comprising a lyophilic area where the contact angle to a liquid is lowered compared with a state before the energy irradiation;

(b) coloring the first pixel part forming part provided as the lyophilic area by the ink jet method so as to form a first pixel part;

(c) placing the photocatalyst containing layer and the wettability changeable layer with a gap of 200 μm or less, and irradiating an energy from a predetermined direction to form a second pixel part forming part, in a pattern, comprising a lyophilic area where the contact angle to a liquid is lowered compared with a state before the energy irradiation; and (d) coloring the second pixel part forming part provided as the lyophilic area by the ink jet method so as to form a second pixel part.

In the present invention, for the pixel part formation, the ink is coated on the pixel part forming part by the ink jet method for coloring. However, in the case the adjacent pixel part forming parts are close to each other, the adjacent inks may be mixed at the time of coating the ink. Therefore, as mentioned above, according to a method of first forming the first pixel part and then forming the second pixel part, for example, at the time of forming the first pixel part, pattern exposure can be carried out such that every other pixel part is formed so that the adjacent pixel parts can be provided in a state away from the each other at the time of the first time image part formation. Accordingly, by forming the first pixel part forming part in a state with a relatively wide liquid repellent area provided in between the areas to be colored, and coloring the same by the ink jet method, a trouble of the adjacent pixel part ink mixture will not occur. By irradiating an energy again in between the accordingly formed first pixel parts to form the second pixel part forming part, and coloring the same by the ink jet method, a color filter can be formed without the trouble of the ink mixture or the like.

In any of the above mentioned inventions, it is preferable that the contact angle, to a liquid having a 40 mN/m surface tension, on the wettability changeable layer is 10° or more on a part without the energy irradiation and it is 9° or less on a part with the energy irradiation. Thereby, the above mentioned wettability changeable layer can be used as the liquid repellent area before receiving the energy irradiation, and as the lyophilic area after the energy irradiation.

In the above mentioned inventions, it is preferable that the wettability changeable layer is a layer containing an organo polysiloxane. By forming the wettability changeable layer using the organo polysiloxane as the material, the wettability changeable layer with a wettability pattern, of a large wettability difference, formed can be provided.

Moreover, at the time, it is preferable that the above mentioned organo polysiloxane is a polysiloxane containing a fluoro alkyl group. By using a polysiloxane containing a fluoro alkyl group, the wettability changeable layer with a larger wettability difference can be provided.

Furthermore, it is preferable that the organo polysiloxane is an organo polysiloxane as a hydrolyzed condensate or a cohydrolyzed condensate of one kind or two or more kinds of silicon compounds represented by $Y_n SiX_{(4-n)}$ (Here, Y is an alkyl group, a fluoro alkyl group, a vinyl group, an amino group, a phenyl group, an epoxy group, or an organic group containing them, X is an alkoxyl group, or a halogen, and n is an integer from 0 to 3.). By forming the wettability changeable layer using such organo polysiloxane as the material, a color filter with a wettability pattern, of a large wettability difference, formed can be provided.

Moreover, the present invention provides a method for manufacturing a color filter comprising:

(1) forming a light shielding part on a transparent base material;
(2) forming a decomposition removal layer, on the surface of the transparent base material on the side with the light shielding part formed, having a higher contact angle to a liquid than the transparent base material surface, and is decomposed and removed by the function of a photocatalyst;
(3) placing a photocatalyst containing layer of a photocatalyst containing layer side substrate, which is the photocatalyst containing layer containing a photocatalyst formed on a base member, and the decomposition removal layer with a gap of 200 µm or less, and irradiating an energy from a predetermined direction to form a pixel part forming part, in a pattern, comprising the transparent base material bared by the decomposition removal of the decomposition removal layer; and
(4) coloring the pixel part forming part by the ink jet method so as to form a pixel part (hereinafter, it is referred to as the seventh embodiment).

In this embodiment, since the decomposition removal layer is provided on the transparent base material with the light shielding part formed preliminarily, and the energy is irradiated after placing the photocatalyst containing layer side substrate facing the decomposition removal layer, the decomposition removal layer of the pixel part forming part, where the pixel part is formed, can be decomposed and removed easily. Here, since the above mentioned decomposition removal layer has a higher contact angle to a liquid compared with the above mentioned transparent base material surface, the area with the transparent base material bared by the decomposition and removal of the decomposition removal layer can be provided as the lyophilic area, and the area with the above mentioned decomposition removal layer remaining can be provided as the liquid repellent area. Therefore, in the case an ink is adhered, by the ink jet method, to the pixel part forming part provided as the lyophilic area, since the adhered ink can hardly be moved over the liquid repellent area existing in between the pixel part forming parts, a highly sophisticated pattern can be formed with little risk of generating a problem of the ink color mixture or the like. Furthermore, since the pixel part forming part is the lyophilic area, a pixel part with the ink adhered evenly can be obtained by the ink jet method so that a color filter without color omission or color irregularity can be formed.

The above mentioned seventh embodiment may comprise, after forming the decomposition removal layer, placing the photocatalyst containing layer and the decomposition removal layer with a gap of 200 µm or less, and forming a liquid repellent convex part forming part, in a pattern, comprising the bared light shielding part by the decomposition removal of the decomposition removal layer by irradiating an energy from a predetermined direction; and forming a liquid repellent convex part in the liquid repellent convex part forming part.

Accordingly, the liquid repellent convex part forming part can be formed by the energy irradiation on the decomposition removal layer on the light shielding part. Therefore, for example, in the case the contact angles to a liquid of the above mentioned decomposition removal layer and the above mentioned light shielding part differ, the liquid repellent convex part with a predetermined width and an even height can be formed easily by coating a paint for the liquid repellent convex part. Moreover, since the convex part is liquid repellent, the ink can hardly be moved over the boundary of the pixel part at the time of forming the pixel part so that the ink color mixture or the like can be prevented. Moreover, by contacting the liquid repellent convex part and the photocatalyst containing layer at the time of the energy irradiation using the photocatalyst containing layer side substrate at the time of forming the pixel part, the liquid repellent convex part can act as a spacer for maintaining a certain gap.

Moreover, the present invention provides a method for manufacturing a color filter comprising:

(1) forming a decomposition removal layer, on the a transparent base material, having a higher contact angle to a liquid than the transparent base material surface and is decomposed and removed by the function of a photocatalyst;
(2) placing the decomposition removal layer and a photocatalyst containing layer of a photocatalyst containing layer side substrate, which is the photocatalyst containing layer containing a photocatalyst formed on a base member, with a gap of 200 µm or less, and irradiating an energy from a predetermined direction to form a light shielding part forming part, in a pattern, comprising the transparent base material bared by the decomposition removal of the decomposition removal layer;
(3) forming a light shielding part in the light shielding part forming part;
(4) placing the decomposition removal layer with the light shielding part formed thereon, and the photocatalyst containing layer with a gap of 200 µm or less, and irradiating an energy from a predetermined direction to form a pixel part forming part, in a pattern, comprising the transparent base material bared by the decomposition removal of the decomposition removal layer; and
(5) coloring the pixel part forming part by an ink jet method so as to form a pixel part (hereinafter, it is referred to as the eighth embodiment).

In this embodiment, first, the decomposition removal layer is formed on the transparent base material. Since the decomposition removal layer has a higher contact angle to a liquid compared with the above mentioned transparent base material surface, the area with the transparent base material bared by the decomposition and removal of the decomposition removal layer can be provided as the lyophilic area, and the area with the above mentioned decomposition removal layer remaining can be provided as the liquid repellent area. Therefore, the lyophilic area comprising the transparent base material can be provided by the decomposition and removal of the decomposition removal layer of the light shielding part forming part by the energy irradiation using the photocatalyst containing layer to the light shielding part forming part on the above mentioned transparent base material. Thereby, the light shielding part can be formed easily by coating an ink for the light shielding part forming part to the light shielding part forming part provided as the lyophilic area. Therefore, the developing process or the etching process after energy irradiation which was executed conventionally at the time of forming the light shielding part are not necessary, the light shielding part can be formed efficiently. Moreover, by irradiating an energy, for example, to the entire surface after forming the light shielding part, the pixel part forming part lyophilic area for forming the pixel part can be provided easily. Therefore, by coloring the part by the ink jet method, a pixel part with the ink adhered evenly can be provided so that a color filter without color omission or color irregularity can be formed.

Moreover, the present invention provides a method for manufacturing a color filter comprising:

(1) forming a decomposition removal layer, on the a transparent base material, having a higher contact angle to a liquid than the transparent base material surface and is decomposed and removed by the function of a photocatalyst;

(2) placing the decomposition removal layer and a photocatalyst containing layer of a photocatalyst containing layer side substrate, which is the photocatalyst containing layer containing a photocatalyst formed on a base member, with a gap of 200 μm or less, and irradiating an energy from a predetermined direction to form a pixel part forming part, in a pattern, comprising the transparent base material bared by the decomposition removal of the decomposition removal layer;

(3) coloring the pixel part forming part by the ink jet method so as to form a pixel part;

(4) placing the decomposition removal layer with the pixel part formed thereon, and the photocatalyst containing layer with a gap of 200 μm or less, and irradiating an energy from a predetermined direction to form a light shielding part forming part, in a pattern, comprising the transparent base material bared by the decomposition removal of the decomposition removal layer; and (5) forming a light shielding part in the light shielding part forming part (hereinafter, it is referred to as the ninth embodiment).

In this embodiment, first the decomposition removal layer is formed on the transparent base material. Here, since the above mentioned decomposition removal layer has a higher contact angle to a liquid compared with the above mentioned transparent base material surface, the area with the transparent base material bared by the decomposition and removal of the decomposition removal layer can be provided as the lyophilic area, and the area with the above mentioned decomposition removal layer remained can be provided as the liquid repellent area. Therefore, the lyophilic area comprising the transparent base material can be provided by the decomposition and removal of the decomposition removal layer of the pixel part forming part by the energy irradiation using the photocatalyst containing layer side substrate to the pixel part forming part on the above mentioned transparent base material. By adhering an ink on the pixel part forming part provided as the lyophilic area by the ink jet method, the ink can be spread evenly without generating color irregularity or the like. Moreover, the light shielding part forming part, which is the boundary part to the pixel part, remains as the liquid repellent area with the decomposition removal layer remaining. Therefore, the ink adhered on the pixel part forming part which is the lyophilic area can hardly be moved over the light shielding part forming part which is as the liquid repellent area. Therefore, a problem of the ink color mixture or the like will not be generated. By irradiating an energy to the light shielding part forming part in between the pixel parts after accordingly forming the pixel part, the decomposition removal layer in this part is decomposed and removed so that the lyophilic area comprising the transparent base material can be provided. Therefore, the light shielding part can be formed easily by coating, for example, an ink for the light shielding part to this area.

In the above mentioned seventh to ninth embodiments, it is preferable that the process of forming the pixel part forming part where the transparent base material is bared by the decomposition removal of the decomposition removal layer, and coloring the same by the ink jet method to form the pixel part comprises:

(a) placing a photocatalyst containing layer of a photocatalyst containing layer side substrate, which is the photocatalyst containing layer containing a photocatalyst formed on a base member, and the decomposition removal layer with a gap of 200 μm or less, and irradiating an energy from a predetermined direction to form a first pixel part forming part, in a pattern, comprising the transparent base material bared by the decomposition removal of the decomposition removal layer;

(b) coloring the first pixel part forming part by the ink jet method so as to form a first pixel part;

(c) placing the photocatalyst containing layer and the decomposition removal layer with a gap of 200 μm or less, and irradiating an energy from a predetermined direction to form a second pixel part forming part, in a pattern, comprising the transparent base material bared by the decomposition removal of the decomposition removal layer; and (d) coloring the second pixel part forming part by the ink jet method so as to form a second pixel part.

In the present invention, for the pixel part formation, the ink is coated on the pixel part forming part by the ink jet method for coloring. However, in the case the adjacent pixel part forming parts are close to each other, the adjacent inks may be mixed at the time of coating the ink. Therefore, as mentioned above, according to the method of first forming the first pixel part and then forming the second pixel part, for example, at the time of forming the first pixel part, energy irradiation can be carried out in a pattern such that every other first pixel part is formed so that the adjacent pixel parts can be provided in a state away from the each other at the time of the first time image part formation. Accordingly, by forming the first pixel part forming part in a state with a relatively wide liquid repellent area provided in between the areas to be colored, and coloring the same by the ink met method, a trouble of the adjacent pixel part ink mixture can be prevented. By irradiating an energy again in between the first pixel parts formed accordingly to form the second pixel parts, and coloring the same by the ink jet method, a color filter can be formed without the trouble of the ink mixture or the like.

In the inventions of the above mentioned seventh to ninth embodiments, it is preferable that the contact angle to a liquid on the above mentioned transparent base material, as the contact angle to a liquid having a 40 mN/m surface tension, is less than 10 degrees. By having the contact angle to a liquid, on the transparent base material bared at the time of the decomposition and removal of the above mentioned decomposition removal layer by the photocatalyst, of the above mentioned value, the bared transparent base material can be provided as the lyophilic area so that the pixel part and the light shielding part can be formed easier by the ink jet method or the like.

Moreover, at the time, it is preferable that the contact angle to a liquid having a 40 mN/m surface tension on the above mentioned decomposition removal layer is 10° or more. By having the contact angle to a liquid on the above mentioned decomposition removal layer as the above mentioned value, it can provided liquid repellently compared with the base material bared by the decomposition and removal, and thus a color filter can be manufactured easily.

Moreover, it is preferable that the above mentioned decomposition removal layer is any of a self-assembled monolayer, a Langmuir Blodgett film, or a layer-by layer self-assembled film. These films are easy to form a thin film with, they have a relatively high strength, and they have good adhesion to the base material.

Moreover, in the above mentioned first to seventh embodiments, it is preferable that a width of the pixel part is formed wider than the width of a opening part formed by the light shielding part. By accordingly having the width of the pixel part wider than the opening part formed by the light shielding part, the risk, of passage of a backlighting light beam through the part other than the pixel part, can be reduced so that color omission or the like can be prevented.

Here, in the present invention, it is preferable that the photocatalyst containing layer and the wettability changeable layer or the decomposition removal layer are placed with a gap in a range of 0.2 µm to 10 µm. Since the gap between the photocatalyst containing layer and the wettability changeable layer or the decomposition removal layer is in the above mentioned range, the wettability change of the wettability changeable layer or the decomposition removal of the decomposition removal layer can be carried out by the energy irradiation for a short time.

Moreover, the above mentioned photocatalyst containing layer side substrate may comprise the base member and the photocatalyst containing layer formed in a pattern on the above mentioned base member. By accordingly forming the photocatalyst containing layer in a pattern, the wettability change of the wettability changeable layer or the decomposition and removal of the decomposition removal layer can be carried out in a pattern without using a photomask. Moreover, since only the wettability of the wettability changeable layer of the color filter substrate facing the pattern of the photocatalyst containing layer is changed, or only the decomposition removal layer is decomposed and removed, the energy to be irradiated is not particularly limited to a parallel energy, and furthermore, the energy irradiation direction is not particularly limited, and thus it is advantageous in that the degree of freedom in the kind of the energy source and the arrangement can be increased dramatically.

Moreover, the above mentioned photocatalyst containing layer side substrate may comprise a base member, a photocatalyst containing layer formed on the above mentioned base member, and a photocatalyst containing layer side light shielding part formed in a pattern, wherein the energy irradiation in the above mentioned energy irradiating process may be carried out from the photocatalyst containing layer side substrate. Accordingly, by providing the photocatalyst containing layer, and the photocatalyst containing layer side light shielding part formed in a pattern, in the photocatalyst containing layer side substrate, and irradiating the energy from the side of the photocatalyst containing layer side substrate, the wettability of the wettability changeable layer can be changed in a pattern, or the decomposition removal layer can be decomposed and removed in a pattern, without using a photomask. Moreover, since the photomask is not used, a process of aligning or the like of the photomask is not necessary, and thus the process can be simplified.

The above mentioned photocatalyst containing layer side substrate may comprise the photocatalyst containing layer formed on the above mentioned base member, and the above mentioned photocatalyst containing layer side light shielding part formed in a pattern on the above mentioned photocatalyst containing layer. Moreover, the above mentioned photocatalyst containing layer side substrate may comprise the above mentioned photocatalyst containing layer side light shielding part formed in a pattern on the above mentioned base member, and furthermore, the above mentioned photocatalyst containing layer formed thereon. Thereby, since the pattern formation needs to be executed only on the above mentioned photocatalyst containing layer side light shielding part so that the above mentioned photocatalyst containing layer can be formed on the entire surface, the entire photocatalyst containing layer side substrate can be formed easily, and thus it is preferable also in terms of the cost, the manufacturing efficiency, or the like.

Moreover, at the time, the above mentioned photocatalyst containing layer side substrate may comprise the photocatalyst containing layer formed on the photocatalyst containing layer side light shielding part formed in a pattern on the transparent base material via a primer layer. Thereby, influence of the residue or the like, existing on the photocatalyst containing layer side light shielding part or the opening part between the photocatalyst containing layer side light shielding parts generated at the time of patterning the photocatalyst containing layer side light shielding part, on the function of the photocatalyst can be prevented. Therefore, the sensitivity of the photocatalyst can be improved so that a pattern of the changed wettability of the wettability changeable layer or a pattern of the decomposed and removed decomposition removal layer can be obtained by the energy irradiation for a short time.

According to any of the above mentioned inventions, it is preferable that a spacer having the thickness in a range of 0.2 µm to 10 µm is formed in a pattern on the photocatalyst containing layer in the photocatalyst containing layer side substrate, and the energy irradiation is carried out with the spacer and the wettability changeable layer or the decomposition removal layer being in contact. Since the photocatalyst containing layer is covered with the spacer in the part with the spacer formed, the wettability of the wettability changeable layer of this part is not changed even in the case the energy is irradiated, or the decomposition removal layer is not decomposed and removed. Therefore, the wettability of the wettability changeable layer can be changed or the decomposition removal layer can be decomposed and removed in the area other than the pattern of the spacer formed.

Furthermore, it is preferable that the above mentioned spacer is the photocatalyst containing layer side light shielding part formed with a light shielding material. Since the spacer is the photocatalyst containing layer side light shielding part, a higher sophisticated pattern can be formed by irradiating the energy in a state which the photocatalyst containing layer side light shielding part is closely contacted to the wettability changeable layer or the decomposition removal layer.

In the above mentioned inventions, it is preferable that the photocatalyst containing layer is a layer consisting of a photocatalyst. In the case the photocatalyst containing layer is a layer consisting of only a photocatalyst, the efficiency of changing the wettability of the wettability changeable layer or the efficiency of decomposing and removing the decomposition removal layer can be improved so that a color filter can be manufactured efficiently.

In this case, it is preferable that the photocatalyst containing layer is a layer formed by forming a film of a photocatalyst on the base member by a vacuum film formation method. By forming the photocatalyst containing layer by the vacuum film formation method, an uniform photocatalyst containing layer having an even film thickness with little surface roughness can be provided so that the wettability change of the wettability changeable layer or the decomposition removal of the decomposition removal layer can be carried out efficiently.

Moreover, the above mentioned photocatalyst containing layer may be a layer having a photocatalyst and a binder. By using the binder accordingly, the photocatalyst containing layer can be formed relatively easily so that a color filter can be manufactured at a low cost, as a result.

In the above mentioned inventions, it is preferable that 36. The method for manufacturing a color filter according to claim 1, wherein the photocatalyst is one kind or two or more substances selected from a titanium oxide ($TiO_2$), a zinc oxide (ZnO), a tin oxide ($SnO_2$), a strontium titanate ($SrTiO_3$), tungsten oxide ($WO_3$), bismuth oxide ($Bi_2O_3$), and an iron oxide ($Fe_2O_3$). By having the above mentioned substances as the above mentioned photocatalyst, the catalytic reaction can be executed efficiently. Moreover, among the above mentioned substances, it is preferable that the photocatalyst is a titanium oxide ($TiO_2$) because the band gap energy of a titanium dioxide is high so that it is effective as a photocatalyst, it is chemically stable without the toxicity, and it can be obtained easily.

Moreover, the above mentioned energy irradiation may be carried out while heating the photocatalyst containing layer. By executing the above mentioned energy irradiation while heating the photocatalyst containing layer, the effect of the photocatalyst can be improved so that the decomposition removal layer can be decomposed and removed by energy irradiation for a short time.

In the present invention, it is preferable that the above mentioned light shielding part is made of a resin. By having the above mentioned light shielding part made of a resin, it can be formed easily by the wet process.

Moreover, the present invention provides a color filter comprising a transparent base material, a pixel part provided on the transparent base material in a predetermined pattern with a plurality of colors by an ink jet method, a light shielding part provided on the boundary part of the pixel part, and a decomposition removal layer capable of being decomposed and removed by the photocatalyst, provided for forming the pixel part or the light shielding part.

According to the present invention, since the decomposition removal layer capable of being decomposed and removed by the photocatalyst is provided to form the above mentioned pixel part or the above mentioned light shielding part, a highly sophisticated pattern can be formed, and a color filter to be manufactured easily can be provided.

Moreover, the present invention provides a color filter comprising a transparent base material, a pixel part provided on the transparent base material in a predetermined pattern with a plurality of colors by the ink jet method, a light shielding part provided on the boundary part of the pixel part, and a decomposition removal layer capable of being decomposed and removed by the function of the photocatalyst formed on the light shielding part. Since the decomposition removal layer, having a contact angle to a liquid larger than that on the transparent base material, is formed on the above mentioned light shielding part, the ink color mixture or the like can be prevented at the time of forming a color filter so that a color filter having a highly sophisticated pattern can be provided.

The present invention provides a liquid crystal display comprising a color filter manufactured by any one of the above mentioned method for manufacturing a color filter, a substrate facing the same, and a liquid crystal compound sealed in between the both substrates. The color filter manufactured by the above mentioned methods for manufacturing a color filter has a highly sophisticated pattern and it is capable of being manufactured at a low cost, a highly sophisticated liquid crystal display can be provided at a low cost by using the color filter.

BRIEF DESCRIPTION OF THE DRAWINGS

FIGS. 2A and 2B are schematic cross sectional views showing an example of a photocatalyst containing layer side substrate used in the present invention.

FIGS. 12A, 12B, 12C, and 12D are process diagrams for explaining a fifth embodiment of a method for manufacturing a color filter according to the present invention.

FIGS. 17A, 17B, 17C, 17D, 17E, and 17F are process diagrams for explaining an eighth embodiment of a method for manufacturing a color filter according to the present invention.

DESCRIPTION OF THE PREFERRED EMBODIMENTS

The present invention relates to a method for manufacturing a color filter, a color filter, and a color liquid crystal display. Hereinafter, each will be explained.

A. Method for Manufacturing a Color Filter

The methods for manufacturing a color filter according to the present invention include 9 embodiments. Hereinafter, each will be explained.

1. First Embodiment

A first embodiment of a method for manufacturing a color filter according to the present invention is a method comprising:

(1) forming a light shielding part on a transparent base material;
(2) forming a wettability changeable layer, which a wettability changes by a function of a photocatalyst, on a surface of the transparent base material on a side which the light shielding part is formed;
(3) placing a photocatalyst containing layer of a photocatalyst containing layer side substrate, which is the photocatalyst containing layer containing a photocatalyst formed on a base member, and the wettability changeable layer with a gap of 200 µm or less, and irradiating an energy from a predetermined direction to form a pixel part forming part, in a pattern, comprising a lyophilic area where the contact angle to a liquid is lowered compared with a state before the energy irradiation to the wettability changeable layer; and
(4) coloring the pixel part forming part by an ink jet method so as to form a pixel part.

Figure 1A:
FIGS. 1A, 1B, 1C, 1D, and 1E are process diagrams for explaining a first embodiment of a method for manufacturing a color filter according to the present invention.
Figure 1B:
Figure 1C:
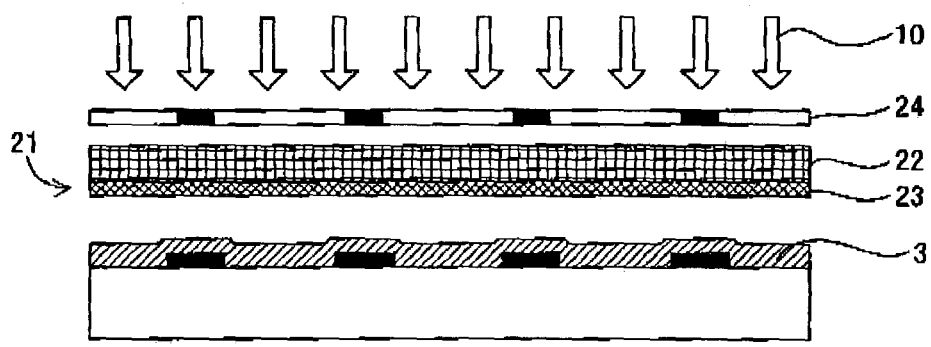
Figure 1D:
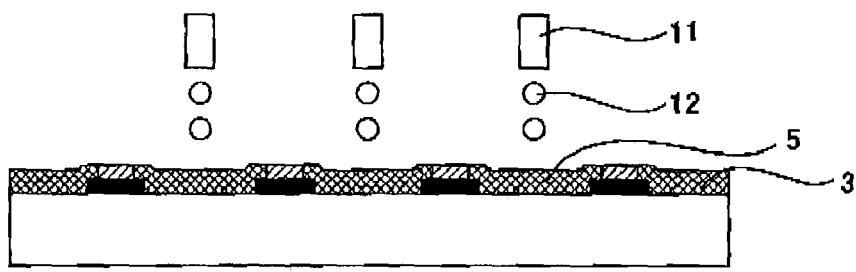
Figure 1E:
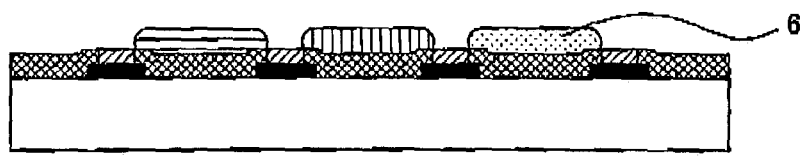

In this embodiment, as shown in FIGS. 1A, 1B, 1C, 1D, and 1E as an example, alight shielding part 2 is formed on a transparent base material 1 (FIG. 1A), a wettability changeable layer 3 is formed on the surface, and a color filter substrate 4 is prepared (FIG. 1B). Next, a photocatalyst containing layer 23, formed on a base member 22 of a photocatalyst containing layer side substrate 21, is placed with a certain gap to the above mentioned wettability changeable layer 3. Then, with a photomask 24 placed on the base member 22 side of the photocatalyst containing layer side substrate 21, an energy 10 is irradiated in a pattern (FIG. 1C). Thereby, a pattern which the wettability is changed is formed in a pixel part forming part 5 on the surface of the above mentioned wettability changeable layer 3 (FIG. 1D). Thereafter, by taking out the photocatalyst containing layer side substrate 21, and coloring the pixel part forming part 5 with a pixel part forming ink 12 by an ink jet apparatus 11 (FIG. 1D), a pixel part 6 is formed (FIG. 1E).

Thereafter, these processes will be explained separately. A color filter substrate in this embodiment denotes a substrate on which a color filter is formed, and thus it denotes an intermediate product before completing a color filter.

(Process for Forming a Light Shielding Part)

First, a process for forming a light shielding part will be explained. As the light shielding part in this embodiment, for example, as shown in FIG. 1A, the light shielding part 2 is formed on the transparent base material 1 by a conventional method. The transparent base material and the light shielding part to be used in the light shielding part forming process in this embodiment as mentioned above will be explained hereafter.

As it is shown in FIGS. 1A, 1B, 1C, 1D, and 1E as an example, in the transparent base material in this embodiment, the light shielding part 2 and the wettability changeable layer 3 to be described later are provided on the transparent base material 1. The transparent base material is not particularly limited as long as it is one conventionally used for a color filter. For example, a transparent rigid material without flexibility such as a quartz glass, a pyrex (registered trademark), and a synthetic quartz plate, or a transparent flexible material having flexibility such as a transparent resin film and an optical resin plate can be used. Among them, since the 7059 glass manufactured by Corning Incorporated is a material having a small thermal expansion coefficient, the excellent in size stability and in workability at a high temperature heating process, and it is a non alkaline glass not containing an alkaline component in the glass, it is particularly suitable for a color filter for a color liquid crystal display by an active matrix method. In this embodiment, a transparent one is generally used as the transparent base material, however, a reflective base material or abase material colored in white can be used as well. Moreover, for transparent base material, those with a surface process for preventing alkaline elution, providing a gas barrier property, or for other purposes applied can be used as needed.

In this embodiment, the method for manufacturing the light shielding part on the above mentioned transparent base material is not particularly limited. For example, a method of forming a metal thin film of a chromium or the like by about 1,000 to 2,000 Å thickness by a sputtering method, a vacuum deposition method, or the like, and patterning the thin film can be presented.

Moreover, the above mentioned light shielding part may be a layer containing light shielding particles of carbon fine particles, a metal oxide, an inorganic pigment, an organic pigment, or the like in a resin binder. In this embodiment, the resin light shielding part is preferable. The thickness of the resin light shielding part can be set in a range of 0.5 to 10 µm. In general, the thickness can be provided thicker than the case of using a metal thin film.

Moreover, as the resin binder to be used, one kind or a mixture of two or more kinds of resins such as a polyimide resin, an acrylic resin, an epoxy resin, a polyacrylic amide, a polyvinyl alcohol, a gelatin, a casein, and a cellulose, or a photo sensitive resin, an O/W emulsion type resin composition, such as an emulsion of a reactive silicone, or the like can be used. As the patterning method for the resin light shielding part, a commonly used method such as a photolithography method, a printing method, or the like can be used.

In this embodiment, the resin light shielding part is preferable since it can be formed easily by the wet process.

(Process for Forming Wettability Changeable Layer)

Next, the process for forming the wettability changeable layer will be explained. In the process of forming wettability changeable layer in this embodiment, for example, as shown in FIG. 1B, a wettability changeable layer 3 is formed on the surface of the color filter substrate 2 formed in the above mentioned light shielding part 2 forming process. Hereinafter, the wettability changeable layer will be explained.

The wettability changeable layer in this embodiment may be any layer as long as it is a layer which the wettability changes by the function of a photocatalyst.

In this embodiment, the wettability changeable layer may be one formed by a dry process, that is, the vacuum deposition method or the like. Moreover, it may be one formed by a wet process, that is, a method such as the spin coating method, the dip coating method, or the like.

Here, as to the wettability change in this embodiment, a wettability changeable layer, having a large contact angle to a liquid before the energy irradiation so as to be changed to have a small contact angle to a liquid after the energy irradiation, may be used. Moreover, in contrast, a wettability changeable layer may have a small contact angle to a liquid before the energy irradiation so as to be changed to have a large contact angle to a liquid after the energy irradiation. In this embodiment, in particular, a layer which the wettability is changed so as to have the contact angle to a liquid on the wettability changeable layer surface lowered by the function of the photocatalyst accompanied by the energy irradiation is preferable because a lyophilic area pattern having a small contact angle to a liquid can be formed easily.

Here, the lyophilic area is an area having a small contact angle to a liquid. Since the pixel part to be described later can be formed easily in the lyophilic area by the ink jet method, a color filter can be manufactured efficiently so that it is advantageous in terms of the cost. Moreover, the liquid repellent area is an area having a large contact angle to a liquid.

In this embodiment, in the case the contact angle of the area to a liquid is smaller than the contact angle to a liquid of the adjacent area by one degree or more, it is referred to as the lyophilic area, and in contrast, in the case the contact angle of the area to a liquid is larger than the contact angle to a liquid of the adjacent area by one degree or more, it is referred to as the liquid repellent area.

For the above mentioned wettability changeable layer, in the part without the energy irradiation, that is, the liquid repellent area, it is preferable that the contact angle to a liquid having a 40 mN/m surface tension is 10° or more, more preferably the contact angle to a liquid having a 30 mN/m surface tension is 10° or more, and particularly preferably the contact angle to a liquid having a 20 mN/m surface tension is 10° or more. Here, since the part without the energy irradiation is the part required to have the liquid repellent property in this embodiment, in the case the contact angle to a liquid is smaller than the above mentioned range, the liquid repellent property is insufficient so that a highly sophisticated pattern can hardly be formed, and thus it is not preferable.

Moreover, it is preferable that the above mentioned wettability changeable layer is a layer which becomes a lyophilic area by lowering the contact angle to a liquid by the energy irradiation to have the contact angle to a liquid having a 40 mN/m surface tension of 9° or less, more preferably the contact angle to a liquid having a 50 mN/m surface tension of 10° or less, and particularly preferably the contact angle to a liquid having a 60 mN/m surface tension of 10° or less. In the case the contact angle to a liquid in the part with the energy irradiation, that is, in the lyophilic area is higher than the above mentioned range, spreading of the ink for coloring the pixel part in this part may be poor so that a problem of the color omission, the color irregularity, or the like may be generated.

The contact angle to a liquid here is a value obtained from the results or a graph of the results of measuring (30 seconds after dropping liquid droplets form a micro syringe) the contact angle to liquids having various surface tensions using a contact angle measuring device (CA-Z type manufactured by Kyowa Interface Science, Co., Ltd.). Moreover, at the time of the measurement, as the liquids having the various surface tensions, wetting index standard solutions manufactured by Junsei Chemical Co., Ltd. were used.

Moreover, in the case the above mentioned wettability changeable layer is used in this embodiment, it is also possible that the wettability changeable layer contains a fluorine, and furthermore, the wettability changeable layer is formed such that when an energy is irradiated to the wettability changeable containing layer, the fluorine content of the wettability changeable layer surface is lowered, compared to the state before the energy irradiation, by the function of the above mentioned photocatalyst.

In the wettability changeable layer having such characteristics, by the energy irradiation, a pattern comprising a part with a small fluorine content can be formed easily. Here, since the fluorine has an extremely low surface energy, the surface of a substance containing a large amount of a fluorine has a smaller critical surface tension. Therefore, the critical surface tension of a part with a small fluorine content is larger than the critical surface tension of the surface of a part with a large fluorine content. That is, it denotes that the part with a small fluorine content becomes a lyophilic area compared with the part with a large fluorine content. Therefore, by forming a pattern comprising a part with a small fluorine content compared with the surface of the periphery, a pattern of a lyophilic area is formed in a liquid repellent area.

Therefore, in the case such a wettability changeable layer is used, since a lyophilic area pattern can be formed easily in the liquid repellent area by the energy irradiation, the pixel part can be easily formed only in the lyophilic area so that a color filter with a good quality can be provided at a low cost.

As to the fluorine content in the wettability changeable layer containing a fluorine as mentioned above, the fluorine content in the lyophilic area having a low fluorine content formed by the energy irradiation is 10 or less based on the fluorine content in the area without the energy irradiation as 100, it is more preferably 5 or less, and particularly preferably 1 or less.

By setting within the above mentioned range, a large difference of the wettability between the energy irradiated part and the unirradiated part can be generated. Therefore, by forming a pixel part or a light shielding part on such wettability changeable layer, the pixel part or the light shielding part can be formed accurately only on the lyophilic area, where the fluorine content lowered, so that a color filter can be obtained accurately. The lowering ratio is based on the weight.

As to the measurement of the fluorine content in the wettability changeable layer, various methods commonly executed can be used, and it is not particularly limited as long as it is a method capable of measuring the fluorine amount on the surface quantitatively, for example, the X-ray photoelectron spectroscopy, the ESCA (it is also referred to as the electron spectroscopy for chemical analysis), the fluorescent X ray analysis method, and the mass analysis method.

As the material used for such a wettability changeable layer, it is not particularly limited as long as it is a material which the wettability of the above mentioned wettability changeable layer, that is, the wettability is changed by the photocatalyst in the photocatalyst containing layer to be contacted, by the energy irradiation, and it has a principal chain to be hardly deteriorated or decomposed by the function of the photocatalyst. For example, (1) an organo polysiloxane which provides high strength by hydrolyzing or polycondensating a chloro or alkoxy silane, or the like by the sol gel reaction or the like, (2) an organo polysiloxane such as an organo polysiloxane obtained by cross-linking a reactive silicone having the excellent water repellent property or oil repellent property, or the like can be presented.

In the above mentioned case (1), it is preferably an organo polysiloxane which is a hydrolyzed condensate or a co-hydrolyzed condensate of one kind or two or more kinds of silicon compounds represented by the general formula:

$Y_nSiX_{(4-n)}$ (Here, Y is an alkyl group, a fluoro alkyl group, a vinyl group, an amino group, a phenyl group, an epoxy group or an organic group containing them, X is an alkoxyl group, or a halogen, and n is an integer from 0 to 3.). Here, the number of atoms of the entire organic group represented by Y is preferably in a range of 1 to 20. Moreover, the alkoxy group represented by X is preferably a methoxy group, an ethoxy group, a propoxy group, or a butoxy group.

Moreover, an organo polysiloxane containing a fluoro alkyl group can be used particularly preferably. Specifically, a hydrolyzed condensate or a co-hydrolyzed condensate of one kind or two or more kinds of the following fluoro alkyl silanes can be presented. Those generally known as a fluorine based silane coupling agent can be used.

$CF_3(CF_2)_3CH_2CH_2Si(OCH_3)_3$;
$CF_3(CF_2)_5CH_2CH_2Si(OCH_3)_3$;
$CF_3(CF_2)_7CH_2CH_2Si(OCH_3)_3$;
$CF_3(CF_2)_9CH_2CH_2Si(OCH_3)_3$;
$(CF_3)_2CF(CF_2)_4CH_2CH_2Si(OCH_3)_3$;
$(CF_3)_2CF(CF_2)_6CH_2CH_2Si(OCH_3)_3$;
$(CF_3)_2CF(CF_2)_8CH_2CH_2Si(OCH_3)_3$;
$CF_3(C_6H_4)C_2H_4Si(OCH_3)_3$;
$CF_3(CF_2)_3(C_6H_4)C_2H_4Si(OCH_3)_3$;
$CF_3(CF_2)_5(C_6H_4)C_2H_4Si(OCH_3)_3$;
$CF_3(CF_2)_7(C_6H_4)C_2H_4Si(OCH_3)_3$;
$CF_3(CF_2)_3CH_2CH_2SiCH_3(OCH_3)_2$;
$CF_3(CF_2)_5CH_2CH_2SiCH_3(OCH_3)_2$;
$CF_3(CF_2)_7CH_2CH_2SiCH_3(OCH_3)_2$;
$CF_3(CF_2)_9CH_2CH_2SiCH_3(OCH_3)_2$;
$(CF_3)_2CF(CF_2)_4CH_2CH_2SiCH_3(OCH_3)_2$;
$(CF_3)_2CF(CF_2)_6CH_2CH_2SiCH_3(OCH_3)_2$;
$(CF_3)_2CF(CF_2)_8CH_2CH_2SiCH_3(OCH_3)_2$;
$CF_3(C_6H_4)C_2H_4SiCH_3(OCH_3)_2$;
$CF_3(CF_2)_3(C_6H_4)C_2H_4SiCH_3(OCH_3)_2$;
$CF_3(CF_2)_5(C_6H_4)C_2H_4SiCH_3(OCH_3)_2$;
$CF_3(CF_2)_7(C_6H_4)C_2H_4SiCH_3(OCH_3)_2$;
$CF_3(CF_2)_3CH_2CH_2Si(OCH_2CH_3)_3$;
$CF_3(CF_2)_5CH_2CH_2Si(OCH_2CH_3)_3$;
$CF_3(CF_2)_7CH_2CH_2Si(OCH_2CH_3)_3$;
$CF_3(CF_2)_9CH_2CH_2Si(OCH_2CH_3)_3$; and
$CF_3(CF_2)_7SO_2N(C_2H_5)C_2H_4CH_2Si(OCH_3)_3$.

By using the polysiloxane containing the above mentioned fluoro alkyl group as a binder, the liquid repellent property of the energy unirradiated part of the wettability changeable layer can be improved dramatically so that, for example, a function of preventing adhesion of an ink for coloring the pixel part can be realized.

Moreover, as the above mentioned reactive silicone of the above mentioned (2), compounds having a skeleton represented by the following general formula can be presented.

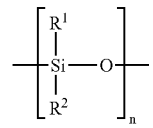

In the above general formula, n is an integer of 2 or more, $R^1$, $R^2$ each are a substituted or non substituted alkyl, alkenyl, aryl or cyano alkyl group having 1 to 10 carbon atoms, and 40% or less of the entirety based on the molar ratio is a vinyl, a phenyl, or a halogenated phenyl. Moreover, those having $R^1$, $R^2$ as a methyl group are preferable since the surface energy becomes smallest, and it is preferable that a methyl group accounts for 60% or more based on the molar ratio. Moreover, at least one reactive group such as a hydroxyl group is provided in a molecular chain at the chain end or the side chain.

Moreover, together with the above mentioned organo polysiloxane, a stable organo silicone compound not to have the cross-linking reaction such as a dimethyl polysiloxane can be mixed.

In this embodiment, various kinds of the materials such as an organo polysiloxane can be used for the wettability changeable layer accordingly. As mentioned above, it is effective that a fluorine is contained in the wettability changeable layer in terms of the wettability pattern formation. Therefore, it is preferable to form the wettability changeable layer with a material which is hardly deteriorated or decomposed by the function of a photocatalyst, specifically an organo polysiloxane material, containing a fluorine.

As a method of making a fluorine to be contained in the organo polysiloxane material, a method of bonding a fluorine compound to a principal agent, which generally has a high bonding energy, by relatively weak bonding energy, a method of mixing a fluorine compound which was bonded by a relatively weak bonding energy, into the wettability changeable layer, or the like can be listed. By introducing a fluorine by such methods, in the case the energy is irradiated, the fluorine bonding portion having a relatively weak bonding energy is first decomposed, and thereby the fluorine can be removed from the wettability changeable layer.

As the above mentioned first method, that is, as a method of bonding a fluorine compound to a binder, having high bonding energy, by a relatively weak bonding energy, a method of introducing a fluoro alkyl group to the above mentioned organo polysiloxane as a substituent, or the like can be presented.

For example, as a method for obtaining an organo polysiloxane, as mentioned above as (1), an organo polysiloxane capable of providing high strength can be obtained by the hydrolyzing or the polycondensating of a chloro, alkoxy silane, or the like by the sol gel reaction or the like. Here, in this method, as mentioned above, an organo polysiloxane is obtained by the hydrolysis condensating or the co-hydrolysis condensating of one kind or two or more kinds of silicon compounds represented by the general formula:

$Y_nSiX_{(4-n)}$ (Here, Y is an alkyl group, a fluoro alkyl group, a vinyl group, an amino group, a phenyl group, an epoxy group or an organic group containing them, X is an alkoxyl group, or a halogen, and n is an integer from 0 to 3.). In the general formula, by the synthesis using a silicon compound having a fluoro alkyl group as the substituent Y, an organo polysiloxane having a fluoro alkyl group as a substituent can be obtained. In the case such an organo polysiloxane having a fluoro alkyl group as the substituent is used as the binder, at the time energy is irradiated, since the carbon bonding portion of the fluoro alkyl group is decomposed by the function of the photocatalyst in the photocatalyst containing layer to be contacted, the fluorine content of the part, of the photocatalyst containing layer where the energy is irradiated, can be reduced.

As the silicon compound having a fluoro alkyl group used at the time, it is not particularly limited as long as it has a fluoro alkyl group, and a silicon compound having at least one fluoro alkyl group, with the fluoro alkyl group having 4 to 30 carbon atoms, preferably 6 to 20 carbon atoms, and particularly preferably 6 to 16 carbon atoms can be used preferably. The specific examples of such a silicon compound are as mentioned above. In particular, the above mentioned silicon compound having a fluoro alkyl group having 6 to 8 carbon atoms, that is, a fluoro alkyl silane is preferable.

In this embodiment, it is possible to use such a silicon compound having a fluoro alkyl group as a mixture with the above mentioned silicon compound not having a fluoro alkyl group, and use the co-hydrolyzed condensate of them as the above mentioned organo polysiloxane, or to use one kind or two or more kinds of the silicon compounds having a fluoro alkyl group and use the hydrolyzed condensate or the co-hydrolyzed condensate thereof as the above mentioned organo polysiloxane.

As for an organo polysiloxane having a fluoro alkyl group accordingly obtained, among the silicon compound comprising the organo polysiloxane, it is preferable that the above mentioned silicon compound having a fluoro alkyl group is contained by 0.01 mole % or more, and preferably by 0.1 mole % or more.

By containing the fluoro alkyl group to about this degree, the liquid repellent property on the wettability changeable layer can be improved so that the wettability difference to the part provided as the lyophilic area by the energy irradiation can be made larger.

Moreover, in the above mentioned method (2), an organo polysiloxane is obtained by cross-linking of a reactive silicone having the excellent liquid repellent property. Also in this case, a fluorine can be contained in the wettability changeable layer by having either one or both of $R^1$, $R^2$, in the above mentioned general formula, as a substituent containing a fluorine such as a fluoro alkyl group. Moreover, in the case energy is irradiated, since the fluoro alkyl group having bonding energy lower than that of the siloxane bond is decomposed, the fluorine content in the surface of the wettability changeable layer can be lowered by the energy irradiation.

In contrast, in the latter case, that is, as a method for introducing a fluorine compound bonded by energy lower than the bonding energy of the binder, in the case of introducing a low molecular weight fluorine compound, for example, a method of mixing a fluorine based surfactant or the like can be presented. Moreover, as a method for introducing a high molecular weight fluorine compound, a method of mixing a fluorine resin having high compatibility with the binder resin, or the like can be presented.

For the wettability changeable layer in this embodiment, a surfactant can further be contained. Specifically, hydrocarbon based ones of the NIKKOL BL, BC, BO, BB series manufactured by Nikko Chemicals Co., Ltd., fluorine based or silicone based nonionic surfactants such as ZONYL FSN, FSO manufactured by Dupont, SURFLON S-141, 145 manufactured by Asahi Glass Company, MAGAFAKKU F-141, 144 manufactured by Dainippon Ink and Chemicals, Incorporated, FUTAGENT F-200, F251 manufactured by Neos Corp., UNIDYNE DS-401, 402 manufactured by Daikin Industries, Ltd., and FLUORAD FC-170, 176 manufactured by 3M, can be presented. Moreover, cationic surfactants, anionic surfactants, amphoteric surfactants can be used as well.

Moreover, for the wettability changeable layer, in addition to the above mentioned surfactants, oligomers and polymers, such as a polyvinyl alcohol, an unsaturated polyester, an acrylic resin, a polyethylene, a diallyl phthalate, an ethylene propylene diene monomer, an epoxy resin, a phenol resin, a polyurethane, a melamine resin, a polycarbonate, a polyvinyl chloride, a polyamide, a polyimide, a styrene butadiene rubber, a chloroprene rubber, a polypropylene, a polybutylene, a polystyrene, a polyvinyl acetate, a polyester, a polybutadiene, a polybenzimidazol, a polyacrylic nitrile, an epichlorohydrine, a polysulfide, a polyisoprene, and the like can be contained.

Such a wettability changeable layer can be formed by dispersing the above mentioned components in a solvent, as needed with other additives, so as to prepare a coating solution, and coating the coating solution onto a substrate. As the solvent to be used, alcohol based organic solvents such as an ethanol, and an isopropanol are preferable. The coating can be carried out by a known coating method such as spin coating, spray coating, dip coating, roll coating and bead coating. In the case an ultraviolet ray curing type component is contained, the wettability changeable layer can be formed by carrying out a curing process by irradiating an ultraviolet ray.

In this embodiment, the thickness of the wettability changeable layer is preferably from 0.001 μm to 1 μm in terms of the wettability change rate or the like by the photocatalyst, and particularly preferably it is in a range of 0.01 to 0.1 μm.

In this embodiment, by using the wettability changeable layer of the above mentioned components, the wettability of the energy irradiated part can be changed so as to be lyophilic, by using the function of the oxidation, the decomposition, or the like of the organic group or the additives which is a part of the above mentioned components by the function of the photocatalyst in the photocatalyst containing layer to be contacted so as to generate a large difference of the wettability to the energy unirradiated part. Therefore, by improving the receptivity (lyophilic property) and the repulsion property (liquid repellent property) to an ink or the like for coloring the pixel part, a color filter with a good quality and advantageous in terms of the cost can be obtained.

The wettability changeable layer used in this embodiment is not particularly limited as long as it is a layer which the wettability is changed by the function of a photocatalyst as mentioned above, but it is particularly preferably a layer not containing a photocatalyst. In the case a photocatalyst is not contained in the wettability changeable layer accordingly, it can be used for a color filter thereafter without the concern of the influence by the photocatalyst by the time passage so that it can be used without problem generation over a long time.

(Process for Forming a Pixel Part Forming Part Comprising a Lyophilic Area in a Pattern)

Next, the process for forming a pattern of the pixel part forming part comprising a lyophilic area in this embodiment will be explained. As shown in FIG. 1C as an example, this process is a process of placing a photocatalyst containing layer 23 of a photocatalyst containing layer side substrate 21 and the wettability changeable layer 3 with a gap of 200 μm or less therebetween, and irradiating an energy 10 along the pattern of the pixel part forming part, to provide a pattern of the lyophilic area which the wettability of the pixel part forming part 5, on the surface of the above mentioned wettability changeable layer, is changed as shown in FIG. 1D. In the above mentioned process, first, the photocatalyst containing layer substrate is prepared, then, the photocatalyst containing layer substrate is placed with a gap to the above mentioned wettability changeable layer, and then the energy is irradiated. Hereafter, these processes will be explained.

a. Preparation of the Photocatalyst Containing Layer Substrate

First, the photocatalyst containing layer side substrate used in this embodiment will be explained.

The photocatalyst containing layer side substrate comprises a base member, and a photocatalyst containing layer containing a photocatalyst formed on the base member. Such a photocatalyst containing layer side substrate comprises at least the photocatalyst containing layer and the base member. In general, it is formed of a thin film-like photocatalyst containing layer formed on the base member by a predetermined method. Moreover, as the photocatalyst containing layer side substrate, those having a light shielding part formed in a pattern can be used as well. Hereinafter, each constitution will be explained.

(i) Photocatalyst Containing Layer

The photocatalyst containing layer used in this embodiment is not particularly limited as long as it has a configuration in which the photocatalyst in the photocatalyst containing layer changes the wettability of the subject wettability changeable layer. It may comprise a photocatalyst and a binder, or it may be a film formed with a photocatalyst alone. Moreover, the wettability of its surface may either be lyophilic or liquid repellent.

Figure 3:
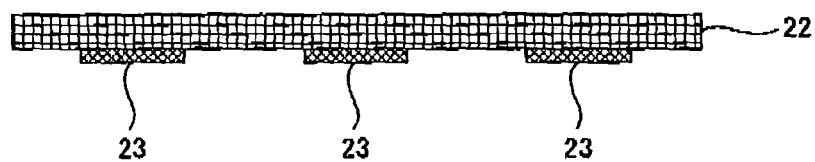
FIG. 3 is a schematic cross sectional view showing another example of a photocatalyst containing layer side substrate used in the present invention.

The photocatalyst containing layer used in this embodiment may have the photocatalyst containing layer 23 formed on the entire surface of the base member 22 of the photocatalyst containing layer side substrate 21, as shown in FIG. 2A for example, or it may have the photocatalyst containing layer 23 formed in a pattern on the base member 22 of the photocatalyst containing layer side substrate 21, as shown in FIG. 3 for example.

By accordingly forming the photocatalyst containing layer in a pattern, as it will be explained in the energy irradiating process described later, at the time of irradiating the energy with the photocatalyst containing layer and the wettability changeable layer placed with a predetermined gap provided therebetween, the pattern irradiation using a photomask or the like is not needed, so that a pattern which the wettability is changed can be formed on the wettability changeable layer by the irradiation to the entire surface.

The method for patterning the photocatalyst processing layer is not particularly limited, and for example, it can be carried out by the photolithography method or the like.

Moreover, since the wettability only in the part on the wettability changeable layer actually facing the photocatalyst containing layer is changed, as to the energy irradiation direction, the energy may be irradiated from any direction as long as it is irradiated to the part where the above mentioned photocatalyst containing layer and the wettability changeable layer face to each other, and furthermore, the energy to be irradiated is not limited to parallel ones such as a parallel light beam, and thus it is advantageous.

Although the function mechanism of the photocatalyst represented by a titanium dioxide, which is described later, in the photocatalyst containing layer is not clear, it is considered that a carrier produced by the light beam irradiation influences the chemical structure of an organic substance by the direct reaction with a compound in the vicinity, or by the active oxygen specie produced in the presence of an oxygen and water. In this embodiment, it is considered that the carrier influences the compound in the wettability changeable layer placed in the vicinity of the photocatalyst containing layer.

As the photocatalyst used in this embodiment, those known as photo semiconductors, such as a titanium dioxide ($TiO_2$), a zinc oxide (ZnO), a tin oxide ($SnO_2$), a strontium titanate ($SrTiO_3$), tungsten oxide ($WO_3$), bismuth oxide ($Bi_2O_3$), and an iron oxide ($Fe_2O_3$) can be presented, and one kind or two or more kinds as a mixture can be selected and used from them.

In this embodiment, in particular, a titanium dioxide can be used preferably since it has high band gap energy, it is chemically stable without the toxicity, and it can be obtained easily. There are an anatase type and a rutile type in the titanium dioxides, and either can be used in this embodiment, and the anatase type titanium dioxide is preferable. The excitation wavelength of the anatase type titanium dioxide is 380 nm or less.

As the anatase type titanium dioxide, for example, a hydrochloric acid peptization type anatase type titania sol (STS-02 (average particle size 7 nm) manufactured by Ishihara Sangyo Kaisha, Ltd., ST-K01 manufactured by Ishihara Sangyo Kaisha, Ltd.), a nitric acid peptization type anatase type titania sol (TA-15 (average particle size 12 nm) manufactured by Nissan Chemical Industries, Ltd.), or the like can be presented.

With a smaller particle size of the photocatalyst, the photocatalyst reaction can be generated effectively, and thus it is preferable. An average particle size of 50 nm or less is preferable, and use of a photocatalyst of 20 nm or less is particularly preferable.

The photocatalyst containing layer in this embodiment may be one formed with the photocatalyst alone, or one formed as a mixture with a binder, as mentioned above.

In the case of the photocatalyst containing layer formed only with the photocatalyst, the efficiency in terms of the wettability change on the wettability changeable layer is improved so that it is advantageous in terms of the cost, such as the processing time reduction. In contrast, in the case of the photocatalyst containing layer formed with the photocatalyst and the binder, it is advantageous in terms of the formation easiness of the photocatalyst containing layer.

As the method for forming the photocatalyst containing layer formed only with the photocatalyst, for example, a sputtering method, a CVD method, and a method using a vacuum film formation method, such as a vacuum deposition method, can be presented. By forming the photocatalyst containing layer by the vacuum film formation method, a photocatalyst containing layer containing only a photocatalyst can be provided as an even film, and thereby, the wettability on the wettability changeable layer can be changed evenly. Moreover, since it is formed only with the photocatalyst, compared with the case of using the binder, the wettability on the wettability changeable layer can be changed efficiently.

Moreover, as the method for forming the photocatalyst containing layer formed only with the photocatalyst, for example, in the case the photocatalyst is a titanium dioxide, a method of forming an amorphous titania on the base member, and changing the phase to a crystalline titania by baking, or the like can be presented. The amorphous titania used here can be obtained by, for example, hydrolyzing or dehydration condensating of a inorganic salt of titanium such as a titanium tetrachloride, and a titanium sulfide, or hydrolyzing, or dehydration condensating under the existence of an acid of an organic titanium compound such as a tetraethoxy titanium, a tetraisopropoxy titanium, a tetra-n-propoxy titanium, a tetrabutoxy titanium, and a tetramethoxy titanium. Next, by baking at 400° C. to 500° C., it can be denatured to an anatase type titania, and by baking at 600° C. to 700° C., it can be denatured to a rutile type titania.

Moreover, in the case of using a binder, it is preferable that the principal skeleton of the binder has a high bonding energy so as not to be decomposed by the photo excitation of the above mentioned photocatalyst. For example, an organo polysiloxane or the like can be presented.

In the case an organo polysiloxane is used as the binder accordingly, the above mentioned photocatalyst containing layer can be formed by dispersing the photocatalyst and the organo polysiloxane as the binder in a solvent as needed with the other additives so as to prepare a coating solution, and coating the coating solution on the base member. As the solvent to be used, alcohol based organic solvents such as an ethanol, and an isopropanol are preferable. The coating can be carried out by a known coating method such as spin coating, spray coating, dip coating, roll coating and bead coating. In the case an ultraviolet ray curing type component is contained in the binder, the photocatalyst containing layer can be formed by carrying out a curing process by irradiating an ultraviolet ray.

Moreover, as the binder, an amorphous silica precursor can be used. The amorphous silica precursor is represented by the general formula $SiX_4$. X is preferably a silicon compound such as a halogen, a methoxy group, an ethoxy group, an acetyl group, or the like, a silanol as a hydrolysis product thereof, or a polysiloxane having a 3,000 or less average molecular weight.

Specifically, a tetraethoxy silane, a tetraisopropoxy silane, a tetra-n-propoxy silane, a tetrabutoxy silane, a tetramethoxy silane, or the like can be presented. Moreover, in this case, by homogeneously dispersing the precursor of an amorphous silica and the photocatalyst particles in a nonaqueous based solvent, forming a silanol on the base member by the hydrolyzing by the moisture content in the air, and carrying out the dehydration polycondensation at an ordinary temperature, the photocatalyst containing layer can be formed. By carrying out the dehydration polycondensation of a silanol at 100° C. or more, the polymerization degree of the silanol is increased so that the film surface strength can be improved. Moreover, the bonding agents can be used alone or as a mixture of two or more kinds.

The photocatalyst content in the photocatalyst containing layer in the case of using a binder can be set in a range of 5 to 60% by weight, preferably 20 to 40% by weight. Moreover, the thickness of the photocatalyst containing layer is preferably in a range of 0.05 to 10 µm.

Moreover, for the photocatalyst containing layer, in addition to the above mentioned photocatalyst and binder, a surfactant can be contained. Specifically, hydrocarbon based ones of the NIKKOL BL, BC, BO, BB series manufactured by Nikko Chemicals Co., Ltd., fluorine based or silicone based nonionic surfactants such as ZONYLFSN, FSO manufactured by DuPont, SURFLON S-141, 145 manufactured by Asahi Glass Company, MAGAFAKKU F-141, 144 manufactured by Dainippon Ink and Chemicals, Incorporated, FUTAGENT F-200, F251 manufactured by Neos Corp., UNIDYNE DS-401, 402 manufactured by Daikin Industries, Ltd., and FLUORAD FC-170, 176 manufactured by 3M, can be presented. Moreover, cationic surfactants, anionic surfactants, amphoteric surfactants can be used as well.

Moreover, for the photocatalyst containing layer, in addition to the above mentioned surfactants, oligomers and polymers, such as a polyvinyl alcohol, an unsaturated polyester, an acrylic resin, a polyethylene, a diallyl phthalate, an ethylene propylene diene monomer, an epoxy resin, a phenol resin, a polyurethane, a melamine resin, a polycarbonate, a polyvinyl chloride, a polyamide, a polyimide, a styrelene butadiene rubber, a chloroprene rubber, a polypropylene, a polybutylene, a polystyrene, a polyvinyl acetate, a polyester, a polybutadiene, a polybenzimidazol, a polyacrylic nitrile, an epichlorohydrine, a polysulfide, a polyisoprene, and the like can be contained.

(ii) Base Member

In this embodiment, as shown in FIG. 2A, the photocatalyst containing layer side substrate 21 comprises at least the base member 22 and the photocatalyst containing layer 23 formed on the base member 22. At the time, the material used for forming the base member is selected optionally according to the energy irradiation direction in the energy irradiating process to be described later, whether the color filter to be obtained requires the transparency, or the like.

In the case of preliminarily forming the photocatalyst containing layer side light shielding part in a predetermined pattern on the photocatalyst containing layer side substrate as it will be explained later, and forming a pattern using the photocatalyst containing layer side light shielding part, or in the case of forming a pattern using a photomask 24 on the photocatalyst containing layer side substrate side as shown in FIG. 2B for the pattern formation, it is necessary to place the photomask 24 on the photocatalyst containing layer side substrate 23 side, and irradiate an energy from the photocatalyst containing layer side substrate side. In this case, the base member needs to have the transparency.

In contrast, it is also possible to irradiate the energy with the photomask placed on the color filter substrate side. Moreover, in the case the light shielding part is formed preliminarily on the color filter substrate, it is possible to irradiate the energy from the color filter substrate side. In this case, the base member transparency is not particularly needed.

Moreover, the base member used in this embodiment may be one having the flexibility, such as a resin film, or one not having the flexibility, such as a glass substrate. This can be selected optionally according to the method for irradiating energy in the energy irradiating process to be described later.

Accordingly, although the material of the base member used for the photocatalyst containing layer side substrate in this embodiment is not particularly limited, since the photocatalyst containing layer side substrate is used repeatedly in this embodiment, a material having predetermined strength, and the surface having a good adhesiveness to the photocatalyst containing layer can be used preferably.

Specifically, a glass, a ceramic, a metal, a plastic, or the like can be presented.

For improving the adhesiveness of the base member surface and the photocatalyst containing layer, an anchor layer may be formed on the base member. As the anchor layer, for example, a silane based or titanium based coupling agent or the like can be presented.

(iii) Photocatalyst Containing Layer Side Light Shielding Part

As the photocatalyst containing layer side substrate used in this embodiment, one having the photocatalyst containing layer side light shielding part formed in a pattern may be used. By using the photocatalyst containing layer side substrate having the photocatalyst containing layer side light shielding part accordingly, use of a photomask or execution of the drawing irradiation with a laser light beam is not needed at the time of the energy irradiation. Therefore, since positioning of the photocatalyst containing layer side substrate and the photomask is not needed, the process can be a simple process.

Moreover, since expensive equipment needed for the drawing irradiation is unnecessary, it is advantageous in terms of the cost.

The photocatalyst containing layer side substrate having the photocatalyst containing layer side light shielding part may be provided in the following two embodiments according to the position of forming the photocatalyst containing layer side light shielding part.

Figure 4:
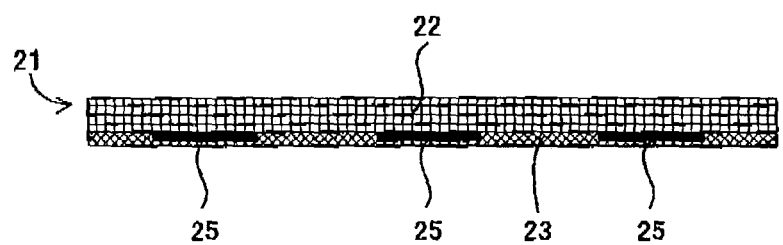
FIG. 4 is a schematic cross sectional view showing another example of a photocatalyst containing layer side substrate used in the present invention.
Figure 5:
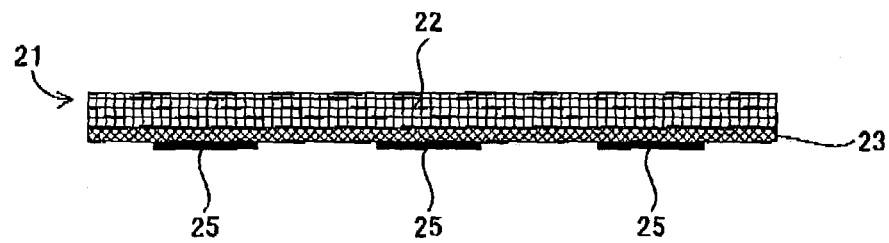
FIG. 5 is a schematic cross sectional view showing another example of a photocatalyst containing layer side substrate used in the present invention.

One of them is, as shown in FIG. 4, an embodiment of forming the photocatalyst containing layer side light shielding part 25 on the base member 22 of the photocatalyst containing layer side substrate 21, and forming the photocatalyst containing layer 23 on the photocatalyst containing layer side light shielding part 25. The other one is, as shown in FIG. 5, an embodiment of forming the photocatalyst containing layer 23 on the base member 22 of the photocatalyst containing layer side substrate 21, and forming the photocatalyst containing layer side light shielding part 25 thereon.

In either embodiment, compared with the case of using the photomask, since the photocatalyst containing layer side light shielding part is placed in the vicinity of the part where the above mentioned photocatalyst containing layer and the wettability changeable layer are placed with a gap, the influence by the energy scattering in the base member or the like can be reduced, and thus the energy pattern irradiation can be carried out extremely accurately.

Furthermore, in the embodiment of forming the photocatalyst containing layer side light shielding part on the above mentioned photocatalyst containing layer, by matching the film thickness of the photocatalyst containing layer side light shielding part with the width of the gap at the time of placing the photocatalyst containing layer and the wettability changeable layer with a certain gap, it is advantageous in that the above mentioned photocatalyst containing layer side light shielding part can be used also as a spacer for providing the above mentioned gap constantly.

That is, at the time of placing the above mentioned photocatalyst containing layer and the wettability changeable layer in a contacted state with a predetermined gap, by placing the above mentioned photocatalyst containing layer side light shielding part and the wettability changeable layer in a state contacted closely, the above mentioned predetermined gap can be provided accurately. Furthermore, by irradiating the energy from the photocatalyst containing layer side substrate in this state, a pattern can be formed accurately on the wettability changeable layer.

The method for forming the photocatalyst containing layer side light shielding part is not particularly limited, and thus it can be selected and used optionally according to the wettability of the formed surface of the photocatalyst containing layer side light shielding part, the needed shielding property to the energy, or the like.

Here, since the methos for forming and the material for the photocatalyst containing layer side light shielding part in this embodiment is same as the above mentioned light shielding part, explanation is omitted here. The thickness of the photocatalyst containing layer side light shielding part can be set in a range of 0.5 to 10 μm. As the method for patterning the resin photocatalyst containing layer side light shielding part, a commonly used method such as a photolithography method, a printing method, and the like can be used.

Although the two places of forming the photocatalyst containing layer side light shielding part, of between the base member and the photocatalyst containing layer, and on the photocatalyst containing layer surface have been explained in the above mentioned explanation, in addition thereto, an embodiment of forming the photocatalyst containing layer side light shielding part on the surface of the base member on the side which the photocatalyst containing layer is not formed, can be adopted as well. In this embodiment, for example, the case of adhering a photomask onto the surface to the detachable degree, or the like is conceivable, and it can be used preferably in the case of changing the color filters in a small lot.

(iv) Primer Layer

In this embodiment, in the case of forming the photocatalyst containing layer side light shielding part in a pattern on the base member as mentioned above, and forming the photocatalyst containing layer thereon to provide the photocatalyst containing layer side substrate, it is preferable to form a primer layer in between the above mentioned photocatalyst containing layer side light shielding part and the photocatalyst containing layer.

Although the effect and the function of the primer layer is not always clear, it is considered that by forming the primer layer in between the photocatalyst containing layer side light shielding part and the photocatalyst containing layer, the primer layer provides the function of preventing diffusion of the impurities from the opening part existing in the photocatalyst containing layer side light shielding part, or in between the photocatalyst containing layer side light shielding parts to be the factor of inhibiting the wettability change of the wettability changeable layer by the function of the photocatalyst, in particular, the residue generated at the time of patterning the photocatalyst containing layer side light shielding part, a metal, a metal ion, or the like. Therefore, by forming the primer layer, the wettability change process can proceed with a high sensitivity, and as a result, a pattern with a high resolution can be obtained.

In this embodiment, since the primer layer is for preventing the influence on the photocatalyst effect by the impurities existing not only on the photocatalyst containing layer side light shielding part but also in the opening part formed in between the photocatalyst containing layer side light shielding parts, it is preferable that the primer layer is formed on the entire surface of the photocatalyst containing layer side light shielding part including the opening part.

Figure 6:
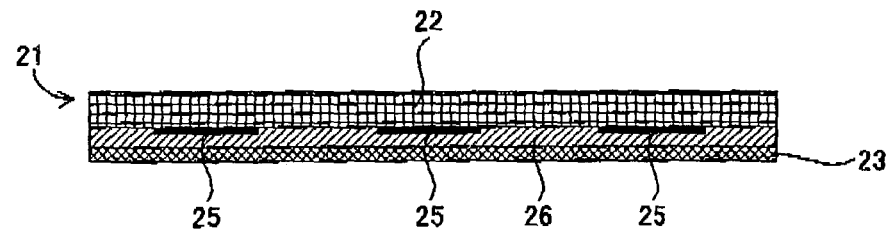
FIG. 6 is a schematic cross sectional view showing another example of a photocatalyst containing layer side substrate used in the present invention.

FIG. 6 shows an example of the photocatalyst containing layer side substrate with the primer layer formed. The primer layer 26 is formed on the surface of the base member 22 with the photocatalyst containing layer side light shielding part 25 of the photocatalyst containing layer side substrate 21 formed, on the side which photocatalyst containing layer side light shielding part 25 is formed, and the photocatalyst containing layer 23 is formed on the surface of the primer layer 26.

The primer layer in this embodiment is not particularly limited as long as it has a structure in which the primer layer is formed so that the photocatalyst containing layer side light shielding part of the photocatalyst containing layer side substrate and the photocatalyst containing layer do not contact to each other.

The material for constituting the primer layer is not particularly limited, but an inorganic material which is hardly decomposed by the function of the photocatalyst is preferable. Specifically, an amorphous silica can be presented. In the case of using the amorphous silica, the precursor of the amorphous silica is represented by the general formula $SiX_4$. X is preferably a silicon compound such as a halogen, a methoxy group, an ethoxy group, an acetyl group, or the like, a silanol as a hydrolysis product thereof, or a polysiloxane having a 3,000 or less average molecular weight.

Moreover, the film thickness of the primer layer is preferably in a range of 0.001 μm to 1 μm, and particularly preferably it is in a range of 0.001 μm to 0.1 μm.

b. Energy Irradiating Process

In this embodiment, next, after placing the photocatalyst containing layer and the wettability changeable layer with a gap of 200 μm or less, a process of irradiating an energy from a predetermined direction, is carried out. In this process, the photocatalyst containing layer and the wettability changeable layer may be adhered.

In this embodiment, in consideration of the extremely good pattern accuracy, the high photocatalyst sensitivity, and thus the good wettability change efficiency, it is particularly preferable that the above mentioned gap is provided in a range of 0.2 μm to 10 μm, more preferably in a range of 1 μm to 5 μm. The gap range is particularly effective for the color filter substrate of a small area which is capable of controlling the gap with the high accuracy.

In contrast, in the case of processing a color filter substrate of a large area, for example 300 mm×300 mm or more, it is extremely difficult to form the above mentioned minute gap in between the photocatalyst containing layer side substrate and the color filter substrate without being contacted. Therefore, in the case the color filter substrate is of a relatively large area, it is preferable to provide the above mentioned gap in a range of 10 to 100 μm, in particular, in a range of 50 to 75 μm. By setting the gap in the range, the problem of the pattern accuracy decline such as blurring of the pattern, or the problem of the wettability change efficiency deterioration by the deterioration of the photocatalyst sensitivity, or the like cannot be generated, and furthermore, the effect of preventing generation of the wettability change irregularity on the wettability changeable layer can be provided.

At the time of irradiating the energy to the color filter substrate of the relatively large area, it is preferable to set the gap in the positioning device for the photocatalyst containing layer side substrate and the color filter substrate in the energy irradiating device in a range of 10 μm to 200 μm, in particular, in a range of 25 μm to 75 μm. By providing the setting value in the range, the photocatalyst containing layer side substrate and the color filter substrate can be placed without being contacted, without causing drastic decline of the pattern accuracy or drastic deterioration of the photocatalyst sensitivity.

As mentioned above, by placing the photocatalyst containing layer and the wettability changeable layer surface separated by a predetermined interval, the active oxygen species generated by the oxygen, water, and the photocatalyst function can easily be desorbed. That is, in the case the interval between the photocatalyst containing layer and the wettability changeable layer is made narrower than the above mentioned range, the above mentioned active oxygen species can hardly be desorbed so that the wettability change rate may be made lower as a result, and thus it is not preferable. Moreover, in the case they are placed with an interval larger than the above mentioned range, the generated active oxygen species can hardly reach the wettability changeable layer so that the wettability change rate may be made lower also in this case, and thus it is not preferable.

In this embodiment, the placement state with the gap needs to be maintained at least during the energy irradiation.

As the method for placing the photocatalyst containing layer and the wettability changeable layer with such an evenly formed extremely narrow gap, for example, a method of using a spacer can be presented. Then, by using the spacer, an even gap can be formed, and furthermore, since the photocatalyst function is not provided on the part of the wettability changeable layer surface where being contacted with the spacer, by providing the spacer in the same pattern as the above mentioned pattern, a predetermined pattern can be formed on the wettability changeable layer.

In this embodiment, although the spacer can be formed as an member, but for simplifying the process, it is preferable to form the same on the photocatalyst containing layer surface of the photocatalyst containing layer side substrate as it is explained in the column of the above mentioned photocatalyst containing layer side substrate. Although it has been explained as the photocatalyst containing layer side light shielding part in the explanation for the above mentioned photocatalyst containing layer side substrate preparing process, since the spacer is only needed to provide the function of protecting the surface so that the photocatalyst function dose not influence the wettability changeable layer surface in this embodiment, it may be formed of a material not particularly having the function of shielding the energy to be irradiated.

The energy irradiation (exposure) in this embodiment is the concept including any irradiation of the energy line capable of changing the wettability of the wettability changeable layer surface by the photocatalyst containing layer, and thus it is not limited to the visible light beam irradiation.

The light wavelength used for the energy irradiation is generally set in a range of 400 nm or less, preferably in a range of 380 nm or less because the preferable photocatalyst used for the photocatalyst containing layer is a titanium dioxide as mentioned above, and a light having the above mentioned wavelength is preferable as the energy for activating the photocatalyst function by the titanium dioxide.

As a light source to be used for the energy irradiation, a mercury lamp, a metal halide lamp, a xenon lamp, an excimer lamp, and various other light sources can be presented.

In addition to the method of executing the pattern irradiation via a photomask using the above mentioned light source, a method of drawing irradiation in a pattern using a laser such as an excimer, a YAG, or the like can be used as well.

Here, the energy irradiation amount at the time of the energy irradiation is defined to be the irradiation amount necessary for changing the wettability of the wettability changeable layer surface by the function of the photocatalyst in the photocatalyst containing layer.

Moreover, at the time, by irradiating the energy while heating the photocatalyst containing layer, the sensitivity can be raised so that the wettability can be changed efficiently, and thus it is preferable in this regard. Specifically, it is preferable to heat in a range of 30° C. to 80° C.

The energy irradiation direction in this embodiment may either be from the photocatalyst containing layer side substrate side, or from the color filter substrate side with the above mentioned light shielding part provided as the mask. Here, in the case the photocatalyst containing layer side light shielding part is formed on the photocatalyst containing layer side substrate, the energy irradiation needs to be executed form the photocatalyst containing layer side substrate side, and furthermore, in this case, the photocatalyst containing layer side substrate needs to be transparent to the energy to be irradiated. In this case, in the case the photocatalyst containing layer side light shielding part is formed on the photocatalyst containing layer, and the photocatalyst containing layer side photocatalyst containing layer side light shielding part is used so as to have the above mentioned function of the spacer, the energy irradiation direction may either be from the photocatalyst containing layer side substrate side or from the color filter substrate side.

Moreover, in this embodiment, since the color filter substrate has the above mentioned light shielding part formed, the entire surface energy irradiation may be executed form the color filter substrate side. Thereby, the energy irradiation can be carried out only to the pixel part forming part without providing the energy irradiation only to the wettability changeable layer in the part formed on the upper surface of the light shielding part. Therefore, the energy pattern irradiation can be carried out without using a photomask or the like.

Furthermore, as to the energy irradiation direction in the case the photocatalyst containing layer is formed in a pattern, the energy may be irradiation from any direction as long as it is irradiated to the part where the photocatalyst containing layer and the wettability changeable layer is contacted. Similarly, in the case of using the above mentioned spacer, as long as the energy is irradiated to the contacted part, it may be irradiated form any direction. Here, in the case a photomask is used, it is necessary that the energy is irradiated form the side which the photomask is placed.

When the above mentioned energy irradiation is finished, the photocatalyst containing layer side substrate is separated form the contact position with the wettability changeable layer. Thereby, as shown in FIG. 1D, the pixel part forming part 5 with the wettability changed is formed in a pattern on the wettability changeable layer 3.

Here, in this embodiment, it is preferable that the width of the pixel part is formed wider than the width of the opening part formed by the light shielding part. Thereby, after being completed as a liquid crystal display, when a backlight is irradiated, there is no possibility of transmitting the backlight through the part where the pixel part is not formed, so that a trouble of the color omission or the like is not generated.

As shown in FIGS. 1A, 1B, 1C, 1D, and 1E as an example, the above mentioned pixel part can be formed by narrowing the width of the photocatalyst containing layer side light shielding part of the photomask 24 of the photocatalyst containing substrate 21 for forming the pixel part forming part 5 comprising the lyophilic area than the light shielding part 2 of the color filter substrate 4.

(Pixel Part Forming Process)

Next, the process for forming the pixel part in this embodiment will be explained. According to the above mentioned process, for example as shown in FIG. 1D, the ink 12 is discharged to the pixel part forming part 5 provided as the lyophilic area by the wettability change, using the ink jet apparatus 11 to color in red, green and blue, respectively so as to form the pixel part 6.

In this case, since the pixel part forming part 5 is provided as the lyophilic area having a small contact angel to a liquid by the energy irradiation as mentioned above, the ink 12 discharged from the ink jet apparatus 11 is spread evenly in the pixel part forming part 5. Moreover, since the area of the photocatalyst containing layer without execution of the energy irradiation is provided as the liquid repellent area, the ink is repelled and removed in this area.

The pixel part is generally formed in the three colors of red (R), green (G) and blue (B). The coloring pattern and the coloring area in the pixel part can be set optionally. The inks for forming the pixel part in the ink jet method can be classified on the whole to the water based type and the oil based type. In this embodiment, either type can be used, however, in terms of the surface tension, the water based inks are preferable.

In the water based inks used in this embodiment, as a solvent, water alone, or a solvent mixture of water and a water soluble organic solvent can be used. In contrast, in the oil based inks, those having a high boiling point as the base can be used preferably for preventing choking of the head or the like. As the coloring agents used for these ink jet method inks, known pigments and dyes can be used widely. Moreover, it is also possible to contain soluble or insoluble resins in the solvent for improving the dispersing property and the fixing property. Additionally, the surfactants such as a nonionic surfactant, a cationic surfactant, and an amphoteric surfactant; the antiseptics; the corrosion preventing agents; the pH adjusting agents; the antifoaming agents; the ultraviolet ray absorbing agents; the viscosity adjusting agents; the surface tension adjusting agents, or the like may be added as needed.

Moreover, since an ordinary ink for the ink jet method has a low suitable viscosity, it cannot contain a binder resin by a large amount. However, by granulating the coloring agent particles in the ink so as to be contained by the resin, the fixing ability can be provided to the coloring agent itself. Such an ink can be used in this embodiment. Furthermore, the so-called hot melt ink or the UV curing type ink can be used as well.

In this embodiment, in particular, it is preferable to use the UV curing type ink. By using the UV curing type ink, after forming the pixel part by coloring by the ink jet method, the ink can be cured quickly by the UV irradiation so that the next process can be carried out immediately. Therefore, the color filter can be manufactured efficiently. Moreover, as mentioned above, since the ink in the pixel part forming part is spread evenly, by accordingly solidifying the ink, the pixel part can be formed without color omission or color irregularity. Then, as needed, the protecting layer may be provided thereon.

The UV curing type ink contains a prepolymer, a monomer, an optical initiator and a coloring agent as the main components. As the prepolymer, any of the prepolymers such as a polyester acrylate, a polyurethane acrylate, an epoxy acrylate, a polyether acrylate, an oligo acrylate, an alkdacrylate, a polyol acrylate, and a silicon acrylate can be used without limitation.

As the monomer, vinyl monomers such as a styrene, and a vinyl acetate; monofunctional acrylic monomers such as an n-hexyl acrylate, and a phenoxy ethyl acrylate; and polyfunctional acrylic monomers such as a diethylene glycol diacrylate, a 1,6-hexane diol diacrylate, an ester neopentyl glycol diacrylate hydroxyl piperate, a trimethylol propane triacrylate, and a dipenta erythritol hexaacrylate can be used. The above mentioned prepolymers and monomers can be used alone or as a mixture or two or more kinds.

As the photo polymerization initiator, one capable of obtaining the desired curing wettability and recording wettability can be used selectively from an isobutyl benzoin ether, an isopropyl benzoin ether, a benzoin ethyl ether, a benzoin methyl ether, a 1-phenyl-1,2-propadion-2-oxime, a 2,2-dimethoxy-2-phenyl acetophenone, a benzyl, a hydroxyl cyclohexyl phenyl ketone, a diethoxy acetophenone, a 2-hydroxy-2-methyl-1-phenyl propane-1-on, a benzophenone, a chloro thioxanthone, a 2-chloro thioxanthone, an isopropyl thioxanthone, a 2-methyl thioxanthone, a chlorine substituted benzophenone, a halogen substituted alkyl-allyl ketone, or the like. Additionally, as needed, the photo initiating auxiliary agents such as an aliphatic amine and an aromatic amine; the photo sensitizing agents such as a thioxanthone may be added.

Moreover, as the ink jet apparatus to be used in this embodiment, although it is not particularly limited, the ink jet apparatus using the various kinds of methods such as a method of continuously discharging a charged ink and controlling the same by the magnetic field, a method of intermittently discharging an ink using a piezoelectric element, and a method of heating an ink and intermittently discharging the same utilizing the bubbles, can be used.

Here, in this embodiment, although the pixel part may be formed by the one time energy irradiation and the ink adhesion to the energy irradiated part as mentioned above, in the above mentioned method for forming pixel part, the distance between the pixel part forming parts, which is the lyophilic area with the energy irradiation, is short at the time of adhering the ink. Therefore, a problem of the ink mixture or the like may be generated at the time of forming the pixel part. As a method for avoiding the problem, a method of executing the energy irradiation and the pixel part formation, divided into at least two times as shown below can be presented.

Figure 7A:
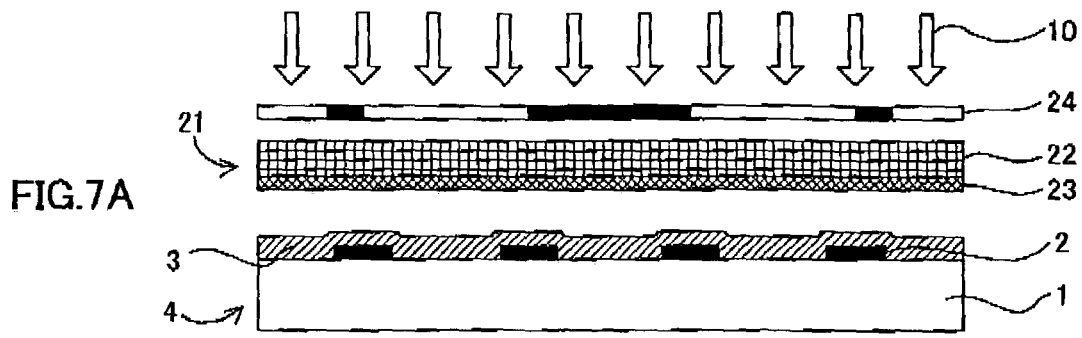
FIGS. 7A, 7B, 7C, and 7D are schematic diagrams for explaining another example of method for irradiating an energy to a pixel part in the method for manufacturing a color filter shown in FIGS. 1A, 1B, 1C, 1D, and 1E.
Figure 7B:
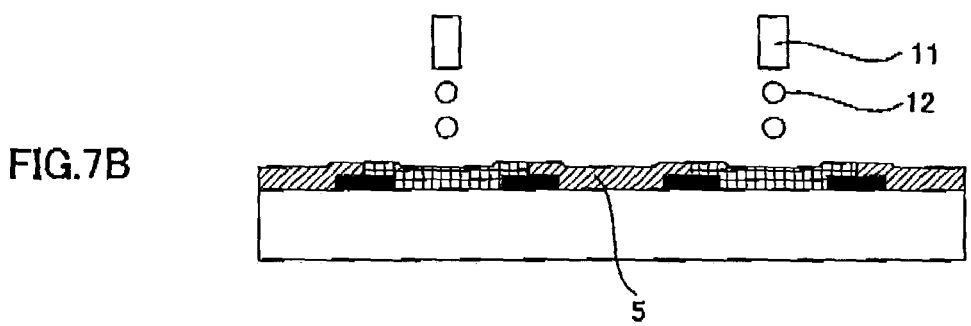
Figure 7C:
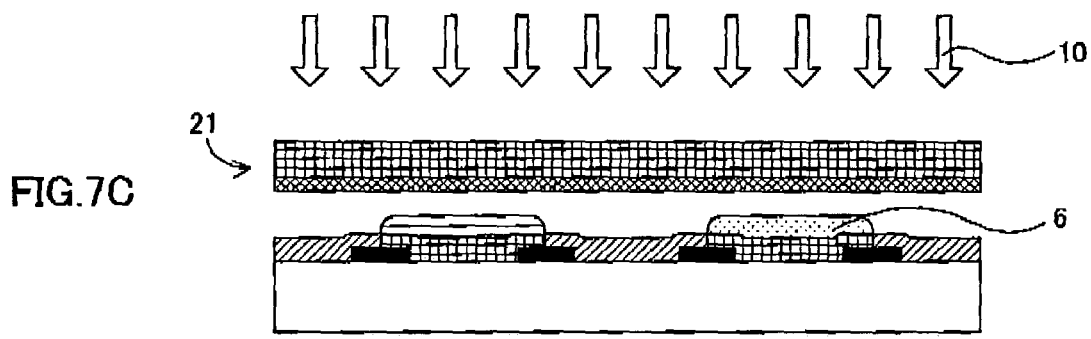

FIGS. 7A, 7B, 7C, and 7D show examples of executing the energy irradiation and formation of the pixel part, divided into two times. Similarly to the example shown in the above FIGS. 1A, 1B, 1C, 1D, and 1E, the light shielding part 2 is formed on the transparent base material 1, and the wettability changeable layer 3 is formed on the transparent base material 1 so as to cover the light shielding part 2 to form the color filter forming substrate 4. With the photocatalyst containing layer 23 formed on the base member 22 of the photocatalyst containing layer 21 placed so as to face the wettability changeable layer 3, the energy 10 is irradiated to form the pixel parts in every other pixel part forming parts, using the photomask 24 (FIG. 7A). By adhering the pixel part forming ink 12 onto the pixel part forming parts 5 of the lyophilic area formed thereby, using the ink jet apparatus 11 (FIG. 7B), the pixel parts 6 are formed in the every other parts in the pixel part forming parts (FIG. 7C). For the pixel parts formed here, it is preferable that the pixel parts themselves are liquid repellent to prevent the coloring of the ink by the ink jet apparatus on the pixel parts at the second time. Moreover, the surface thereof may be processed with an ink repellent processing agent such as a silicone compound, or a fluorine containing compound.

Figure 7D:
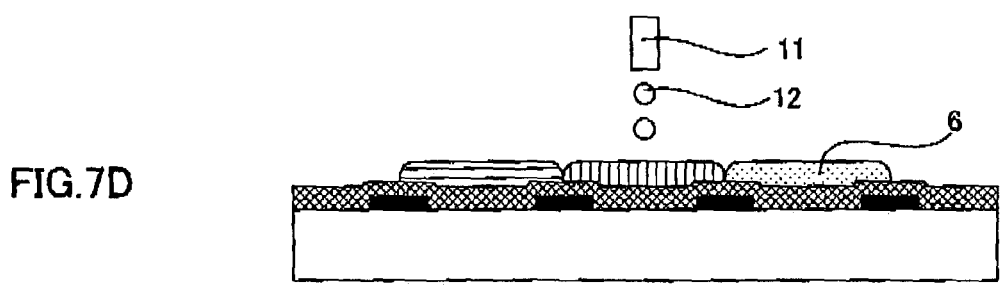

Then, by irradiating the energy 10 again, using the photocatalyst containing substrate 21 from the wettability changeable layer 3 side on which the pixel parts 6 is formed in the every other parts, the pixel parts forming parts between the pixel parts 6 can be provided as the pixel part forming parts 5 by the energy irradiation, and by adhering the pixel part forming ink 12 thereon, using the ink jet apparatus 11, the pixel parts 4 are formed so as to obtain the color filter (FIG. 7D).

According to the method, since the distance between each pixel part can be reduced or removed, the coloring layer (a pixel part assembly) having the excellent flatness can be formed. Moreover, at the time of the first pixel part formation, since the interval between the formed pixel parts is large, the ink cannot be mixed beyond the parts. Therefore, a high quality color filter without the ink color mixture or the like can be obtained.

Although the pixel parts 6 formed in the first formation is in the every other parts in the above mentioned method, the present invention is not limited thereto, and as long as the initially formed pixel parts are not next to each other, it may be changed depending on the shape of the pixel parts of the color filter, such as the zigzag shape. Moreover, although the pixel parts are formed in two times of the operation in the above mentioned explanation, the pixel parts may be formed by three or more times of the operation, as needed.

(Liquid Repellent Convex Part)

In this embodiment, after the process of forming the wettability changeable layer, the process for forming the liquid repellent convex part exposing part by irradiating the energy to the photocatalyst containing layer on the light shielding part, and forming the liquid repellent convex part in the liquid repellent convex part exposing part may be provided.

Figure 8A:
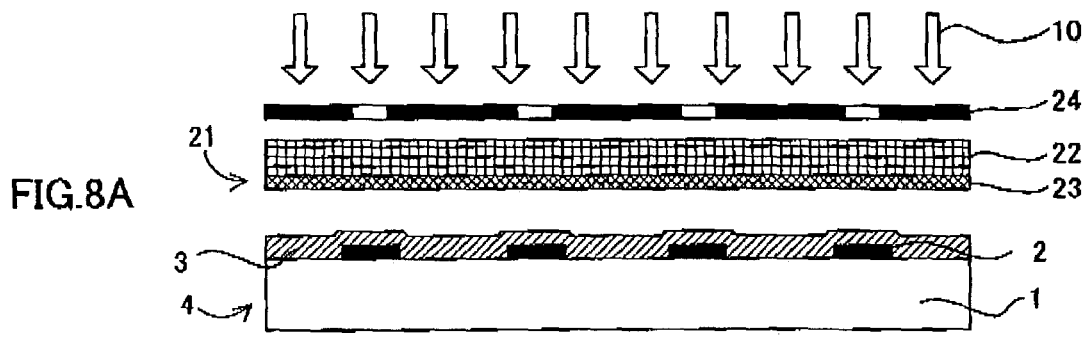
FIGS. 8A, 8B, 8C, 8D, and 8E are process diagrams for explaining a method for manufacturing a liquid repellent convex part in the method for manufacturing a color filter shown in FIGS. 1A, 1B, 1C, 1D, and 1E.

An example of the process for forming the liquid repellent convex part will be explained with reference to FIGS. 8A, 8B, 8C, 8D, and 8E. Similarly to the above mentioned first embodiment shown in FIGS. 1A, 1B, 1C, 1D, and 1E, to the color filter forming substrate with the light shielding part 2 formed on the transparent base material 1, and the wettability changeable layer 3 formed so as to cover the same, an energy 10 is irradiated in a liquid repellent convex part pattern, using the photomask 24, with the photocatalyst containing layer 23 formed on the base member 22 of the photocatalyst containing layer side substrate 21 placed with a certain gap (FIG. 8A). Thereby, the wettability changeable layer 3 on the light shielding part forming part 2 is provided as the lyophilic area so as to form the pattern with the wettability changed on the surface of the liquid repellent convex part forming part 7.

Figure 8B:
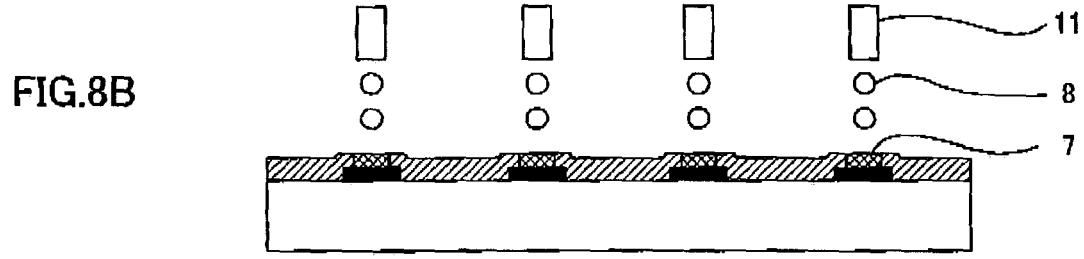

To the liquid repellent convex part forming part 7, the liquid repellent convex part ink 8 such as a UV curing type resin monomer is adhered by the ink jet apparatus 11 (FIG. 8B). The method for coating the liquid repellent convex part ink is not limited to the method by the ink jet apparatus, and other methods such as dip coating can be used as well.

Figure 8C:
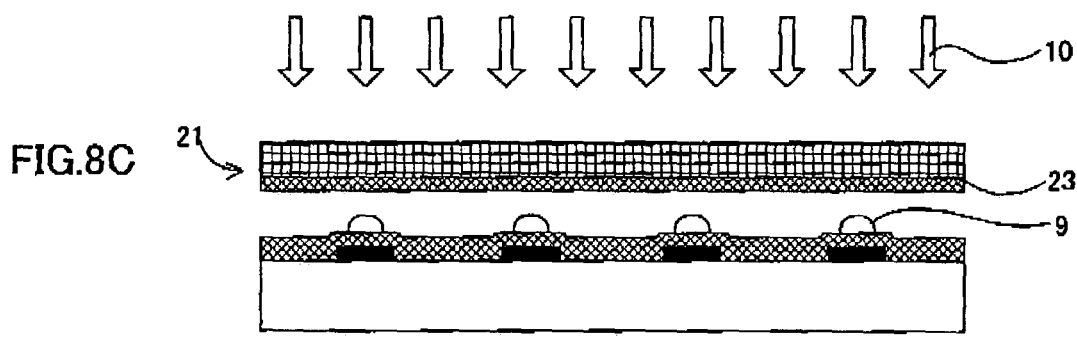

Then, by curing the liquid repellent convex part ink 8 by the UV irradiation or the like, the liquid repellent convex part 9 is formed on the surface of the wettability changeable layer 3 on the light shielding part 2 (FIG. 8C). It is preferable that the width of the liquid repellent convex part 9 is formed narrower than the width of the light shielding part 2 as shown in the figure. By forming accordingly, the problem of the color omission or the like is not generated as mentioned above.

Figure 8D:
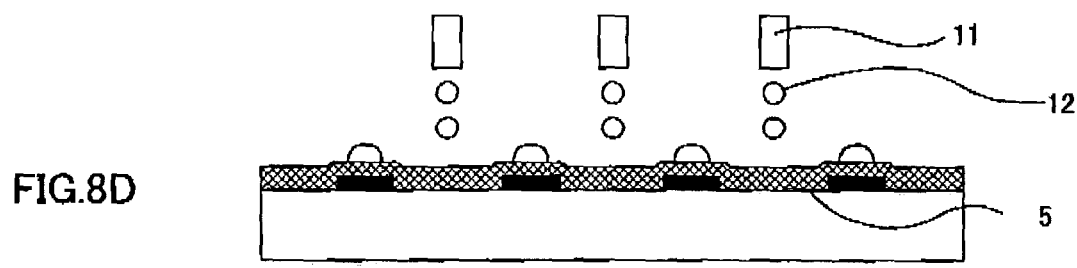
Figure 8E:
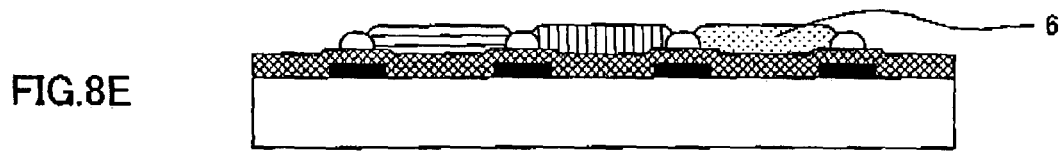

By irradiating the energy 10 to the entire surface of the member, accordingly formed with the liquid repellent convex part 9 formed on the wettability changeable layer 3, from the photocatalyst containing substrate 21 side with the photocatalyst containing layer 23 of the photocatalyst containing layer side substrate 21 and the wettability changeable layer 3 placed with a certain gap, the part other than the portion with the liquid repellent convex part 9 formed is irradiated with the energy so as to be the pixel part forming part. Thereafter, similarly to the above mentioned method, by carrying out the energy irradiation using the photocatalyst containing layer side substrate 21, adhering the pixel part forming ink 12 to the pixel part forming part 5 which is the wettability changeable layer provided as the lyophilic area by using the ink jet apparatus 11, and curing, the pixel part 6 is formed so that the color filter provided with the liquid repellent convex part 9 can be manufactured (FIGS. 8C, 8D, and 8E).

According to the method, since the liquid repellent convex part forming part 7 is formed by irradiating the energy 10 to the photocatalyst containing layer 3 on the light shielding part 2, the liquid repellent convex part forming part 7 can be formed by an optional width. Therefore, by coating the liquid repellent convex part ink 8 here, the liquid repellent convex part 9 of an optional width can be formed. Therefore, by adjusting the width of the liquid repellent part mask, the liquid repellent convex part 9 having a narrower width than that of the above mentioned light shielding part 2 can be formed. By forming the liquid repellent convex part 9 having a narrower width than that of the light shielding part 2, since the width of the pixel part 6 to be formed in between the liquid repellent convex parts 9 can be made wider than the width of the opening part of the light shielding part 2, a color filter without a trouble of the color omission or the like can be obtained as mentioned above.

Although the liquid repellent convex part is formed by the wettability change of the photocatalyst containing layer in this embodiment, the present invention is not limited thereto, and for example the liquid repellent convex part may be provided by the photolithography method.

2. Second Embodiment

The second embodiment of the present invention is a method for manufacturing a color filter comprising:
(1) forming a wettability changeable layer, which a wettability changes by a function of a photocatalyst, on a transparent base material, on a pixel part forming part which is a part on the transparent base material where pixel part is formed;
(2) forming a light shielding part on the boundary part of the pixel part forming part provided with the wettability changeable layer;
(3) placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to obtain the pixel part forming part as a lyophilic area where the contact angle to a liquid is lowered compared with a state before the energy irradiation; and
(4) coloring the pixel part forming part, provided as a lyophilic area, by an ink jet method so as to form a pixel part.

Figure 9A:
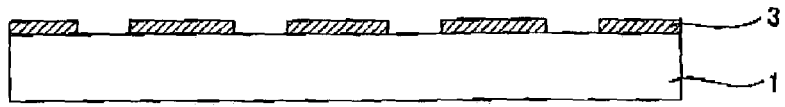
FIGS. 9A, 9B, 9C, 9D, and 9E are process diagrams for explaining a second embodiment of a method for manufacturing a color filter according to the present invention.
Figure 9B:
Figure 9C:
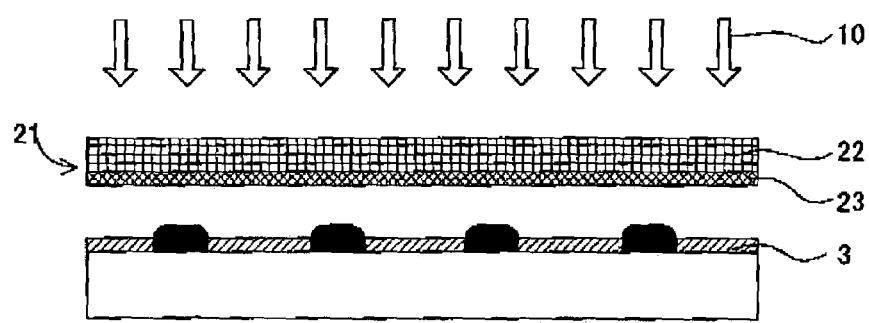
Figure 9D:
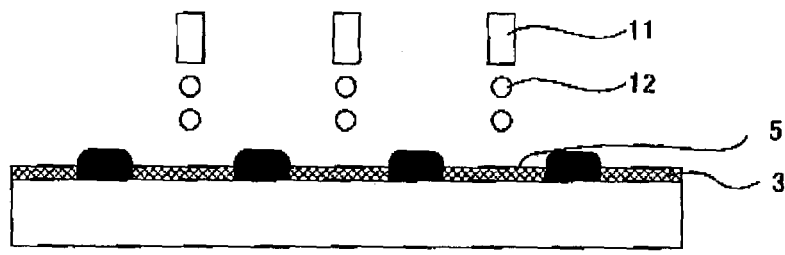
Figure 9E:
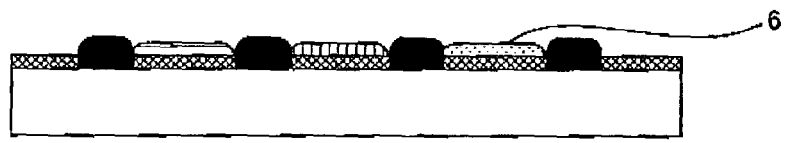

In this embodiment, as shown in FIGS. 9A, 9B, 9C, 9D, and 9E for example, the wettability changeable layer 3 is formed, on the transparent base material 1, in the pixel part forming part where the pixel part is formed (FIG. 9A). The light shielding part 2 is formed on the light shielding part forming part which is the boundary part of the pixel part forming part with the above mentioned wettability changeable layer 3 formed (FIG. 9B). Next, with the photocatalyst containing layer 23 formed on the base member 22 of the photocatalyst containing layer side substrate 21 placed with a certain gap to the above mentioned wettability changeable layer 3, the energy 10 is irradiated (FIG. 9C) to form a pattern with the wettability changed on the pixel part forming part 5 on the surface of the above mentioned wettability changeable layer 3 (FIG. 9D). Thereafter, by detaching the photocatalyst containing layer side substrate 21, and coloring the pixel part forming part 5, which the wettability is changed, with the pixel part forming ink 12 by the ink jet apparatus 11 (FIG. 9D), the pixel part 6 is formed (FIG. 1E) Hereinafter, each will be explained, respectively.

(Wettability Changeable Layer Forming Process)

First, the wettability changeable layer 3 is formed, on the transparent base material 1, in the portion where the pixel part is formed (FIG. 9A). That is, in the method, the wettability changeable layer 3 is first formed in a pattern on the transparent base material. As a method for forming the wettability changeable layer in a pattern, for example, a method for forming by the photolithography method using a photo sensitive sol gel solution, a method by printing, or the like can be presented.

Since the transparent base material and the wettability changeable layer used here are same as those in the first embodiment, explanation is omitted here.

Here, as to the transparent base material, since the light shielding part is formed on the transparent base material as it will be explained later, among the above mentioned transparent base materials of the first embodiment, the wettability on the transparent base material is preferably lyophilic in this embodiment. Specifically, it is preferable that the contact angle to a liquid having a 40 mN/m surface tension is less than 10 degrees, more preferably, the contact angle to a liquid having a 40 mN/m surface tension is 5 degrees or less, and particularly preferably it is 1 degree or less. Moreover, the surface of the transparent base material may have the surface process so as to be lyophilic. As an example of the surface process to have the material surface lyophilic, the lyophilic surface process by the plasma process utilizing an argon, water, or the like can be presented. As the lyophilic layer formed on the transparent base material, for example, a silica film of a tetraethoxy silane by the sol gel method or the like can be presented.

(Light Shielding Part Forming Process)

The light shielding part 2 is formed by coating the light shielding part paint or the like onto the part without the wettability changeable layer 3 (light shielding part forming part), formed in the above mentioned wettability changeable layer forming process, using for example the ink jet apparatus or the like (FIG. 9B). As mentioned above, the wettability of the surface of the wettability changeable layer 3 is provided as liquid repellent compared with the surface of the transparent base material 1. Thereby, at the time of forming the light shielding part 2 by the ink jet method or the like, the light shielding part paint is adhered only on the light shielding part forming part on the transparent base material 1, without being adhered onto the wettability changeable layer having the liquid repellent property so as to form the light shielding part.

Here, the method for forming the light shielding part in this embodiment is not limited to the above mentioned ink jet method, and the photolithography method or the like may be used.

Moreover, since the light shielding part used in this embodiment is same as that of the first embodiment, explanation is omitted here.

(Process for Forming a Pixel Part Forming Part Comprising a Lyophilic Area in a Pattern)

Next, after formation of the light shielding part 2 by the above mentioned process, similarly to the first embodiment, the photocatalyst containing layer side substrate 21 is prepared. With the photocatalyst containing layer 23 of the photocatalyst containing layer side substrate 21 placed with a gap to the above mentioned wettability changeable layer 3, the energy 10 irradiation is carried out (FIG. 9C). Since the photocatalyst containing layer side substrate and the energy irradiation process used in this embodiment are same as those of the first embodiment, explanation is omitted here.

Here, in this embodiment, by the above mentioned energy irradiation, not only the pixel part forming part can be provided as lyophilic, but also the impurities on the color filter generated in the above mentioned light shielding part forming process can be removed at the same time. In the case the above mentioned light shielding part is formed for example by the photolithography method, a cleaning process is generally needed after the light shielding part formation, and it is carried out by the method such as the irradiation of the UV to the entire surface with a low pressure mercury lamp, an excimer lamp, or the like. However, in this embodiment, since the organic substances on the color filter substrate can also be decomposed by irradiating the energy by using the above mentioned photocatalyst containing layer side substrate, the cleaning process is not neseccary, and thus it is preferable also in terms of the manufacturing efficiency and the cost.

(Pixel Part Forming Process)

Next, by the process of forming the pixel part forming part comprising the above mentioned lyophilic area in a pattern, the pixel part 6 is formed by the ink jet method in the pixel part forming process provided as the lyophilic area (FIGS. 9D and E). Since the pixel part forming process in this embodiment is same as the first embodiment in terms of the ink jet apparatus, the various kinds of inks, or the like, explanation is omitted here.

3. Third Embodiment

The third embodiment of the present invention is a method for manufacturing a color filter comprising:
(1) forming a wettability changeable layer, which a wettability changes by a function of a photocatalyst, on a transparent base material, on a light shielding part forming part which is a part on the transparent base material where light shielding part is formed;
(2) coloring a part on the transparent base material, where the wettability changeable layer is not firmed, by an ink jet method so as to form a pixel part;
(3) placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to obtain the light shielding part forming part as a lyophilic area where the contact angle to a liquid is lowered compared with a state before the energy irradiation; and
(4) forming a light shielding part in the light shielding part forming part provided as the lyophilic area.

Figure 10A:
FIGS. 10A, 10B, 10C, and 10D are process diagrams for explaining a third embodiment of a method for manufacturing a color filter according to the present invention.
Figure 10B:
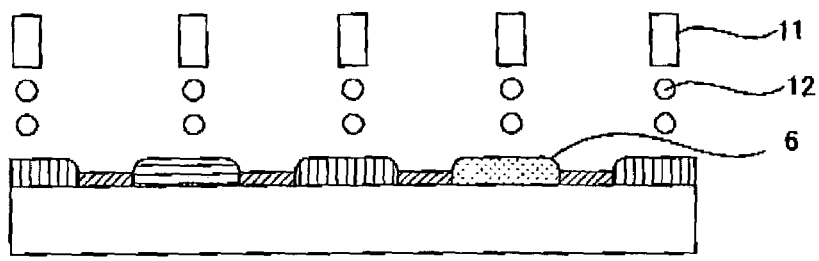
Figure 10C:
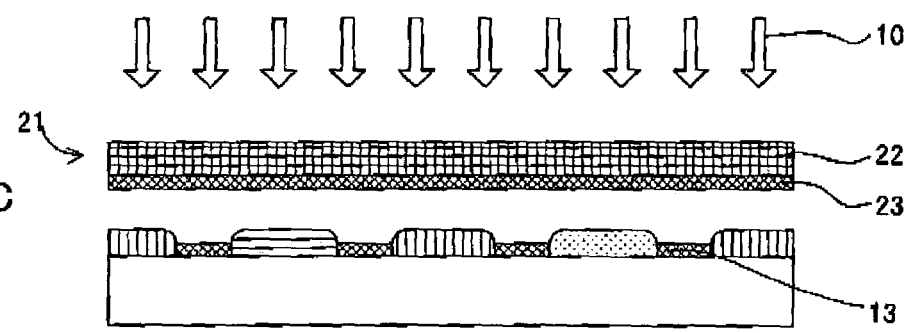
Figure 10D:

In this embodiment, as shown in FIGS. 10A, 10B, 10C, and 10D for example, the wettability changeable layer 3 is formed in the light shielding part forming part, where the light shielding part is formed, on the transparent base material 1 (FIG. 10A). The pixel part 6 is formed on the pixel part forming part which is the boundary part of the light shielding part forming part with the above mentioned wettability changeable layer 3 formed, by coloring with the pixel part forming ink 12 by the ink jet apparatus 11 (FIG. 10B). Next, with the photocatalyst containing layer 23 formed on the base member 22 of the photocatalyst containing layer side substrate 21 placed with a certain gap to the above mentioned wettability changeable layer 3, the energy 10 is irradiated to form a pattern with the wettability changed on the light shielding part forming part 13 on the surface of the above mentioned wettability changeable layer 3 (FIG. 10C). Thereafter, by detaching the photocatalyst containing layer side substrate 21, the light shielding part 2 is formed on the light shielding part forming part 13 with the wettability changed (FIG. 10D). Hereinafter, each will be explained, respectively.

(Wettability Changeable Layer Forming Process)

In this embodiment, first, the wettability changeable layer 3 is formed in a pattern, on the transparent base material 1, in the light shielding part forming part where the light shielding part is formed (FIG. 10A). Since the method for forming the wettability changeable layer 3 in a pattern is same as the method used in the above mentioned second embodiment, and furthermore, since the transparent base material and the wettability changeable layer are same as those in the first and second embodiments, explanation is omitted here.

(Pixel Part Forming Process)

Next, the pixel part forming process will be explained. The pixel part 6 is formed by adhering the ink, by the ink jet apparatus, to the portion where the wettability changeable layer 3 is not formed in the above mentioned wettability changeable layer forming process, that is, to the pixel part forming part where the pixel part is formed (FIG. 10B). At the time of forming the pixel part 6, the method for forming of executing the energy irradiation and the pixel part formation divided in two or more times as explained in the above mentioned first embodiment may be used because the inks may be mixed due to the narrow liquid repellent area between the pixel parts 6 at the time of forming the pixel parts 6.

Here, since the ink jet apparatus, the pixel part forming ink, or the like are same as those in the first embodiment, explanation is omitted here.

(Process for Forming a Light Shielding Part Forming Part Comprising a Lyophilic Area in a Pattern)

After formation of the pixel part 6 by the above mentioned process, similarly to the first embodiment, the photocatalyst containing layer side substrate 21 is prepared. With the photocatalyst containing layer 23 of the photocatalyst containing layer side substrate 21 placed with a gap provided to the above mentioned wettability changeable layer 3, the energy 10 irradiation is carried out to provide the light shielding part forming part as the lyophilic area (FIG. 10C). Since the photocatalyst containing layer side substrate and the energy irradiation process used in this embodiment are same as those of the first embodiment, explanation is omitted here.

(Light Shielding Part Forming Process)

Next, the light shielding part is formed on the light shielding part forming part provided as the lyophilic area by the above mentioned process by the ink jet method or the like. Since the light shielding part forming process of this embodiment is same as that of the second embodiment, explanation is omitted here.

4. Fourth Embodiment

The fourth embodiment of the present invention is a method for manufacturing a color filter comprising:
(1) placing a wettability changeable layer, which a wettability changes by a function of a photocatalyst, and a photocatalyst containing layer of a photocatalyst containing layer side substrate, which is the photocatalyst containing layer containing a photocatalyst formed on a base member, with a gap of 200 μm or less, and irradiating an energy from a predetermined direction to form the light shielding part forming part, in a pattern,comprising a lyophilic area where the contact angle to a liquid is lowered compared with a state before the energy irradiation;
(2) forming a light shielding part in the light shielding part forming part provided as the lyophilic area;
(3) placing a wettability changeable layer with the light shielding part formed thereon and a photocatalyst containing layer with a gap of 200 μm or less, and irradiating an energy from a predetermined direction to form a pixel part forming part, in a pattern, comprising a lyophilic area where the contact angle to a liquid is lowered compared with a state before the energy irradiation; and
(4) coloring the pixel part forming part provided as the lyophilic area by the ink jet method, so as to form a pixel part.

Figure 11A:
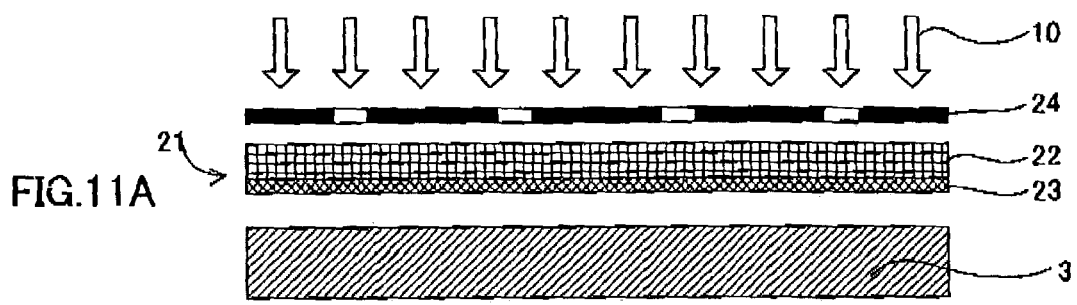
FIGS. 11A, 11B, 11C, 11D, and 11E are process diagrams for explaining a fourth embodiment of a method for manufacturing a color filter according to the present invention.
Figure 11B:
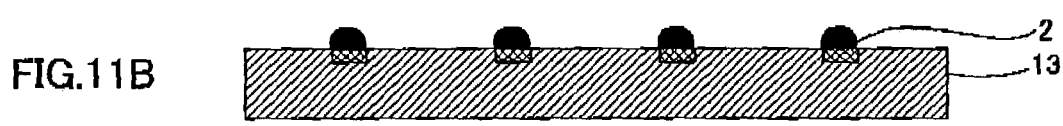

In this embodiment, as shown in FIGS. 11A, 11B, 11C, 11D, and 11E for example, the light shielding part forming part 13 with the wettability changed is formed by placing the photocatalyst containing layer 23 formed on the base member 22 of the photocatalyst containing layer side substrate 21 with a certain gap to the wettability changeable layer 3, and irradiating the energy 10 in a pattern using the photomask 24 (FIG. 11A). Next, the light shielding part 2 is formed on the above mentioned light shielding part forming part 13 with the wettability changed (FIG. 11B).

Figure 11C:
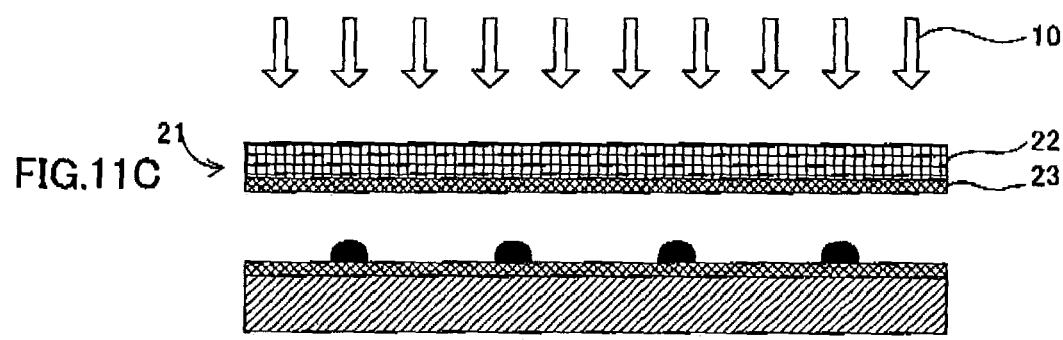
Figure 11D:
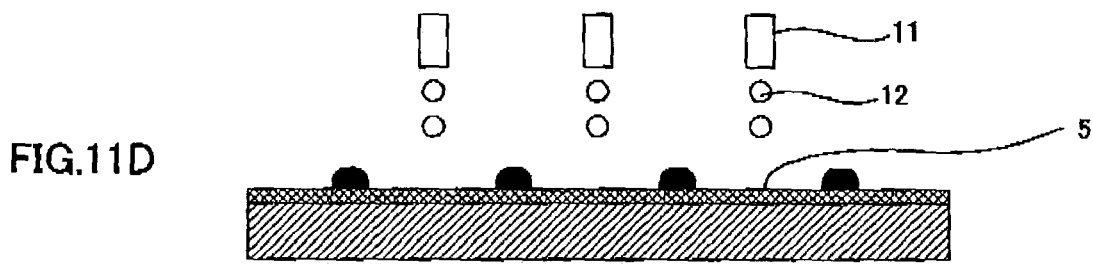
Figure 11E:
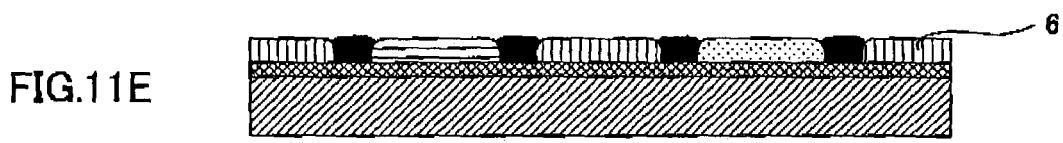

Next, the pixel part forming part 5 provided as the lyophilic area is formed by placing the photocatalyst containing layer 23 formed on the base member 22 of the photocatalyst containing layer side substrate 21 with a certain gap to the wettability changeable layer 3, and irradiating the energy 10 (FIG. 11C). By coloring the pixel part forming part 5, with the wettability changed, with the pixel part forming ink 12 by the ink jet apparatus 11 (FIG. 11D), the pixel part 6 is formed (FIG. 11E). Hereinafter, each will be explained, respectively.

(Process for Forming a Light Shielding Part Forming Part Comprising a Lyophilic Area in a Pattern)

Also in this embodiment, as in the first embodiment, the photocatalyst containing layer side substrate 21 is prepared. With the photocatalyst containing layer 23 of the photocatalyst containing layer side substrate 21 placed with a gap to the wettability changeable layer 3, the energy 10 irradiation is carried out only on the light shielding part forming part (FIG. 11A). By the energy irradiation, the light shielding part forming part is formed in a pattern as the lyophilic area. Since the pixel part forming part remains without the energy irradiation, it is provided as the liquid repellent area. In this embodiment, the pattern formation is carried out, utilizing the liquid repellent property difference between the irradiated pattern and the unirradiated pattern. The photocatalyst containing layer side substrate used in this embodiment is not particularly limited as long as only the light shielding part can be irradiated with the energy in a pattern as it is described in the first embodiment, a photomask may be used, or it may have the photocatalyst containing layer formed in a pattern, or the photocatalyst containing layer and the light shielding part.

Since the photocatalyst containing layer side substrate and the energy irradiation process used in this embodiment are same as those of the first embodiment, explanation is omitted here.

Here, the wettability changeable layer of this embodiment may have or may not have the self supporting property, or one without the self supporting property. The self supporting property in this embodiment denotes the state capable of existing with a shape without other supporting material.

As the material for the wettability changeable layer used in this embodiment, specifically, similarly to the first embodiment, the materials having the contact angle to a liquid having a surface tension equivalent to the surface tension of the ink, for the pixel part or for the light shielding part to be coated thereafter, is changed by at least 1° or more, preferably 5°, and particularly preferably 10° or more by the energy irradiation with the photocatalyst containing layer contacted to the surface can be presented.

Moreover, the wettability changeable layer needs to be made of a material capable of transmitting the irradiated energy.

As such materials, for example, a polyethylene, a polycarbonate, a polypropylene, a polystyrene, a polyester, a polyvinyl fluoride, an acetal resin, a nylon, an ABS, a PTFE, a methacrylic resin, a phenol resin, a polyvinylidene fluoride, a polyoxy methylene, a polyvinyl alcohol, a polyvinyl chloride, a polyethylene terephthalate, a silicone, or the like can be presented.

In the case of the wettability changeable layer without the above mentioned self supporting property, it is preferable to provide the process for forming the wettability changeable layer on the transparent base material described in the first embodiment. In this embodiment, the wettability changeable layer without the self supporting property is preferable. The wettability changeable layer made of the above mentioned material which the wettability changs drastically is generally hardly a material having the self supporting property so that the strength or the like is increased by forming on the transparent base material so that it can be used for the various color filters.

(Light Shielding Part Forming Process)

Next, the light shielding part is formed on the light shielding part forming part provided as the lyophilic area by the above mentioned process by the ink jet method or the like. In this case, as mentioned above, since the pixel part forming part which is not provided as lyophilic is liquid repellent, the light shielding part can be formed easily by the ink jet method or the like. Since the light shielding part forming process of this embodiment is same as that of the second embodiment, explanation is omitted here.

(Process for Forming a Pixel Part Forming Part Comprising a Lyophilic Area in a Pattern)

Next, similarly to the process for forming the light shielding part forming part in a pattern, the wettability changeable layer 3 of the color filter substrate, with the light shielding part formed by the above mentioned process, is placed with a gap to the photocatalyst containing layer 23 of the photocatalyst containing layer side substrate 21, and the energy 10 irradiation is carried out to the pixel part forming part (FIG. 11C). By the energy irradiation, the pixel part forming part is formed in a pattern as the lyophilic area. The energy irradiation in this case may be carried out either in a pattern or on the entire surface. Furthermore, in this embodiment, the impurities can be removed by the energy irradiation in the above mentioned light shielding part forming process as in the second embodiment. Since the process of forming the pixel part forming part in a pattern in this embodiment is same as that in the first embodiment, explanation is omitted here.

(Pixel Part Forming Process)

Furthermore, the pixel part is formed by the ink jet method in the pixel part forming part provided as the lyophilic area formed in the above mentioned process for forming the pixel part forming part in a pattern. Since the pixel part forming process in this embodiment is same as that in the first embodiment, explanation is omitted here.

5. Fifth Embodiment

The fifth embodiment of the present invention is a method for manufacturing a color filter comprising:

(1) placing a wettability changeable layer, which a wettability changes by a function of a photocatalyst, and a photocatalyst containing layer of a photocatalyst containing layer side substrate, which is the photocatalyst containing layer containing a photocatalyst formed on a base member, with a gap of 200 μm or less, and irradiating an energy from a predetermined direction to form a pixel part forming part, in a pattern, comprising a lyophilic area where the contact angle to a liquid is lowered compared with a state before the energy irradiation;

(2) forming a pixel part by coloring the pixel part forming part provided as the lyophilic area by an ink jet method;

(3) placing a wettability changeable layer with the pixel part formed thereon and a photocatalyst containing layer with a gap of 200 μm or less, and irradiating an energy from a predetermined direction to form a light shielding part forming part, in a patter, comprising a lyophilic area where the contact angle to a liquid is lowered compared with a state before the energy irradiation; and (4) forming a light shielding part in the light shielding part forming part provided as the lyophilic area.

In this embodiment, as shown in FIGS. 12A, 12B, 12C, and 12D for example, the pixel part forming part 5 comprising the lyophilic area is formed by placing the photocatalyst containing layer 23 formed on the base member 22 of the photocatalyst containing layer side substrate 21 with a certain gap to the wettability changeable layer 3, and irradiating the energy 10 using the photomask 24 in a pattern (FIG. 12A). Next, the pixel part forming part 5 comprising the lyophilic area is colored with the pixel part forming ink 12 by the ink jet apparatus 11 (FIG. 12B) so as to produce the pixel part 6. Next, by placing the photocatalyst containing layer 23 formed on the base member 22 of the photocatalyst containing layer side substrate 21 with a certain gap to the wettability changeable layer 3, and irradiating the energy 10 (FIG. 12C), the light shielding part forming part 13 comprising the lyophilic area is formed. The light shielding part 2 is formed on the light shielding part forming part 13 comprising the lyophilic area (FIG. 12D) Hereinafter, each will be explained, respectively.

(Process for Forming a Pixel Part Forming Part Comprising a Lyophilic Area in a Pattern)

First, also in this embodiment, similarly to the fourth embodiment, the photocatalyst containing layer side substrate 21 is prepared. With the photocatalyst containing layer 23 of the photocatalyst containing layer side substrate 21 and the wettability changeable layer 3 placed with a gap therebetween, the energy 10 is irradiated to only the pixel part forming part (FIG. 12A). By the energy irradiation, the pixel part forming part is formed in a pattern as the lyophilic area. Since the light shielding part forming part remains without the energy irradiation, it is provided as liquid repellent. Also in this embodiment, the pattern formation is carried out, utilizing the liquid repellent property difference between the irradiated pattern and the unirradiated pattern as in the fourth embodiment.

The transparent wettability changeable layer used in this embodiment may have or may not have the self supporting property, as the fourth embodiment. In the case of the wettability changeable layer without the self supporting property, it is preferable to provide the process of forming the wettability changeable layer on the transparent base material as described in the first embodiment.

Since the photocatalyst containing layer side substrate and the energy irradiation process used in this embodiment are same as those of the first and fourth embodiments, explanation is omitted here.

(Pixel Part Forming Process)

Next, the pixel part is formed by the ink jet method in the pixel part forming part provided as the lyophilic area which was formed in the process for forming the above mentioned pixel part forming part in a pattern (FIG. 12B). Since the pixel part forming process of this embodiment is same as that of the first embodiment, explanation is omitted here.

Moreover, in this embodiment, the formation method of executing the energy irradiation and the pixel part formation divided into two or more times of operations explained in the first embodiment may be used because the inks may be mixed due to the narrow liquid repellent area between the pixel parts 6 at the time of forming the pixel parts 6.

(Process for Forming a Light Shielding Part Forming Part Comprising a Lyophilic Area in a Pattern)

Next, the wettability changeable layer 3 of the color filter substrate with the pixel part formed in the above mentioned process is placed with a gap to the photocatalyst containing layer 23 of the photocatalyst containing layer side substrate 21 as in the process for forming the pixel part forming part in a pattern, the energy 10 irradiation is carried out to the light shielding part forming part (FIG. 12C). By the energy irradiation, the light shielding part forming part is formed in a pattern as the lyophilic area. The energy irradiation in this case may be carried out in a pattern or to the entire surface. Since the energy irradiation process for forming the pattern is same as that of the first embodiment, explanation is omitted here.

(Light Shielding Part Forming Process)

Next, the light shielding part is formed by the ink jet method on the light shielding part forming part provided as the lyophilic area in the above mentioned process. Since the light shielding part forming process of this embodiment is same as that of the second embodiment, explanation is omitted here.

6. Sixth Embodiment

The sixth embodiment of the present invention is a method for manufacturing a color filter comprising:
(1) forming a light shielding part on a wettability changeable layer, which a wettability changes by a function of a photocatalyst;
(2) placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to form a pixel part forming part, in a patter, comprising a lyophilic area where the contact angle to a liquid is lowered compared with a state before the energy irradiation; and
(3) coloring the pixel part forming part provided as the lyophilic area by the ink jet method so as to form a pixel part.

Figure 13A:
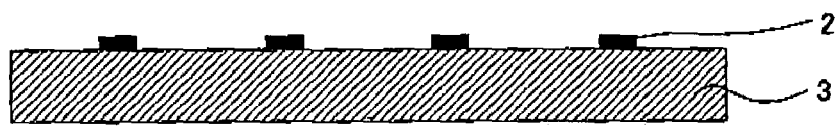
FIGS. 13A, 13B, 13C, and 13D are process diagrams for explaining a sixth embodiment of a method for manufacturing a color filter according to the present invention.
Figure 13B:
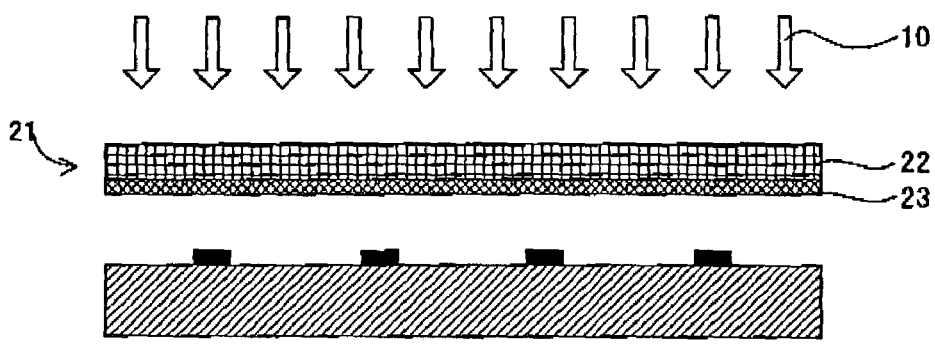
Figure 13C:
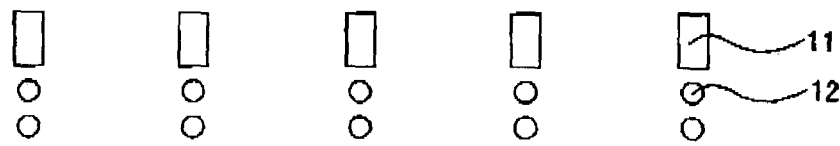
Figure 13D:

In this embodiment, as shown in FIGS. 13A, 13B, 13C, and 13D for example, the light shielding part 2 is formed on the wettability changeable layer 3 (FIG. 13A). Next, with the photocatalyst containing layer 23 formed on the base member 22 of the photocatalyst containing layer side substrate 21 placed with a certain gap to the wettability changeable layer 3, the energy 10 is irradiated in a pattern (FIG. 13B). Thereby, the pattern with the wettability changed is formed on the pixel part forming part 5 on the surface of the above mentioned wettability changeable layer 3. Thereafter, by detaching the photocatalyst containing layer side substrate 21, and coloring the pixel part forming part 5 with a pixel part forming ink 12 by the ink jet apparatus 11 (FIG. 13C), the pixel part 6 is formed (FIG. 13D). Hereinafter, each will be explained, respectively.

(Light Shielding Part Forming Process)

In this embodiment, first the light shielding part is formed on the wettability changeable layer (FIG. 13A). As to the light shielding part, among the light shielding parts described in the first embodiment, one formed by the photolithography method is preferable, and explanation is omitted here.

Moreover, the wettability changeable layer used in this embodiment may have or may not have the self supporting property. Since the same wettability changeable layer explained in the fourth embodiment can be used as the wettability changeable layer used in this embodiment, explanation is omitted here.

(Process for Forming a Pixel Part Forming Part Comprising a Lyophilic Area in a Pattern)

Next, the process for forming the pixel part forming part comprising the lyophilic area in a pattern will be explained.

After formation of the light shielding part 2 in the above mentioned process, similarly to the first embodiment, the photocatalyst containing layer side substrate 21 is prepared. With the photocatalyst containing layer 23 of the photocatalyst containing layer side substrate 21 placed with a gap to the above mentioned wettability changeable layer 3, the energy 10 irradiation is carried out (FIG. 13B). Since the photocatalyst containing layer side substrate and the energy irradiation process used in this embodiment are same as those of the first embodiment, explanation is omitted here. Furthermore, in this embodiment, the impurities can be removed by the energy irradiation in the above mentioned light shielding part forming process as in the second embodiment.

Moreover, in this embodiment, as in the first embodiment, the energy may be irradiated form the color filter substrate side.

(Pixel Part Forming Process)

The pixel part is formed by the ink jet method in the pixel part forming part comprising the lyophilic area formed in the above mentioned process for forming the pixel part forming part in a pattern (FIGS. 13C and 13D). Since the pixel part forming process of this embodiment is same as in the first embodiment, explanation is omitted here.

7. Seventh Embodiment

The seventh embodiment of the present invention is a method for manufacturing a color filter comprising:
(1) forming a light shielding part on a transparent base material;
(2) forming a decomposition removal layer, on the surface of the transparent base material on the side with the light shielding part formed, having a higher contact angle to a liquid than the transparent base material surface, and is decomposed and removed by the function of a photocatalyst;
(3) placing a photocatalyst containing layer of a photocatalyst containing layer side substrate, which is the photocatalyst containing layer containing a photocatalyst formed on a base member, and the decomposition removal layer with a gap of 200 μm or less, and irradiating an energy from a predetermined direction to form a pixel part forming part, in a pattern, comprising the transparent base material bared by the decomposition removal of the decomposition removal layer; and
(4) coloring the pixel part forming part by the ink jet method so as to form a pixel part.

Figure 14A:
FIGS. 14A, 14B, 14C, 14D, and 14E are process diagrams for explaining a seventh embodiment of a method for manufacturing a color filter according to the present invention.
Figure 14B:
Figure 14C:
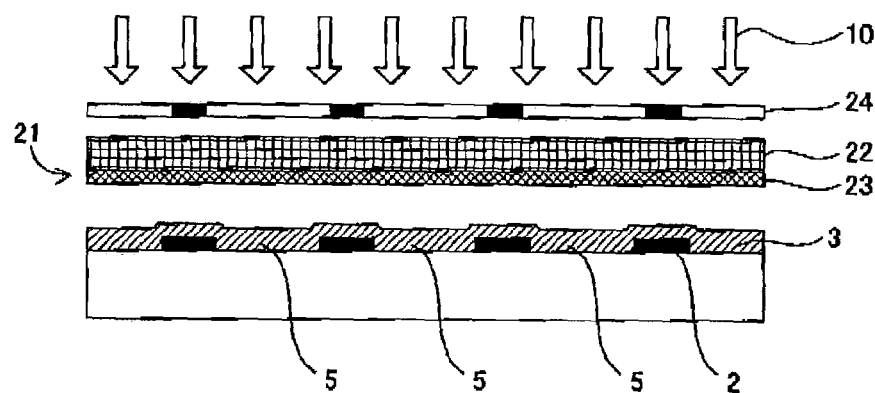
Figure 14D:
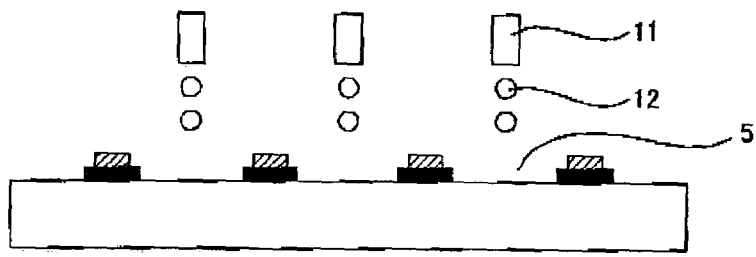
Figure 14E:
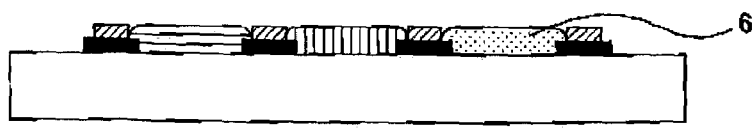

In this embodiment, as shown in FIGS. 14A, 14B, 14C, 14D, and 14E for example, the light shielding part 2 is formed on the transparent base material 1 (FIG. 14A), and the decomposition removal layer 3 is formed on the surface for preparing the color filter substrate 4 (FIG. 14B). Next, with the photocatalyst containing layer 23 formed on the base member 22 of the photocatalyst containing layer side substrate 21 and the decomposition removal layer 3 placed with a certain gap therebetween, the energy 10 is irradiated form the photocatalyst containing layer side substrate 21 side using the photomask 24 (FIG. 14C). Thereby, the decomposition removal layer 3 of the pixel part forming part with the energy irradiated is decomposed and removed. Here, since the above mentioned decomposition removal layer 3 has a higher contact angle to a liquid than that of the surface of the above mentioned transparent base material 1, the area where the transparent base material 1 is bared by decomposition and removal of the decomposition removal layer 3 can be provided as the lyophilic area, and the area where the above mentioned decomposition removal layer 3 is remaining can be provided as the liquid repellent area. Thereby, the pixel part forming part 5 which the decomposition removal layer 3 is decomposed and removed in the above mentioned process is provided as the lyophilic area, and by adhering the pixel part forming part ink 12 to the pixel part forming part 5 using the ink jet apparatus 11, the pixel part 6 is formed (FIGS. 14D and 14E).

Hereafter, each process will be explained separately. The color filter substrate in this embodiment denotes a substrate, of a color filter used for a liquid crystal display, in a state of being in a manufacturing process.

(Light Shielding Part Forming Process)

First, the light shielding part forming process will be explained. In the light shielding part of this embodiment, as shown in FIG. 14A for example, the light shielding part 2 is formed on the transparent base material 1 by the conventional method. The transparent base material and the light shielding part used in the light shielding part forming process of this embodiment will be explained hereinafter.

In this embodiment, as shown in FIGS. 14A, 14B, 14C, 14D, and 14E for example, the light shielding part 2 to be described later, and the decomposition removal layer 3 are provided on the transparent base material 1. As the transparent base material, it is not particularly limited as long as it is one conventionally used for a color filter. For example, a transparent rigid material without flexibility, such as a quartz glass, a pyrex (registered trademark), and a synthetic quartz plate, and a transparent flexible material having flexibility, such as a transparent resin film and an optical resin plate can be used. Among these, since the 7059 glass manufactured by Corning Incorporated is a material having a small thermal expansion coefficient having the excellent size stability and the workability in a high temperature heating process, and furthermore, it is a non alkaline glass not containing an alkaline component in the glass, it is particularly suitable for a color filter for a color liquid crystal display by the active matrix method. In this embodiment, as the transparent base material, transparent one is generally used, but a reflective base member and a base member colored in white can be used as well. Moreover, the transparent base material with the surface process applied, for preventing the alkaline elution, providing the gas barrier property, and for other purpose, can be used as needed.

In this embodiment, it is preferable that the transparent base material is lyophilic. Specifically, it is preferable that the contact angle to a liquid having a 40 mN/m surface tension is less than 10 degrees, more preferably, the contact angle to a liquid having a 40 mN/m surface tension is 5 degrees or less, and particularly preferably it is 1 degree or less. Moreover, a surface process may be carried out to the transparent base material so as to have the surface lyophilic. As an example of the surface process to have the material surface lyophilic, the lyophilic surface process by the plasma process utilizing an argon, water, or the like can be presented. As the lyophilic layer formed on the transparent base material, for example, a silica film of a tetraethoxy silane by the sol gel method, or the like can be presented. In this embodiment, the part where the transparent base material is bared is generally provided as the lyophilic area.

Here, in this embodiment, in the case the contact angle of the area to a liquid is smaller than the contact angle to a liquid of the adjacent area by one degree or more, it is referred to as the lyophilic area, and in contrast, in the case the contact angle of the area to a liquid is larger than the contact angle to a liquid of the adjacent area by one degree or more, it is referred to as the liquid repellent area.

The contact angle to a liquid here is obtained from the results or a graph of the results of measuring (30 seconds after dropping liquid droplets form a micro syringe) the contact angle to liquids having various surface tensions using a contact angle measuring device (CA-Z type manufactured by Kyowa Interface Science, Co., Ltd.). Moreover, at the time of the measurement, as the liquids having the various surface tensions, wetting index standard solution manufactured by Junsei Chemical Co., Ltd. were used.

Next, the light shielding part in this embodiment will be explained.

In this embodiment, the above mentioned method for forming the light shielding part on the transparent base material is not particularly limited, and a method by forming a metal thin film of a chromium or the like by about 1,000 to 2,000 Å thickness by the sputtering method, the vacuum deposition method, or the like and patterning this thin film can be presented.

Moreover, as the above mentioned light shielding part, it may be a layer containing light shielding particles such as carbon fine particles, a metal oxide, an inorganic pigment and an organic pigment in the resin binder. In this embodiment, the resin light shielding part is preferable. The thickness of the resin light shielding part can be set in a range of 0.5 to 10 μm. In general, the thickness can be provided thicker than the case of using a metal thin film.

As the resin binder to be used, one kind or a mixture of two or more kinds of resins such as a polyimide resin, an acrylic resin, an epoxy resin, a polyacrylamide, a polyvinyl alcohol, a gelatin, a casein, a cellulose, or the like, a photosensitive resin, and furthermore, an O/W emulsion type resin composition such as an emulsion of a reactive silicone or the like can be used. As the method for patterning the resin light shielding part, a commonly known method such as photolithography and a printing method can be used. In this embodiment, the resin light shielding part is preferable because it can be formed easily by the wet process.

(Decomposition Removal Layer Forming Process)

Next, the process for forming the decomposition removal layer will be explained. In the decomposition removal layer forming process of this embodiment, as shown in FIG. 14B for example, the decomposition removal layer 3 is formed on the color filter substrate 4 formed in the above mentioned light shielding part 2 forming process. Hereafter, the decomposition removal layer will be explained.

The decomposition removal layer in this embodiment may be any layer as long as it has a higher contact angle to a liquid compared with the above mentioned transparent base material, and it can be decomposed and removed by the function of the photocatalyst.

Accordingly, since the decomposition removal layer, of the part with the energy irradiation, is decomposed and removed by the function of the photocatalyst, a pattern of the part having the decomposition removal layer and the part not having the same, that is, a pattern with the ruggedness can be formed without carrying out the developing process or the cleaning process.

The decomposition removal layer is oxidized and removed by the function of the photocatalyst by the energy irradiation so as to be vaporized or the like, it can be removed without a special post process such as the developing and cleaning process or the like, however, depending on the properties of the material of the decomposition removal layer, the cleaning process or the like may be carried out.

Moreover, in the decomposition removal layer used in this embodiment, not only because it forms the ruggedness, but also because of the higher contact angle to a liquid of the decomposition removal layer compared with the above mentioned transparent base material surface, the decomposition removal layer is decomposed and removed, so that the area where the transparent base material is bared can be provided as the lyophilic area, and the area where the above mentioned decomposition removal layer is remaining can be provided as the liquid repellent area. Moreover, by adhering the ink to the lyophilic area by the ink jet method, various patterns can be formed.

Here, as to the contact angle to a liquid of the decomposition removal layer of this embodiment, it is preferable that the contact angle to a liquid having a 40 mN/m surface tension is 10° or more, preferably the contact angle to a liquid having a 30 mN/m surface tension is 10° or more, and in particular, the contact angle to a liquid having a 20 mN/m surface tension is 10° or more. In the case the contact angle to a liquid is smaller than the above mentioned range, it is difficult for the decomposition removal layer to be decomposed and removed, and to provide the area where the above mentioned transparent base material is bared as the lyophilic area, and the area where the decomposition removal layer is remaining as the liquid repellent area so that formation of a highly sophisticated pattern is difficult. Here, the contact angle to a liquid is a value measured by the above mentioned method. In this embodiment, the part where the decomposition removal layer is accordingly remaining is generally provided as the liquid repellent area.

As the film usable in the decomposition removal layer, specifically, a film of a fluorine based or hydrocarbon based liquid repellent resin or the like can be presented. The fluorine based or hydrocarbon based resins are not particularly limited as long as they have the liquid repellent property, and they can be formed by dissolving the resins in a solvent and for example by an ordinary film forming method such as a spin coating method.

Moreover, in the present invention, by use of a functional thin film, that is, a self-assembled monolayer, a Langmuir Blodgett film, and a layer-by-layer self-assembled film, a film without a defect can be formed, and thus it is further preferable to use such film forming methods.

Here, the self-assembled monolayer, the Langmuir Blodgett film, and the layer-by-layer self-assembled film used in this embodiment will be explained specifically.

(i) Self-Assembled Monolayer

Although the present inventors do not know existence of the official definition of the self-assembled monolayer, as the explanation for those commonly recognized as the self-assembled monolayers, for example, the comprehensive bibliography by Abraham Ulman "Formation and Structure of Self-Assembled Monolayers", Chemical Review, 96, 1533-1554 (1996) is excellent. With reference to the comprehensive bibliography, the self-assembled monolayer can be considered as a monomolecular layer generated as a consequence of adsorption and coupling (self assembly) of appropriate molecules on the surface of an appropriate substrate. As the material having the self-assembled monolayer forming ability, for example, surfactant molecules such as a fatty acid, organic silicon molecules of alkyl trichloro silanes, alkyl alkoxides, or the like, organic sulfur molecules of alkane thiols, or the like, organic phosphoric acid molecules of alkyl phosphates, or the like can be presented. As the general common property of the molecular structure, they have a relatively long alkyl chain, with the existence of a functional group to be interacted with the substrate surface on one side of the molecular end. The alkyl chain part is the source of the intermolecular force at the time of packing the molecules with each other two dimensionally. The examples shown here have the simplest structure, and self-assembled monolayers comprising various molecules, such as one having a functional group such as an amino group and a carboxyl group on the other end of the molecule, one whose alkylene chain part is an oxyethylene chain, a fluorocarbon chain, a composite type chain thereof, or the like, have been reported. Moreover, there is a composite type self-assembled monolayer comprising a plurality of molecule species. Moreover, recently, a particle-like polymer having a plurality of functional groups (one functional group in some cases) represented by the dendrimer, and a straight chain-like (with a branched structure in some cases) polymer formed on a one layer substrate surface (the latter is referred to as a polymer brush) are also considered to be the self-assembled monolayers in some cases. In this embodiment, these are included to the self-assembled monolayers.

(ii) Langmuir Blodgett Film

After formation on the substrate, the Langmuir-Blodgett Film used in this embodiment is not much different from the above mentioned self-assembled monolayer in terms of the form. The characteristics of the Langmuir Blodgett film lie in the forming method and the high two dimensional molecule packing property (high orientation, high order) derived therefrom. That is, in general, the Langmuir Blodgett film forming molecule is first developed on the gas liquid interface, and the developed film is condensed by the trough so as to be changed into a highly packed condensed film. Actually, it is transferred onto an appropriate substrate and used. According to the method schematically shown here, from a monolayer film to a multiple layer film of optional molecule layers can be formed. Moreover, not only a low molecule, but also a polymer, a colloid particle, or the like can be provided as the film material. As to the recent examples using the various materials, they are described in detail in the comprehensive bibliography by Tokuji Miyashita, et al. "Perspective to Nano Technology of the Soft Based Nano Device Creation" polymer 50 vol., September 644-647 (2001).

(iii) Layer-by-Layer Self-Assembled Film

The layer-by layer self-assembled film in general is a film formed by laminating a material having at least two functional groups with a positive or negative charge consecutively on a substrate by adsorption and coupling. Since a material having a large number of functional groups is advantageous in terms of increase of the film strength and the durability, recently an ionic polymer (polymer electrolyte) is often used as the material. Moreover, particles having the surface charge such as a protein, a metal, and an oxide, that is, the "colloid particles" are also used frequently as the film forming substance. Furthermore, recently, a film actively utilizing the interaction weaker than the ion coupling, such as the hydrogen bonding, the coordinate bonding, and the hydrophobic interaction has been reported. As to the relatively recent examples of the layer-by-layer self-assembled films, they are described in detail in the comprehensive bibliography by Paula T. Hammond "Recent Explorations in Electrostatic Multilayer Thin Film assembly" Current Opinion in Colloid & Interface Science, 4, 430-442 (2000) although it is slightly eccentric to the material system with the electrostatic interaction provided as the driving force. According to the explanation of the simplest process of the layer-by-layer self-assembled film, it is a film formed by repeating the cycle of adsorption of a material having a positive (negative) charge-cleaning-adsorption of a material having a negative (positive) charge-cleaning by predetermined times. Unlike the Langmuir Blodgett film, the operation of development-condensation-transfer is not needed at all. Moreover, as it is apparent from the manufacturing method difference, the layer-by-layer self-assembled film in general does not have the two dimensional high orientation, high order like the Langmuir Blodgett film. However, the layer-by-layer self-assembled film and the manufacturing method thereof have many advantages, which have not been provided in the conventional film forming methods, such as easy formation of a dense film without a defect, and even film formation on a minutely rugged surface, a tube inner surface, a spherical surface, or the like.

Moreover, as to the film thickness of the decomposition removal layer, it is not particularly limited as long as it is a film thickness to the degree to be decomposed and removed by the energy irradiated in the energy irradiating process to be described later. As the specific film thickness, although it depends drastically on to the kind of the energy to be irradiated, the material of the decomposition removal layer, or the like, in general it is preferably in a range of 0.001 μm to 1 μm, in particular in a range of 0.01 μm to 0.1 μm.

(Process for Forming a Pixel Part Forming Part in a Pattern)

Next, the process for forming the pixel part forming part in a pattern in this embodiment will be explained. In the process for forming the pixel part forming part in a pattern in this embodiment, as shown in FIG. 14C for example, with the photocatalyst containing layer 23 of the photocatalyst containing layer side substrate 21 and the decomposition removal layer 3 placed with a gap of 200 μm or less, the energy 10 is irradiated in a pattern using the photomask 24 for the pixel part forming part pattern. Thereby, a process for forming the pixel part forming part 5 provided as the lyophilic area by the decomposition and removal of the decomposition removal layer 3 can be provided. In the process, the photocatalyst containing layer substrate is first prepared, and the energy irradiation is carried out with the photocatalyst containing layer substrate placed with a gap to the above mentioned decomposition removal layer. Since the photo catalyst containing layer side substrate, the energy irradiating method, the irradiation direction, the energy to be irradiated, or the like used in this embodiment are same as those in the first embodiment, explanation is omitted here.

(Pixel Part Forming Process)

Next, the process for forming the pixel part in this embodiment will be explained. According to the above mentioned process, as shown in FIG. 14D for example, the pixel part forming ink 12 is discharged to the pixel part forming part 5 with the transparent base material 1 bared and provided as the lyophilic area using the ink jet apparatus 11 so as to color in red, green and blue to form the pixel part 6.

In this case, since the pixel part forming part 5 is provided as the lyophilic area as mentioned above, the pixel part forming ink 12 discharged from the ink jet apparatus 11 is spread evenly in the pixel part forming part 5. Moreover, since the area without the energy irradiation, the area with the decomposition removal layer remaining, is provided as the liquid repellent area, the ink is repelled and removed in this area.

The pixel part in general is formed with the three colors of red (R), green (G), and blue (B). The coloring pattern and the coloring area in the pixel part can be set optionally. As the inks to be used for the ink jet method for forming the pixel part, they are classified on the whole to the water based type and the oil based type. In this embodiment, either type can be used, however, in terms of the surface tension, the water based inks are preferable.

Figure 15A:
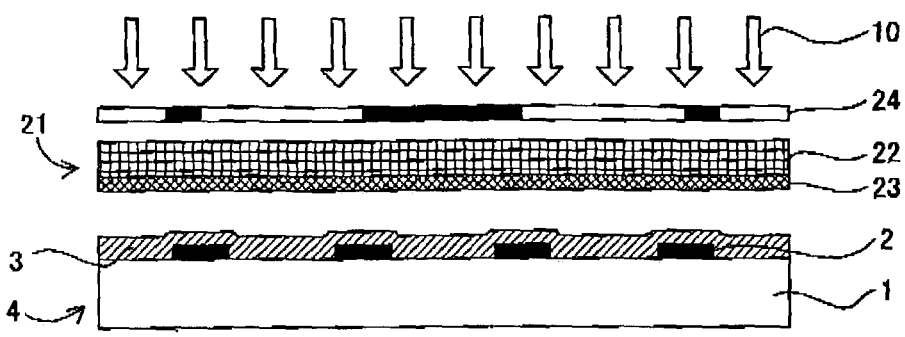
FIGS. 15A, 15B, 15C and 15D are process diagrams for explaining a method for manufacturing a liquid repellent convex part in the method for manufacturing a color filter shown in FIGS. 14A, 14B, 14C, 14D, and 14E.
Figure 15B:
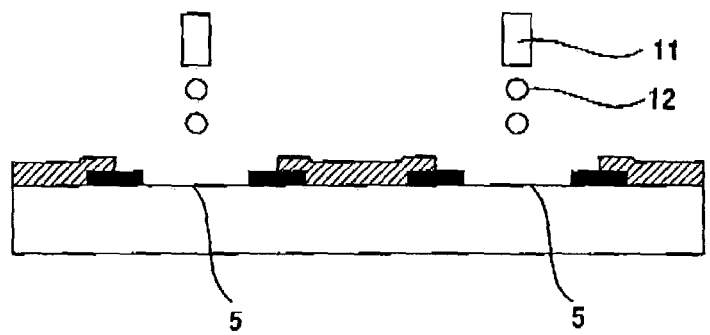
Figure 15C:
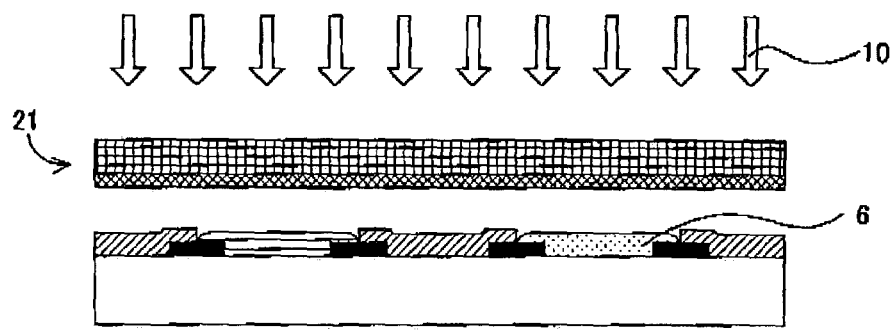

FIGS. 15A, 15B, 15C and 15D show examples of executing the energy irradiation and the pixel part formation, divided in two times of operations. Similarly to the above mentioned example shown in FIGS. 14A, 14B, 14C, 14D, and 14E, the light shielding part 2 is formed on the transparent base material 1, and the decomposition removal layer 3 is formed so as to cover the light shielding part 2. With the decomposition removal layer 3 and the photocatalyst containing layer 23 of the photocatalyst containing layer side substrate 21 placed with a certain gap therebetween, the energy 10 is irradiated using the photomask 24 and the photocatalyst containing substrate so as to form the pixel parts in every other pixel part forming parts (FIG. 15A). To the every other pixel part forming part 5 provided as the lyophilic area with the decomposition removal layer decomposed and removed in the above mentioned process, the pixel part forming ink 12 is adhered using the ink jet apparatus 11 (FIG. 15B). Thereby, the pixel parts 6 are formed in the every other part in the pixel part forming parts (FIG. 15C). As to the pixel parts formed here, it is preferable that the pixel parts themselves are liquid repellent to prevent ink coloring, by the ink jet apparatus, in the second operation on the pixel parts. Moreover, the surface there of may be processed by an ink repellent processing agent such as a silicone compound and a fluorine containing compound.

Figure 15D:
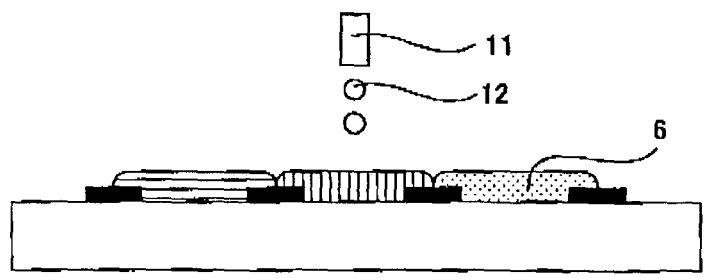

Then, by irradiating the energy 10 again from the photocatalyst containing layer side substrate 21 side with the decomposition removal layer 3, with the pixel parts formed in the every other part, and the photocatalyst layer 23 placed with a certain gap similarly to the above mentioned, the decomposition removal layer 3 in the pixel part forming parts which have not been decomposed and removed in the above mentioned process are decomposed and removed (FIG. 15C). Thereby, the pixel part forming ink 12 is adhered to the pixel part forming parts 5 provided as the lyophilic area by baring the transparent base material by the decomposition of the decomposition removal layer, using the ink jet apparatus 11 similarly to the above mentioned so that a color filter can be obtained (FIG. 15D).

According to the method, since the distance between the pixel parts can be reduced or removed, a coloring layer (assembly of the pixel parts) having the excellent flatness can be formed. Moreover, since the interval between the pixel parts to be formed at the time of the first pixel part formation is wide, the inks cannot be mixed beyond the parts. Therefore, a high quality color filter without the ink color mixture or the like can be obtained.

Although the pixel parts 6 formed in the first formation is in the every other part in the above mentioned method, the present invention is not limited thereto, and as long as the pixel parts formed initially are not provided adjacently, it may be changed depending on the shape of the pixel parts of the color filter, such as the zigzag shape. Moreover, although the pixel parts are formed in two times of operations in the above mentioned explanation, the pixel parts may be formed by three or more times of operations, as needed.

(Liquid Repellent Convex Part)

In this embodiment, the process of forming the liquid repellent convex part energy irradiating part by irradiating the energy to the photocatalyst containing layer on the light shielding part, and forming the liquid repellent convex part in the liquid repellent convex part energy irradiating part may be provided after the decomposition removal layer forming process.

Figure 16A:
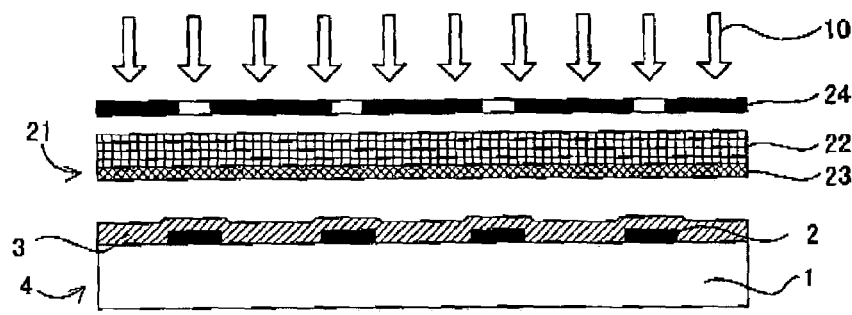
FIGS. 16A, 16B, 16C, 16D, and 16E are schematic diagrams for explaining another example of method for irradiating an energy to a pixel part in the method for manufacturing a color filter shown in FIGS. 14A, 14B, 14C, 14D, and 14E.
Figure 16B:
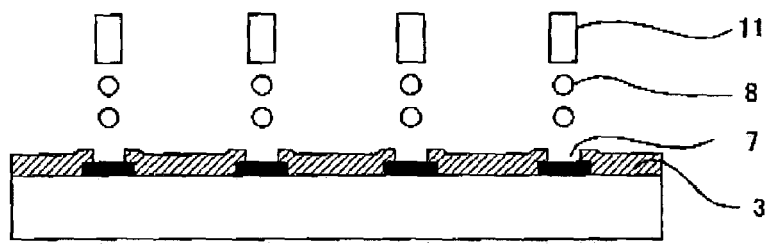

An example of the process for forming the liquid repellent convex part will be explained using FIGS. 16A, 16B, 16C, 16D, and 16E. Similarly to the above mentioned seventh embodiment shown in FIGS. 14A, 14B, 14C, 14D, and 14E, the light shielding part 2 is formed on the transparent base material 1, and the decomposition removal layer 3 is formed so as to cover the same. With the decomposition removal layer 3 and the photocatalyst containing layer 23 of the photocatalyst containing layer side substrate 21 placed with a certain gap therebetween, the energy 10 is irradiated using the photomask 24 in a pattern for forming the liquid repellent convex part on the light shielding part 2 (FIG. 16A). Here, it is preferable that the contact angle to a liquid of the decomposition removal layer 3 is larger than the contact angle to a liquid of the light shielding part. Thereby, the liquid repellent convex part forming part 7 with the decomposition removal layer 3 decomposed and removed can be provided as the lyophilic area so that the liquid repellent convex part forming ink 8 such as the UV curing type resin monomer can be adhered easily by the ink jet apparatus 11 (FIG. 16B). The coating method for the liquid repellent convex part ink is not limited to the method by the ink jet apparatus, and for example, other methods such as dip coating can be used as well.

Figure 16C:
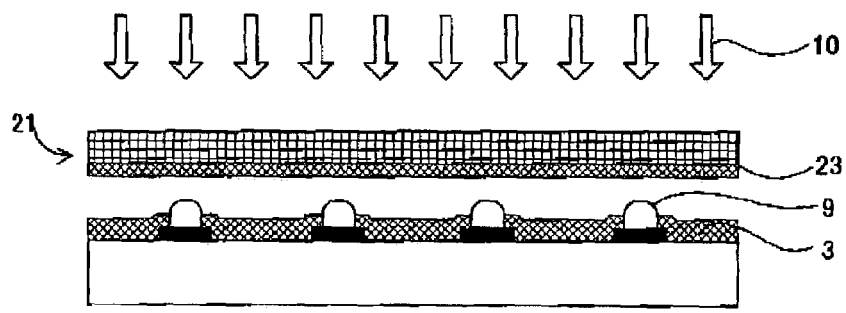

Then, by curing the liquid repellent convex part forming ink 8 by the UV irradiation or the like, the liquid repellent convex part 9 is formed on the light shielding part 2 (FIG. 16C). It is preferable that the width of the liquid repellent convex part 9 is formed narrower than the width of the light shielding part 2 as shown in the figure. By accordingly forming, since the width of the pixel part to be formed in the process described later can be made wider than the width of the opening part formed by the light shielding part, the problem of the color omission, or the like are not generated as mentioned above.

Figure 16D:
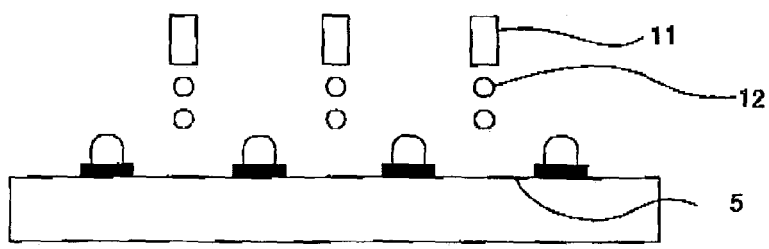
Figure 16E:
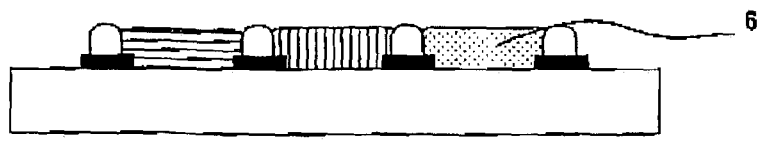

By placing the decomposition removal layer 3 with the liquid repellent convex part 9 formed accordingly and the photocatalyst containing layer 23 of the photocatalyst containing layer side substrate 21 with a certain gap therebetween, and irradiating the energy 10 to the entire surface or in a pattern from the photocatalyst containing substrate 21 side, the portion without the liquid repellent convex part 9 formed is irradiated with the energy so that the decomposition removal layer 3 is decomposed and removed so as to form the pixel part forming part 5 of the lyophilic area with the transparent base material 1 bared (FIG. 16C). Thereafter, similarly to the above mentioned method, by adhering the pixel part forming ink 12 to the pixel part forming part provided as the lyophilic area using the ink jet apparatus 11 and by curing, the pixel part 6 is formed so that a color filter provided with the liquid repellent convex part 9 can be manufactured (FIGS. 16D and 16E).

Moreover, according to the liquid repellent convex part, by contacting the liquid repellent convex part and the photocatalyst containing layer at the time of irradiating the energy using the photocatalyst containing layer side substrate to provide the above mentioned pixel part forming part as the lyophilic area, the liquid repellent convex part can act as a spacer for maintaining a certain gap.

Although the liquid repellent convex part is formed by the decomposition and removal of the photocatalyst containing layer in this embodiment, the present invention is not limited thereto, and for example, the liquid repellent convex part may be provided by the photolithography method or the like.

8. Eighth Embodiment

The eighth embodiment of the present invention is a method for manufacturing a color filter comprising:
(1) forming a decomposition removal layer, on the a transparent base material, having a higher contact angle to a liquid than the transparent base material surface and is decomposed and removed by the function of a photocatalyst;
(2) placing the decomposition removal layer and a photocatalyst containing layer of a photocatalyst containing layer side substrate, which is the photocatalyst containing layer containing a photocatalyst formed on a base member, with a gap of 200 μm or less, and irradiating an energy from a predetermined direction to form a light shielding part forming part, in a pattern, comprising the transparent base material bared by the decomposition removal of the decomposition removal layer;
(3) forming a light shielding part in the light shielding part forming part;
(4) placing the decomposition removal layer with the light shielding part formed thereon, and the photocatalyst containing layer with a gap of 200 μm or less, and irradiating an energy from a predetermined direction to form a pixel part forming part, in a pattern, comprising the transparent base material bared by the decomposition removal of the decomposition removal layer; and
(5) coloring the pixel part forming part by an ink jet method so as to form a pixel part.

In this embodiment, as shown in FIGS. 17A, 17B, 17C, 17D, 17E, and 17F for example, the decomposition removal layer 3 is first formed on the entire surface of the transparent base material 1 (FIG. 17A). Next, with the photocatalyst containing layer 23 formed on the base member 22 of the photocatalyst containing layer side substrate 21 placed with a certain gap to the decomposition removal layer 3, the energy 10 is irradiated in a pattern to the light shielding part forming part using the photomask 24 (FIG. 17B). By the energy irradiation, the decomposition removal layer 3 in the light shielding part forming part is decomposed and removed so that the light shielding part 2 is formed on the lyophilic area with the transparent base material 1 bared (FIG. 17C). Next, with the decomposition removal layer 3 with the light shielding part formed and the photocatalyst containing layer 23 formed on the base member 22 of the photocatalyst containing layer side substrate 21 placed with a certain gap therebetween, the energy 10 is irradiated (FIG. 17D). Thereby, the decomposition removal layer 3 of the pixel part forming part 5 is decomposed and removed so that the lyophilic area with the transparent base material 1 bared is provided. By coloring the pixel part forming part 5 provided as the lyophilic area with the pixel part forming ink 12 by the ink jet apparatus 11 (FIG. 17E), the pixel part 6 is formed (FIG. 17F). Hereafter, each process will be explained.

(Decomposition Removal Layer Forming Process)

First, the decomposition removal layer 3 is formed on the entire surface of the transparent base material 1 (FIG. 17A). Since the transparent base material and the decomposition removal layer used here are same as those in the seventh embodiment, explanation is omitted here.

(Process for Forming a Light Shielding Part Forming Part Comprising a Lyophilic Area in a Pattern)

Next, similarly to the first embodiment, the photocatalyst containing layer side substrate 21 is prepared. With the photocatalyst containing layer 23 of the photocatalyst containing layer side substrate 21 placed with a gap to the decomposition removal layer 3, the energy 10 is irradiated, using the photomask 24, to only the light shielding part forming part (FIG. 17B). By the energy irradiation, the decomposition removal layer 3 provided on the light shielding part forming part is decomposed and removed. At the time, the pixel part forming part is not irradiated with the energy, and thus it is the liquid repellent area with the decomposition removal layer remaining. In this embodiment, pattern formation is carried out utilizing the liquid repellent property difference according to the existence and absence of the decomposition removal layer. The photocatalyst containing layer side substrate used in this embodiment is not particularly limited as long as only the light shielding part is irradiated with the energy in a pattern as mentioned in the first embodiment, and one using a photomask, one with the photocatalyst containing layer formed in a pattern, and one having the photocatalyst containing layer and the light shielding part can be used as well.

Since the photocatalyst containing layer side substrate and the energy irradiating process used in this embodiment are same as those in the first embodiment, explanation is omitted here.

(Light Shielding Part Forming Process)

Next, the light shielding part 2 is formed in the light shielding part forming part provided as the lyophilic area in the above mentioned process by the ink jet method or the like (FIG. 17C). In this case, since the pixel part forming part not provided as the lyophilic area is liquid repellent as mentioned above, the light shielding part paint is not adhered onto the decomposition removal layer having the liquid repellent property so that the light shielding part can be formed easily by the ink jet method or the like.

Here, the light shielding part forming method of this embodiment is not limited to the above mentioned ink jet method, and it may be the photolithography method or the like.

Since the light shielding part material or the like in this embodiment is same as that in the first embodiment, explanation is omitted here.

(Process for Forming a Pixel Part Forming Part Comprising a Lyophilic Area in a Pattern)

Next, similarly to the process for forming the light shielding part forming part in a pattern, the decomposition removal layer for the color filter substrate with the light shielding part formed in the above mentioned process, with the photocatalyst containing layer 23 of the photocatalyst containing layer side substrate 21 and the decomposition removal layer 3 placed with a gap therebetween, the energy 10 is irradiated to the pixel part forming part (FIG. 17D). By the energy irradiation, the decomposition removal layer 3 provided on the pixel part forming part 5 is decomposed and removed so as to be formed as the lyophilic area. The energy irradiation in this case may be carried out in a pattern or to the entire surface.

Here, in this embodiment, according to the above mentioned energy irradiation, not only the decomposition removal layer in the pixel part forming part can be decomposed and removed but also the impurities on the color filter generated in the above mentioned light shielding part forming process can be removed at the same time. In the case the above mentioned light shielding part is formed for example by the photolithography method, a cleaning process is generally needed after the light shielding part formation, and it is carried out by the method such as the irradiation of the UV including a low pressure mercury lamp, an excimer lamp, or the like to the entire surface. However, in this embodiment, since the organic substances on the color filter substrate can also be decomposed by irradiating the energy, using the above mentioned photocatalyst containing layer side substrate, the cleaning process is not neseccary, and thus it is preferable also in terms of the production efficiency and the cost.

The process for forming the pixel part forming part in a pattern in this embodiment is same as that in the first embodiment, explanation is omitted here.

(Pixel Part Forming Process)

Furthermore, by adhering the pixel part forming ink 12 to the pixel part forming part 5 provided as the lyophilic area by the decomposition and removal of the decomposition removal layer by the energy irradiation in the above mentioned process by the ink jet apparatus 11, the pixel part is formed (FIGS. 17E and 17F). Since the pixel part forming process in this embodiment is same as that in the first embodiment, explanation is omitted here.

9. Ninth Embodiment

The ninth embodiment of the present invention is a method for manufacturing a color filter comprising:

(1) forming a decomposition removal layer, on the a transparent base material, having a higher contact angle to a liquid than the transparent base material surface and is decomposed and removed by the function of a photocatalyst;

(2) placing the decomposition removal layer and a photocatalyst containing layer of a photocatalyst containing layer side substrate, which is the photocatalyst containing layer containing a photocatalyst formed on a base member, with a gap of 200 μm or less, and irradiating an energy from a predetermined direction to form a pixel part forming part, in a pattern, comprising the transparent base material bared by the decomposition removal of the decomposition removal layer;

(3) coloring the pixel part forming part by the ink jet method so as to form a pixel part;

(4) placing the decomposition removal layer with the pixel part formed thereon, and the photocatalyst containing layer with a gap of 200 μm or less, and irradiating an energy from a predetermined direction to form a light shielding part forming part, in a pattern, comprising the transparent base material bared by the decomposition removal of the decomposition removal layer; and (5) forming a light shielding part in the light shielding part forming part.

Figure 18A:
FIGS. 18A, 18B, 18C, 18D, and 18E are process diagrams for explaining a ninth embodiment of a method for manufacturing a color filter according to the present invention.
Figure 18B:
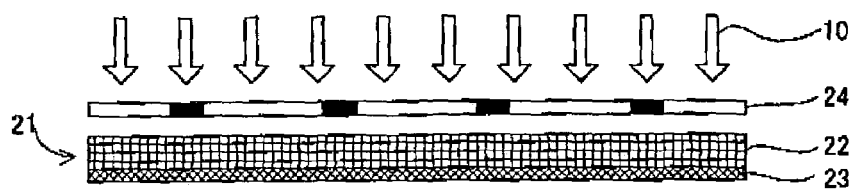
Figure 18C:
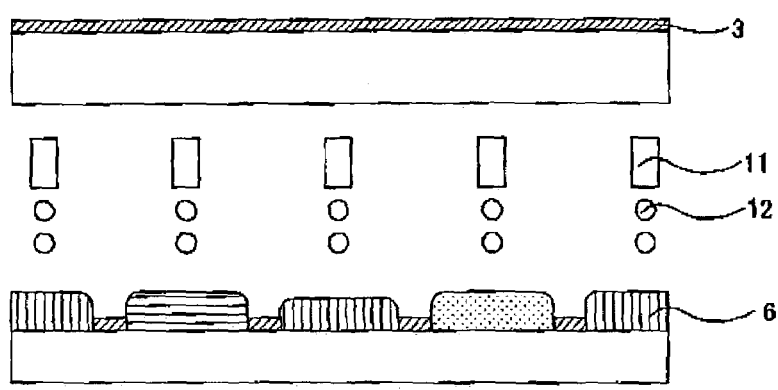
Figure 18D:
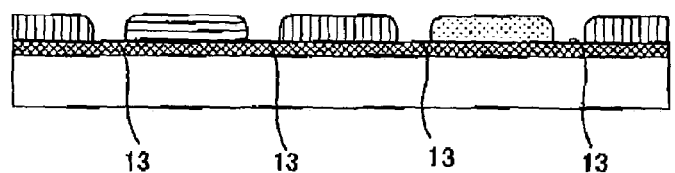
Figure 18E:

In this embodiment, as shown in FIGS. 18A, 18B, 18C, 18D, and 18E for example, the decomposition removal layer 3 is formed on the transparent base material 1 (FIG. 18A). Next, with the photocatalyst containing layer 23 formed on the base member 22 of the photocatalyst containing layer side substrate 21 placed with a certain gap to the decomposition removal layer 3, the energy is irradiated to the pixel part forming part in a pattern using the photomask 24 (FIG. 18B). By the energy irradiation, the decomposition removal layer 3 of the pixel part forming part is decomposed and removed so as to provide the lyophilic area with the transparent base material 1 bared. By coloring the pixel part forming part provided as the lyophilic area by the decomposition and removal of the decomposition removal layer, with the pixel part forming ink 12, by the ink jet apparatus 11 (FIG. 18C), the pixel part 6 is formed. With the decomposition removal layer 3 with the pixel part formed and the photocatalyst containing layer 23 formed on the base member 22 of the photocatalyst containing layer side substrate 21 placed with a certain gap therebetween similarly to the above mentioned, the energy 10 is irradiated (FIG. 18D) to decompose and remove the decomposition removal layer of the light shielding part forming part. The light shielding part 2 is formed on the light shielding part forming part 13 which the decomposition removal layer are decomposed and removed (FIG. 18E). Hereafter, each process will be explained.

(Decomposition Removal Layer Forming Process)

First, the decomposition removal layer 3 is formed on the entire surface of the transparent base material 1 (FIG. 18A). Since the transparent base material and the decomposition removal layer used here are same as those in the seventh embodiment, explanation is omitted here.

(Process for Forming a Pixel Part Forming Part Comprising a Lyophilic Area in a Pattern)

Next, similarly to the first embodiment, the photocatalyst containing layer side substrate 21 is prepared. With the photocatalyst containing layer 23 of the photocatalyst containing layer side substrate 21 placed with a gap to the decomposition removal layer 3, the energy 10 is irradiated to only the pixel part forming part using the photomask 24 (FIG. 18B). By the energy irradiation, the decomposition removal layer provided on the pixel part forming part is decomposed and removed. At the time, the light shielding part forming part is not irradiated with the energy so that it is provided as the liquid repellent area. In this embodiment, pattern formation is carried out utilizing the liquid repellent property difference according to the existence and absence of the decomposition removal layer. The photocatalyst containing layer side substrate used in this embodiment is not particularly limited as long as only the pixel part forming part is irradiated with the energy in a pattern as mentioned in the first embodiment, and one using a photomask, one with the photocatalyst containing layer formed in a pattern, and one having the photocatalyst containing layer and the light shielding part can be used as well.

Since the photocatalyst containing layer side substrate and the energy irradiating process used in this embodiment are same as those in the first embodiment, explanation is omitted here.

(Pixel Part Forming Process)

Next, the pixel part is formed in the pixel part forming part provided as the lyophilic area formed in the above mentioned process for forming the pixel part forming part comprising the lyophilic area in a pattern by the ink jet method (FIG. 18C). In this case, since the light shielding part forming part is liquid repellent as mentioned above, the pixel part can be formed easily by the ink jet method or the like. Since the pixel part forming process in this embodiment is same as that in the first embodiment, explanation is omitted here.

Moreover, in this embodiment, the formation method of executing the energy irradiation and the pixel part formation divided in two or more times as explained in the above mentioned first embodiment may be used because the inks may be mixed due to the narrow liquid repellent area between the pixel parts at the time of forming the pixel parts.

(Process for Forming a Light Shielding Part Forming Part Comprising a Lyophilic Area in a Pattern)

Next, similarly to the process for forming the pixel part forming part in a pattern, with the decomposition removal layer 3 for the color filter substrate with the pixel part formed in the above mentioned process and the photocatalyst containing layer 23 of the photocatalyst containing layer side substrate 21 placed with a gap therebetween, the energy 10 is irradiated to the light shielding part forming part (FIG. 18D). By the energy irradiation, the decomposition removal layer 3 provided on the light shielding part forming part 13 is decomposed and removed so as to form the lyophilic area. Since the energy irradiating process for forming the light shielding part forming part in a pattern in this embodiment is same as that in the first embodiment, explanation is omitted here.

(Light Shielding Part Forming Process)

Next, the light shielding part 2 is formed in the light shielding part forming part 13 provided as the lyophilic area in the above mentioned process by the ink jet method or the like (FIG. 18E). Since the light shielding part forming process in this embodiment is same as that in the eighth embodiment, explanation is omitted here.

10. Others

In the above mentioned embodiments of the methods for manufacturing a color filter, a protecting layer forming process or a process for forming other necessary functional layers may be executed.

B. Color Filter

Next, a color filter of the present invention will be explained.

The color filter of the present invention is comprising a transparent base material, a pixel part with a plurality of colors provided in a predetermined pattern on the transparent base material by the ink jet method, a light shielding part provided in the pixel part boundary part, and a decomposition removal layer to be decomposed and removed by a photocatalyst provided for forming the above mentioned pixel part or the above mentioned light shielding part.

Figure 19:
FIG. 19 is a diagram showing an example of a color filter according to the present invention.

In the color filter of the present invention, as shown in FIG. 19 for example, comprises the pixel part 6 with a plurality of colors provided in a predetermined pattern on the transparent base material 1 by the ejecting method, the light shielding part 2 provided in the pixel part boundary part, and the decomposition removal layer 3 to be decomposed and removed by the function of the photocatalyst on the light shielding part.

Since the decomposition removal layer having a contact angle to a liquid larger than that on the transparent base material is formed on the above mentioned light shielding part, the ink color mixture or the like can be prevented at the time of forming the pixel part so that a color filter having a highly sophisticated pattern can be provided, and thus it is advantageous.

Since the transparent base material, the pixel part, the light shielding part, the decomposition removal layer, and the manufacturing method of the color filter can be formed using the above mentioned seventh embodiment, explanation is omitted here.

C. Color Liquid Crystal Display

In the present invention, a color liquid crystal display is formed by using the color filter of any of the above mentioned first to ninth embodiments, combining with a facing substrate facing to the color filter, and sealing a liquid crystal compound therebetween. The color liquid crystal display accordingly obtained has the advantages of the color filter of the present invention, that is, without the color omission or the color fading, and the advantage in terms of the cost.

The present invention is not limited to the above mentioned embodiments. The above mentioned embodiments are merely examples, and any one having the substantially same configuration as the technological idea disclosed in the claims of the present invention and the same effects is included in the technological scope of the present invention.

For example, in the above mentioned explanation for the method for manufacturing a color filter, and the color filter, although only the example of the contact angle to a liquid of the decomposition removal layer larger than the contact angle to a liquid of the transparent base material has been explained, the contact angle to a liquid of the decomposition removal layer maybe smaller than the contact angle to a liquid of the transparent base material. In this case, the area with the decomposition removal layer decomposed and removed is provided as the liquid repellent area, and the area with the decomposition removal layer remaining is provided as the lyophilic area. Thereby, for example, formation of the pixel part by the ink jet method is carried out on the lyophilic area on the decomposition removal layer.

EXAMPLES

Hereinafter, the present invention will be explained in further details with reference to the examples.

Example 1

1. Formation of the Photocatalyst Containing Layer Side Substrate 5 g of a trimethoxy methyl silane (TSL8113, manufactured by GE Toshiba Silicones Co., Ltd.) and 2.5 g of a 0.5 normal hydrochloric acid were mixed, and agitated for 8 hours. The same was diluted by an isopropyl alcohol to 10 times so as to provide a primer layer composition.

By coating the above mentioned primer layer composition onto a photomask substrate by a spin coater, and executing a drying process at 150° C. for 10 minutes, a transparent primer layer (thickness 0.2 µm) was formed.

Next, 30 g of an isopropyl alcohol, 3 g of a trimethoxy methyl silane (TSL8113, manufactured by GE Toshiba Silicones Co., Ltd.), and 20 g of ST-K03 (manufactured by Ishihara Sangyo Kaisha, Ltd.) as a photocatalyst inorganic coating agent were mixed and agitated at 100° C. for 20 minutes. The same was diluted by an isopropyl alcohol to 3 times so as to provide a photocatalyst containing layer composition.

By coating the above mentioned photocatalyst containing layer composition on the photomask substrate with the primer layer formed by a spin coater, and executing a drying process at 150° C. for 10 minutes, a transparent photocatalyst containing layer (thickness 0.15 µm) was formed.

2. Formation of the Wettability Changeable Layer 30 g of an isopropyl alcohol, 0.4 g of a fluoro alkyl silane (manufactured by GE Toshiba Silicones Co., Ltd.), 3 g of a trimethoxy methyl silane (TSL8113, GE Toshiba Silicones Co., Ltd.), and 2.5 g of a 0.5 normal hydrochloric acid were mixed and agitated for 8 hours. The same was diluted by an isopropyl alcohol to 100 times so as to provide a wettability changeable layer composition.

By coating the above mentioned wettability changeable layer composition on the transparent substrate with the light shielding layer formed by a spin coater, and executing a drying process at 150° C. for 10 minutes, a transparent wettability changeable layer (thickness 0.1 µm) was formed.

3. Confirmation of the Lyophilic Area Formation by Exposure

The aligned photocatalyst containing layer side substrate and the wettability changeable layer were faced with each other with a 100 µmgap therebetween, exposed by a 40 mW/cm² illuminance by an extra high pressure mercury lamp (wavelength 365 nm) from the photomask side for 60 seconds so as to form a pixel part forming part comprising the lyophilic area on the wettability changeable layer in a pattern.

At the time, the contact angles of the unexposed part and the pixel part forming part to a wetting index standard solution of 40 mN/m surface tension (manufactured by Junsei Chemical, Co., Ltd.) was measured (30 seconds after dropping liquid droplets form a micro syringe) using a contact angle measuring device (CA-Z type manufactured by Kyowa Interface Science, Co., Ltd.), and they were 70°, and 7°, respectively.

4. Formation of the Pixel Part

Next, using the ink jet apparatus, UV curing type polyfunctional acrylate monomer inks of each RGB colors containing 5 parts by weight of a pigment, 20 parts by weight of a solvent, 5 parts by weight of a polymerization initiating agent, and 70 parts by weight of a UV curing resin were adhered on the pixel part exposing part provided as lyophilic on the transparent substrate for coloring, and the UV process was executed thereto for curing. For the red, green and blue inks, as the solvent, a polyethylene glycol monomethyl ethyl acetate, as the polymerization initiating agent, IRUGACURE 369 (product name, manufactured by Chiba Specialty Chemicals), and as the UV curing resin, a DPHA (dipenta erythritol hexaacrylate (manufactured by NIPPON KAYAKU CO., LTD.) were used. Moreover, as the pigment, for the red ink, C. I. Pigment Red 177, for the green ink, C. I. Pigment Green 36, and for the blue ink, C. I. Pigment Blue 15+C. I. Pigment Violet 23 were used, respectively.

5. Formation of the Protecting Layer

As the protecting layer, a two liquid mixing type thermosetting agent (manufactured by Nippon Gosei Gomu Co., SS7265) was coated by a spin coater. By carrying out curing process at 200° C. for 30 minutes, a protecting layer was formed so as to obtain a color filter. The obtained color filter was of a high quality without the color omission or the color irregularity in the pixel part.

Example 2

1. Formation of the Photocatalyst Containing Layer Side Substrate 5 g of a trimethoxy methyl silane (TSL8113, manufactured by GE Toshiba Silicones Co., Ltd.) and 2.5 g of a 0.5 normal hydrochloric acid were mixed, and agitated for 8 hours. The same was diluted by an isopropyl alcohol to 10 times so as to provide a primer layer composition.

By coating the above mentioned primer layer composition onto a photomask substrate by a spin coater, and executing a drying process at 150° C. for 10 minutes, a transparent primer layer (thickness 0.2 μm) was formed.

Next, 30 g of an isopropyl alcohol, 3 g of a trimethoxy methyl silane (TSL8113, manufactured by GE Toshiba Silicones Co., Ltd.), and 20 g of ST-K03 (manufactured by Ishihara Sangyo Kaisha, Ltd.) as a photocatalyst inorganic coating agent were mixed and agitated at 100° C. for 20 minutes. The same was diluted by an isopropyl alcohol to 3 times so as to provide a photocatalyst containing layer composition.

By coating the above mentioned photocatalyst containing layer composition on the photomask substrate with the primer layer formed by a spin coater, and executing a drying process at 150° C. for 10 minutes, a transparent photocatalyst containing layer (thickness 0.15 μm) was formed.

2. Formation of the Decomposition Removal Layer 2 g of EUPIRON Z400 (manufactured by Mitsubishi Gas Chemical Company, Inc.) containing a polycarbonate as the main component was dissolved into 30 g of a dichloro methane and 70 g of a 112 trichloro ethane so as to provide a decomposition layer removal layer composition.

By coating the above mentioned decomposition removal layer compound on the glass substrate with the light shielding layer formed by a spin coater, and executing a drying process at 100° C. for 60 minutes, a transparent wettability changeable layer (thickness 0.01 μm) was formed.

3. Formation of the Pixel Part Forming Part by the Exposure

The aligned photocatalyst containing layer side substrate and the decomposition removal layer were faced with each other with a 100 μm gap therebetween, exposed by a 40 mW/cm² illuminance by an extra high pressure mercury lamp (wavelength 365 nm) from the photomask side for 600 seconds so as to decompose and remove the decomposition removal layer and form a pixel part forming part comprising the bared glass substrate in a pattern.

At the time, the contact angles of the unexposed part and the pixel part forming part to a wetting index standard solution of 40 mN/m surface tension (manufactured by Junsei Chemical, Co., Ltd.) was measured (30 seconds after dropping liquid droplets form a micro syringe) using a contact angle measuring device (CA-Z type manufactured by Kyowa Interface Science, Co., Ltd.), and they were 49°, and 6°, respectively.

4. Formation of the Pixel Part

Next, using the ink jet apparatus, UV curing type polyfunctional acrylate monomer inks of each RGB colors containing 5 parts by weight of a pigment, 20 parts by weight of a solvent, 5 parts by weight of a polymerization initiating agent, and 70 parts by weight of a UV curing resin were adhered on the pixel part forming part for coloring, and the UV process was executed thereto for curing. For the red, green and blue inks, as the solvent, a polyethylene glycol monomethyl ethyl acetate, as the polymerization initiating agent, IRUGACURE 369 (product name, manufactured by Chiba Specialty Chemicals), and as the UV curing resin, a DPHA (dipenta erythritol hexaacrylate (manufactured by NIPPON KAYAKU CO., LTD.) were used. Moreover, as the pigment, for the red ink, C. I. Pigment Red 177, for the green ink, C. I. Pigment Green 36, and for the blue ink, C. I. Pigment Blue 15+C. I. Pigment Violet 23 were used, respectively.

5. Formation of the Protecting Layer

As the protecting layer, a two liquid mixing type thermosetting agent (manufactured by Nippon Gosei Gomu Co., SS7265) was coated by a spin coater. By carrying out the curing process at 200° C. for 30 minutes, a protecting layer was formed so as to obtain a color filter. The obtained color filter was of a high quality without the color omission or the color irregularity in the pixel part.

Example 3

1. Formation of the Photocatalyst Containing Layer Side Substrate 5 g of a trimethoxy methyl silane (TSL8113, manufactured by GE Toshiba Silicones Co., Ltd.) and 2.5 g of a 0.5 normal hydrochloric acid were mixed, and agitated for 8 hours. The same was diluted by an isopropyl alcohol to 10 times so as to provide a primer layer composition.

By coating the above mentioned primer layer composition onto a photomask substrate by a spin coater, and executing a drying process at 150° C. for 10 minutes, a transparent primer layer (thickness 0.2 μm) was formed.

Next, 30 g of an isopropyl alcohol, 3 g of a trimethoxy methyl silane (TSL8113, manufactured by GE Toshiba Silicones Co., Ltd.), and 20 g of ST-K03 (manufactured by Ishihara Sangyo Kaisha, Ltd.) as a photocatalyst inorganic coating agent were mixed and agitated at 100° C. for 20 minutes.

The same was diluted by an isopropyl alcohol to 3 times so as to provide a photocatalyst containing layer composition.

By coating the above mentioned photocatalyst containing layer composition on the photomask substrate with the primer layer formed by a spin coater, and executing a drying process at 150° C. for 10 minutes, a transparent photocatalyst containing layer (thickness 0.15 µm) was formed.

2. Formation of the Decomposition Removal Layer

A polydiallyl dimethyl ammonium chloride (PDDA, average molecular weight 100,000 to 200,000, ARUDORICCHI) as a cationic polymer, and a sodium polystyrene sulfonate (PSS, average molecular weight 70,000, ARUDORICCHI) as an anionic polymer were assembled layer by layer on a glass base material by about a 2 nm thickness.

3. Formation of the Pixel Part Forming Part by the Exposure

The aligned photocatalyst containing layer side substrate and the decomposition removal layer were faced with each other with a 50 µm gap therebetween, exposed by a 40 mW/cm$^2$ illuminance by an extra high pressure mercury lamp (wavelength 365 nm) from the photomask side for 120 seconds so as to decompose and remove the decomposition removal layer and formed a pixel part forming part comprising the bared glass substrate in a pattern.

At the time, the contact angles of the unexposed part and the pixel part forming part to a wetting index standard solution of 40 mN/m surface tension (manufactured by Junsei Chemical, Co., Ltd.) was measured (30 seconds after dropping liquid droplets form a micro syringe) using a contact angle measuring device (CA-Z type manufactured by Kyowa Interface Science, Co., Ltd.), and they were 30°, and 6°, respectively.

4. Formation of the Pixel Part

Next, using the ink jet apparatus, UV curing type polyfunctional acrylate monomer inks of each RGB colors containing 5 parts by weight of a pigment, 20 parts by weight of a solvent, 5 parts by weight of a polymerization initiating agent, and 70 parts by weight of a UV curing resin were adhered on the pixel part forming part for coloring, and the UV process was executed thereto for curing. For the red, green and blue inks, as the solvent, a polyethylene glycol monomethyl ethyl acetate, as the polymerization initiating agent, IRUGACURE 369 (product name, manufactured by Chiba Specialty Chemicals), and as the UV curing resin, a DPHA (dipenta erythritol hexaacrylate (manufactured by NIPPON KAYAKU CO., LTD.) were used. Moreover, as the pigment, for the red ink, C. I. Pigment Red 177, for the green ink, C. I. Pigment Green 36, and for the blue ink, C. I. Pigment Blue 15+C. I. Pigment Violet 23 were used, respectively.

5. Formation of the Protecting Layer

As the protecting layer, a two liquid mixing type thermosetting agent (manufactured by Nippon Gosei Gomu Co., SS7265) was coated by a spin coater. By carrying out the curing process at 200° C. for 30 minutes, a protecting layer was formed so as to obtain a color filter. The obtained color filter was of a high quality without the color omission or the color irregularity in the pixel part.

Example 4

1. Formation of the Photocatalyst Containing Layer Side Substrate 5 g of a trimethoxy methyl silane (TSL8113, manufactured by GE Toshiba Silicones Co., Ltd.) and 2.5 g of a 0.5 normal hydrochloric acid were mixed, and agitated for 8 hours. The same was diluted by an isopropyl alcohol to 10 times so as to provide a primer layer composition.

By coating the above mentioned primer layer composition onto a photomask substrate by a spin coater, and executing a drying process at 150° C. for 10 minutes, a transparent primer layer (thickness 0.2 µm) was formed.

Next, 30 g of an isopropyl alcohol, 3 g of a trimethoxy methyl silane (TSL8113, manufactured by GE Toshiba Silicones Co., Ltd.), and 20 g of ST-K03 (manufactured by Ishihara Sangyo Kaisha, Ltd.) as a photocatalyst inorganic coating agent were mixed and agitated at 100° C. for 20 minutes. The same was diluted by an isopropyl alcohol to 3 times so as to provide a photocatalyst containing layer composition.

By coating the above mentioned photocatalyst containing layer composition on the photomask substrate with the primer layer formed by a spin coater, and executing a drying process at 150° C. for 10 minutes, a transparent photocatalyst containing layer (thickness 0.15 µm) was formed.

2. Formation of the Decomposition Removal Layer 1 g of TEFLONAF 1600 (manufactured by Du Pont) was dissolved in 200 g of FLUORINERT FC-43 (produced by Sumitomo 3M) so as to provide a decomposition removal layer composition.

By coating the above mentioned decomposition removal layer compound on the glass substrate with the light shielding layer formed by a spin coater, and executing a drying process at 100° C. for 60 minutes, a transparent wettability changeable layer (thickness 0.01 µm) was formed.

3. Formation of the Pixel Part Forming Part by the Exposure

The aligned photocatalyst containing layer side substrate and the decomposition removal layer were faced with each other with a 100 µm gap therebetween, exposed by a 40 mW/cm$^2$ illuminance by an extra high pressure mercury lamp (wavelength 365 nm) from the photomask side for 1,800 seconds so as to decompose and remove the decomposition removal layer and formed a pixel part forming part comprising the bared glass substrate in a pattern.

At the time, the contact angles of the unexposed part and the pixel part forming part to a wetting index standard solution of 40 mN/m surface tension (manufactured by Junsei Chemical, Co., Ltd.) was measured (30 seconds after dropping liquid droplets form a micro syringe) using a contact angle measuring device (CA-Z type manufactured by Kyowa Interface Science, Co., Ltd.), and they were 74°, and 6°, respectively.

4. Formation of the Pixel Part

Next, using the ink jet apparatus, UV curing type polyfunctional acrylate monomer inks of each RGB colors containing 5 parts by weight of a pigment, 20 parts by weight of a solvent, 5 parts by weight of a polymerization initiating agent, and 70 parts by weight of a UV curing resin were adhered on the pixel part forming part for coloring, and the UV process was carried out for curing. For the red, green and blue inks, as the solvent, a polyethylene glycol monomethyl ethyl acetate, as the polymerization initiating agent, IRUGACURE 369 (product name, manufactured by Chiba Specialty Chemicals), and as the UV curing resin, a DPHA (dipenta erythritol hexaacrylate (manufactured by NIPPON KAYAKU CO., LTD.) were used. Moreover, as the pigment, for the red ink, C. I. Pigment Red 177, for the green ink, C. I. Pigment Green 36, and for the blue ink, C. I. Pigment Blue 15+C. I. Pigment Violet 23 were used, respectively.

5. Formation of the Protecting Layer

As the protection layer, a two liquid mixing type thermosetting agent (manufactured by Nippon Gosei Gomu Co., SS7265) was coated by a spin coater. By carrying out the curing process at 200° C. for 30 minutes, a protecting layer was formed so as to obtain a color filter. The obtained color filter was of a high quality without the color omission or the color irregularity in the pixel part.

What is claimed is:

1. A method for manufacturing a color filter comprising:
   (1) forming a light shielding part on a transparent base material;
   (2) forming a wettability changeable layer, which a wettability changes by a function of a photocatalyst, on a surface of the transparent base material on a side which the light shielding part is formed;
   (3) placing a photocatalyst containing layer of a photocatalyst containing layer side substrate, which is the photocatalyst containing layer containing a photocatalyst formed on a base member, and the wettability changeable layer with a gap of 200 µm or less, and irradiating an energy from a predetermined direction to form a pixel part forming part, in a pattern, comprising a lyophilic area where the contact angle to a liquid is lowered compared with a state before the energy irradiation to the wettability changeable layer; and
   (4) coloring the pixel part forming part by an ink jet method so as to form a pixel part.

2. The method for manufacturing a color filter according to claim 1, comprising:
   after adjusting the wettability changeable layer, placing a photocatalyst containing layer of a photocatalyst containing layer side substrate, which is the photocatalyst containing layer containing a photocatalyst formed on a base member, and the wettability changeable layer with a gap of 200 µm or less, and irradiating an energy from a predetermined direction to form a liquid repellent convex part forming part, in a pattern, comprising a lyophilic area where the contact angle to a liquid is lowered compared with a state before the energy irradiation to the wettability changeable layer of the light shielding part; and
   forming a liquid repellent convex part on the liquid repellent convex part forming part.

3. The method for manufacturing a color filter according to claim 1, wherein the contact angle, to a liquid having a 40 mN/m surface tension, on the wettability changeable layer is 10° or more on a part without the energy irradiation and it is 9° or less on a part with the energy irradiation.

4. The method for manufacturing a color filter according to claim 1, wherein the wettability changeable layer is a layer containing an organo polysiloxane.

5. The method for manufacturing a color filter according to claim 4, wherein the organo polysiloxane is a polysiloxane containing a fluoro alkyl group.

6. The method for manufacturing a color filter according to claim 4, wherein the organo polysiloxane is an organo polysiloxane as a hydrolyzed condensate or a cohydrolyzed condensate of one kind or two or more kinds of silicon compounds represented by $Y_pSiX_{(4-n)}$ (here, Y is an alkyl group, a fluoro alkyl group, a vinyl group, an amino group, a phenyl group, an epoxy group, or an organic group containing them, X is an alkoxyl group, or a halogen, and n is an integer from 0 to 3).

7. The method for manufacturing a color filter according to claim 1, wherein a width of the pixel part is formed wider than the width of a opening part formed by the light shielding part.

8. The method for manufacturing a color filter according to claim 1, wherein the photocatalyst containing layer and the wettability changeable layer is placed with a gap in a range of 0.2 µm to 10 µm.

9. The method for manufacturing a color filter according to claim 1, wherein the photocatalyst containing layer side substrate comprises the base member and the photocatalyst containing layer formed in a pattern on the base member.

10. The method for manufacturing a color filter according to claim 1, wherein the photocatalyst containing layer side substrate comprises a base member, a photocatalyst containing layer formed on the base member, and a photocatalyst containing layer side light shielding part formed in a pattern, and wherein the energy irradiation in the energy irradiating process is carried out from the photocatalyst containing layer side substrate.

11. The method for manufacturing a color filter according to claim 10, wherein the photocatalyst containing layer side substrate comprises the photocatalyst containing layer formed on the base member, and the photocatalyst containing layer side light shielding part formed in a pattern on the photocatalyst containing layer.

12. The method for manufacturing a color filter according to claim 10, wherein the photocatalyst containing layer side substrate comprises the photocatalyst containing layer side light shielding part formed in a pattern on the base member, and furthermore, the photocatalyst containing layer formed thereon.

13. The method for manufacturing a color filter according to claim 12, wherein the photocatalyst containing layer side substrate comprises the photocatalyst containing layer formed on the photocatalyst containing layer side light shielding part formed in a pattern on the base member via a primer layer.

14. The method for manufacturing a color filter according to claim 1, wherein a spacer having the thickness in a range of 0.2 µm to 10 µm is formed in a pattern on the photocatalyst containing layer in the photocatalyst containing layer side substrate, and the energy irradiation is carried out with the spacer and the wettability changeable layer being in contact.

15. The method for manufacturing a color filter according to claim 14, wherein the spacer is a photocatalyst containing layer side light shielding part formed with a light shielding material.

16. The method for manufacturing a color filter according to claim 1, wherein the photocatalyst containing layer is a layer consisting of a photocatalyst.

17. The method for manufacturing a color filter according to claim 16, wherein the photocatalyst containing layer is a layer formed by forming a film of a photocatalyst on the base member by a vacuum film formation method.

18. The method for manufacturing a color filter according to claim 1, wherein the photocatalyst containing layer is a layer having a photocatalyst and a binder.

19. The method for manufacturing a color filter according to claim 1, wherein the photocatalyst is one kind or two or more substances selected from a titanium oxide ($TiO_2$), a zinc oxide (ZnO), a tin oxide ($SnO_2$), a strontiumtitanate ($SrTiO_3$), tungsten oxide ($WO_3$), bismuth oxide ($Bi_2O_3$), and an iron oxide ($Fe_2O_3$).

20. The method for manufacturing a color filter according to claim 19, wherein the photocatalyst is a titanium oxide ($TiO_2$).

21. The method for manufacturing a color filter according to claim 1, wherein the energy irradiation is carried out while heating the photocatalyst containing layer.

22. The method for manufacturing a color filter according to claim 1, wherein the light shielding part is made of a resin.

23. A method for manufacturing a color filter comprising:
(1) forming a wettability changeable layer, which a wettability changes by a function of a photocatalyst, on a transparent base material, on a pixel part forming part which is a part on the transparent base material where pixel part is formed;
(2) forming a light shielding part on the boundary part of the pixel part forming part provided with the wettability changeable layer;
(3) placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to obtain the pixel part forming part as a lyophilic area where the contact angle to a liquid is lowered compared with a state before the energy irradiation; and
(4) coloring the pixel part forming part, provided as a lyophilic area, by an ink jet method so as to form a pixel part.

24. A method for manufacturing a color filter comprising:
(1) forming a wettability changeable layer, which a wettability changes by a function of a photocatalyst, on a transparent base material, on a light shielding part forming part which is a part on the transparent base material where light shielding part is formed;
(2) coloring a part on the transparent base material, where the wettability changeable layer is not formed, by an ink jet method so as to form a pixel part;
(3) placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to obtain the light shielding part forming part as a lyophilic area where the contact angle to a liquid is lowered compared with a state before the energy irradiation; and
(4) forming a light shielding part in the light shielding part forming part provided as the lyophilic area.

25. A method for manufacturing a color filter comprising:
(1) placing a wettability changeable layer, which a wettability changes by a function of a photocatalyst, and a photocatalyst containing layer of a photocatalyst containing layer side substrate, which is the photocatalyst containing layer containing a photocatalyst formed on a base member, with a gap of 200 μm or less, and irradiating an energy from a predetermined direction to form a light shielding part forming part, in a pattern, comprising a lyophilic area where the contact angle to a liquid is lowered compared with a state before the energy irradiation;
(2) forming a light shielding part in the light shielding pan forming part provided as the lyophilic area;
(3) placing a wettability changeable layer with the light shielding part formed thereon and a photocatalyst containing layer with a gap of 200 μm or less, and irradiating an energy from a predetermined direction to form a pixel part forming part, in a pattern, comprising a lyophilic area where the contact angle to a liquid is lowered compared with a state before the energy irradiation; and
(4) coloring the pixel part forming part provided as the lyophilic area by the ink jet method, so as to form a pixel part.

26. The method for manufacturing a color filter according to claim 25, wherein the wettability changeable layer is formed on a transparent base material.

27. A method for manufacturing a color filter comprising:
(1) placing a wettability changeable layer, which a wettability changes by a function of a photocatalyst, and a photocatalyst containing layer of a photocatalyst containing layer side substrate, which is the photocatalyst containing layer containing a photocatalyst formed on a base member, with a gap of 200 μm or less, and irradiating an energy from a predetermined direction to form a pixel part forming part, in a pattern, comprising a lyophilic area where the contact angle to a liquid is lowered compared with a state before the energy irradiation;
(2) forming a pixel part by coloring the pixel part forming part provided as the lyophilic area by an ink jet method;
(3) placing a wettability changeable layer with the pixel part formed thereon and a photocatalyst containing layer with a gap of 200 μm or less, and irradiating an energy from a predetermined direction to form a light shielding part forming part, in a pattern, comprising a lyophilic area where the contact angle to a liquid is lowered compared with a state before the energy irradiation; and
(4) forming a light shielding part in the light shielding part forming part provided as the lyophilic area.

28. The method for manufacturing a color filter according to claim 27, wherein the wettability changeable layer is formed on a transparent base material.

29. A method for manufacturing a color filter comprising:
(1) forming a light shielding part on a wettability changeable layer, which a wettability changes by a function of a photocatalyst;
(2) placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to form a pixel part forming part, in a pattern, comprising a lyophilic area where the contact angle to a liquid is lowered compared with a state before the energy irradiation; and
(3) coloring the pixel part forming part provided as the lyophilic area by the ink jet method so as to form a pixel part.

30. The method for manufacturing a color filter according to claim 29, wherein the wettability changeable layer is formed on a transparent base material.

31. The method for manufacturing a color filter according to claim 1, wherein the process of forming the pixel part forming part provided as the lyophilic area, and coloring the same by the ink jet method to form the pixel part comprises:
(a) placing a photocatalyst containing layer of a photocatalyst containing layer side substrate, which is the photocatalyst containing layer containing a photocatalyst formed on a base member, and the wettability changeable layer with a gap of 200 μm or less, and irradiating an energy from a predetermined direction to form a first pixel part forming part, in a pattern, comprising a lyophilic area where the contact angle to a liquid is lowered compared with a state before the energy irradiation;
(b) coloring the first pixel part forming part provided as the lyophilic area by the ink jet method so as to form a first pixel part;
(c) placing the photocatalyst containing layer and the wettability changeable layer with a gap of 200 μm or less, and irradiating an energy from a predetermined direction to form a second pixel part forming part, in a pattern, comprising a lyophilic area where the contact angle to a liquid is lowered compared with a state before the energy irradiation; and
(d) coloring the second pixel part forming part provided as the lyophilic area by the ink jet method so as to form a second pixel part.

* * * * *